(12) United States Patent
Geodakyan et al.

(10) Patent No.: US 10,078,844 B1
(45) Date of Patent: Sep. 18, 2018

(54) METHOD AND SYSTEM FOR COMBINING OFFLINE AND ONLINE IDENTITIES WITH ASSOCIATED PURCHASING INTENTION INDICATORS IN VIEW OF A GEOGRAPHIC LOCATION

(71) Applicant: SUMMIT RESOURCES, LLC, Cumming, GA (US)

(72) Inventors: Grigoriy S. Geodakyan, Atlanta, GA (US); Yong-jong Shawn Yen, Johns Creek, GA (US); Ryan Andrew Foss, Cumming, GA (US); Jason Hardy, Ball Ground, GA (US); William Dale Broen, Atlanta, GA (US); Natalie M. Born, Buford, GA (US)

( * ) Notice: Subject to any disclaimer, the term of this patent is extended or adjusted under 35 U.S.C. 154(b) by 0 days.

(21) Appl. No.: 15/712,036

(22) Filed: Sep. 21, 2017

(51) Int. Cl.
| | |
|---|---|
| *G06Q 30/02* | (2012.01) |
| *G06F 17/30* | (2006.01) |
| *G01C 21/32* | (2006.01) |
| *G09B 29/10* | (2006.01) |
| *G01C 21/36* | (2006.01) |
| *H04L 29/08* | (2006.01) |

(52) U.S. Cl.
CPC ......... *G06Q 30/0201* (2013.01); *G01C 21/32* (2013.01); *G01C 21/3676* (2013.01); *G06F 17/30867* (2013.01); *G06F 17/30876* (2013.01); *G09B 29/10* (2013.01); *H04L 67/02* (2013.01)

(58) Field of Classification Search
CPC .............................................. G06Q 30/0201
See application file for complete search history.

(56) References Cited

U.S. PATENT DOCUMENTS

| | | | | |
|---|---|---|---|---|
| 2002/0052780 A1* | 5/2002 | Landesmann | .......... | G06Q 30/02 705/14.13 |
| 2003/0065583 A1* | 4/2003 | Takaoka | ................. | G06Q 30/06 705/26.5 |
| 2003/0158776 A1* | 8/2003 | Landesmann | .......... | G06Q 30/02 705/14.25 |
| 2010/0094682 A1* | 4/2010 | Symons | ............. | G06Q 30/0205 705/7.34 |
| 2011/0087550 A1* | 4/2011 | Fordyce, III | ........... | G06Q 30/02 705/14.65 |
| 2011/0093324 A1* | 4/2011 | Fordyce, III | ........... | G06Q 20/10 705/14.27 |

(Continued)

*Primary Examiner* — Sujay Koneru
(74) *Attorney, Agent, or Firm* — Patrick Reilly

(57) ABSTRACT

A system and method for generating purchasing interest values in relation to purchasing a product or service, by category, brand, make, or model. The method includes associating a user identity with recordations of activity in requesting information from assets accessible by addressing universal resource locators, such as applying a web browser to render web pages addressable by registered domain names of the World Wide Web; additional information such as purchasing history, residence address and income level; and estimations of proximity and ease of travel between a geographic location associated with the user identity and a point of sales or services of a product or service type, category, brand, make, or model. The product or service may be related to or comprise an automobile. A map is rendered that separately associates geographic locations with individual user identities. Marketing communications are sent to electronic and/or postal addresses associated with user identities.

31 Claims, 30 Drawing Sheets

(56) References Cited

U.S. PATENT DOCUMENTS

| | | | | |
|---|---|---|---|---|
| 2011/0246300 | A1* | 10/2011 | Yarvis | G06Q 30/02 |
| | | | | 705/14.53 |
| 2011/0282821 | A1* | 11/2011 | Levy | G06Q 30/0631 |
| | | | | 706/47 |
| 2014/0207518 | A1* | 7/2014 | Kannan | G06Q 30/0201 |
| | | | | 705/7.29 |
| 2015/0363859 | A1* | 12/2015 | Zhang | G06Q 30/0631 |
| | | | | 705/26.7 |
| 2016/0292687 | A1* | 10/2016 | Kruglick | G06Q 20/12 |
| 2016/0307221 | A1* | 10/2016 | Kursar | G06Q 30/0201 |
| 2016/0364783 | A1* | 12/2016 | Ramanuja | G06Q 30/0631 |

* cited by examiner

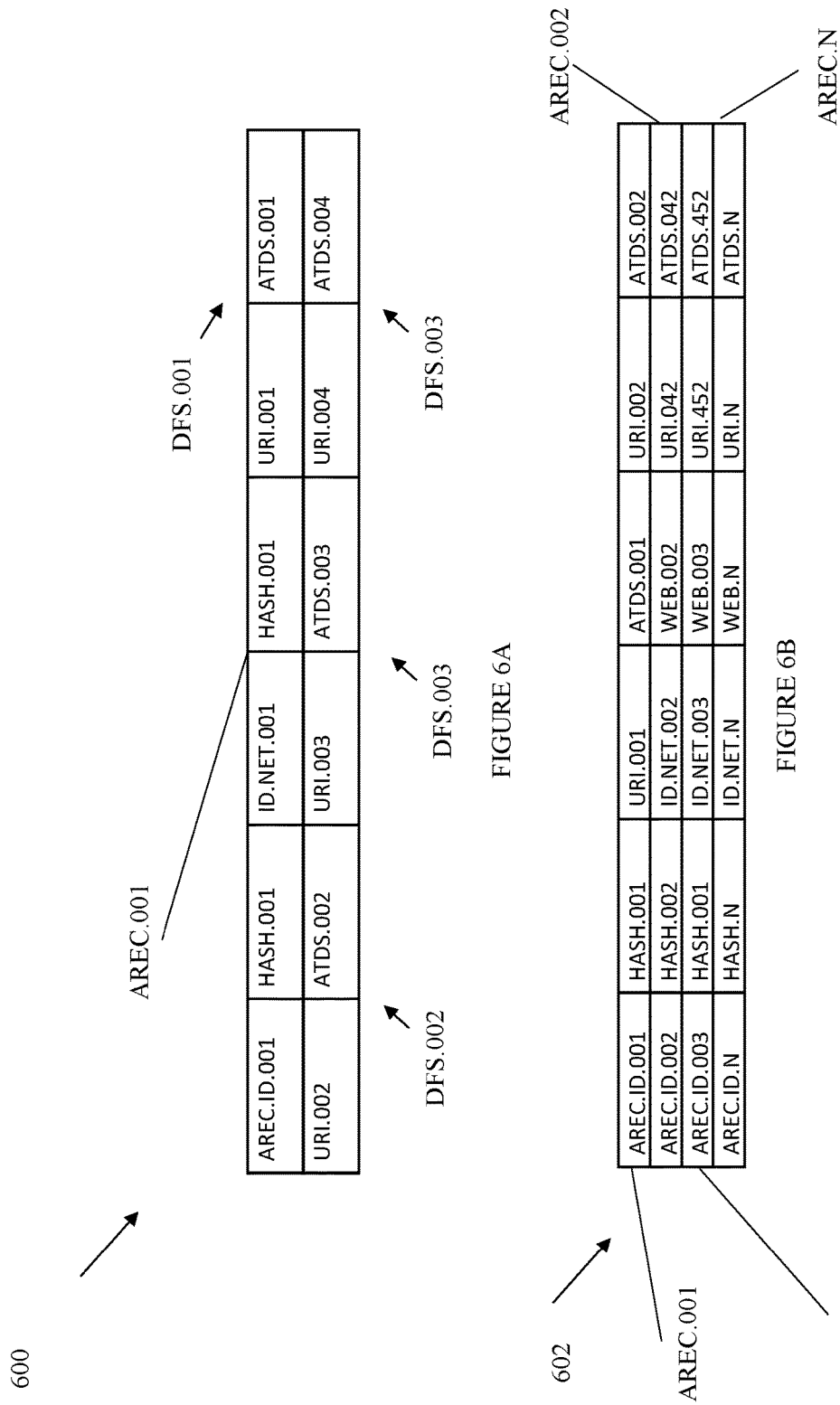

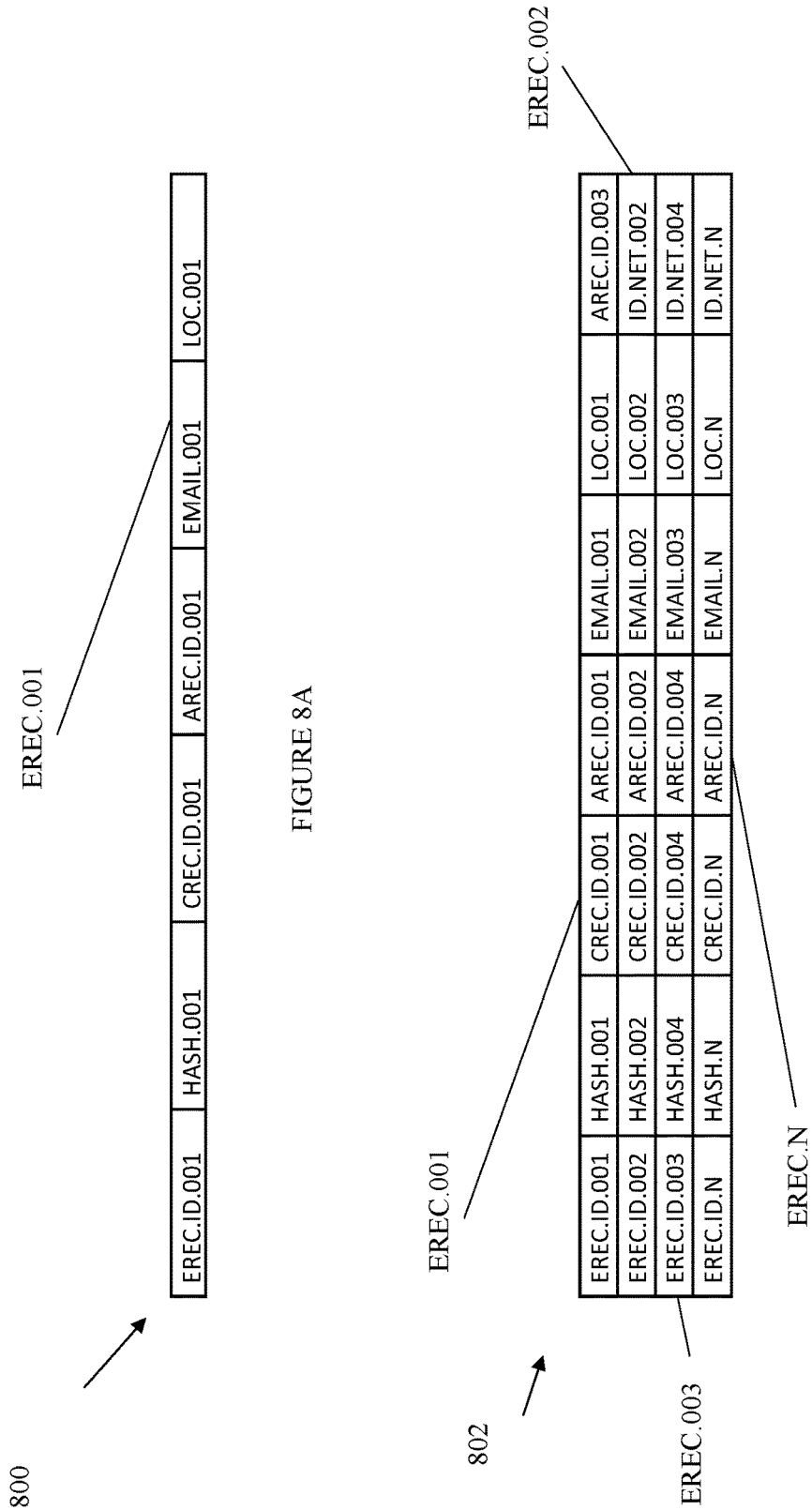

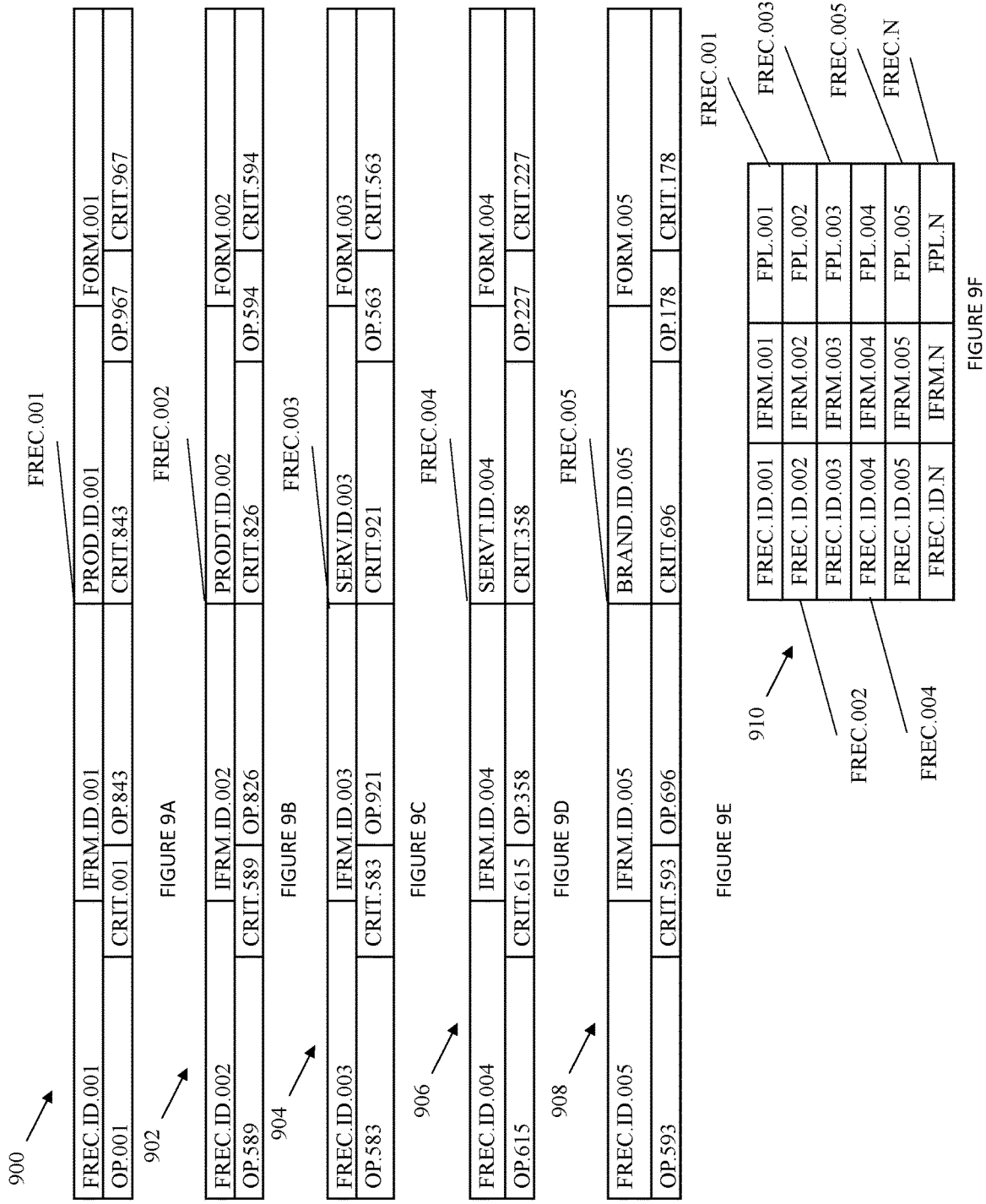

METHOD AND SYSTEM FOR COMBINING OFFLINE AND ONLINE IDENTITIES WITH ASSOCIATED PURCHASING INTENTION INDICATORS IN VIEW OF A GEOGRAPHIC LOCATION

FIELD OF THE INVENTION

The method of the present invention relates to systems and methods for evaluating a likelihood of purchasing intent in view of both information and behavior associated with a potential buyer. More particularly, the present invention relates to systems and methods adapted to generate probabilities of identified entities of selecting and purchasing particular models of product types and makes in view of online actions and other information related to the identified entities.

BACKGROUND OF THE INVENTION

The subject matter discussed in the background section should not be assumed to be prior art merely as a result of its mention in the background section. Similarly, a problem mentioned in the background section, or associated with the subject matter of the background section, should not be assumed to have been previously recognized in the prior art. The subject matter in the background section merely represents different approaches, which in and of themselves, may also be inventions.

Accurate forecasting of intentions of identified persons and other entities to purchase products by type and by specific product model is of value to vendors and providers of various goods and services in many consumer markets. The prior art includes modeling online behavior and information provided online by users of web browsers as well as formulas for estimating purchase timing and intention in view of information related to identified entities, e.g., individual persons, organizations, and associations. For example, knowing that a particular person is searching the web for performance, configuration, pricing and availability information describing a type of automobile or a make and model of an automobile is interpreted in the prior art to indicate a likelihood that that person might be considered a near-term sales prospect for one or more automobile or truck models. In addition, the prior art teaches that the online and offline purchasing history of an entity and other factors related to a same entity, such as age, annual income level, marital status, home ownership status, domicile location, work address and other factors can also be relevant in assessing the timing and purchasing preferences of the identified entity. Yet the prior art fails to optimally integrate information related to a same entity that can be sourced from both online behavior and additional information to indicate purchasing intent and immediacy of possible purchasing of specific goods and services by category or by make, model, year of manufacture or generation, brand, or reputation.

Towards this and other objects made obvious to one of ordinary skill in the art in view of the present disclosure, a system and method are provided that improve the accuracy and reliability of forecasting purchasing intent and likely immediacy of purchase of a specific product or service or type of product or service in view of both (a.) online behavior associated with an identified entity and (b.) additional information descriptive of and/or related to the identified entity. Additional information that might be applied in generating an expectation of likelihood to purchase a good or service includes, but is not limited to, geographic locations of potential purchasers, geographic locations product or service marketing operations, indications of a time and day that information was acquired, indications of a time and day that a specified event occurred, was observed or ended, a demographic category with which an associated entity is classified, and one or a plurality of purchasing history data, financial data, and documentations of events occurring during the life of and affecting an associated entity.

SUMMARY AND OBJECTS OF THE INVENTION

Towards these objects and other objects that will be made obvious in light of the present disclosure, a method and system for deriving probabilities of user purchasing intentions and intensity in relation to a product or service type, service provider, productized service and/or product model are provided. The method of the present invention (hereinafter, "the invented method") includes considerations of online actions, i.e., online behavior, associated with a persistent online identifier and with additional information relatable to the persistent online identifier. In one aspect of the invented behavior, purchasing intent is evaluated in view of web searching behavior associated with a particular persistent identity.

In a first optional aspect of the invented method, a value of an intensity to purchase is generated by a comprehensive mathematical function that derives the purchasing intensity value from a first plurality of datapoints generated by online activity and a second plurality of datapoints harvested from other parameters and qualities, wherein both pluralities of datapoints are associated with a same entity. In one alternative, a first partial value is derived solely or primarily from the first plurality of datapoints generated by online activity and a second partial value is derived solely or primarily from the second plurality of datapoints, and a joining mathematical function then derives the purchasing intensity value from the first partial value and the second partial value. It is understood that various alternate preferred embodiments of the invented method consider an associated time and date datum in weighting the importance or mathematical magnitude of one or more items of information in a calculation of a purchasing intensity value.

In another optional aspect of the invented method, web pages are evaluated and scored for degree of relevance to a particular product, service, product type, service type, or brand, such as an estimation of relevance to information describing an automobile product or service quality. Observed web searching associated with the persistent online identifier that produces an evaluated web page or leads to a request to view an evaluated web page is considered in deriving an evaluation of purchasing interest of an entity associated with the persistent online identifier. In yet another optional aspect of the invented method, visiting a scored web page in a web browser session associated with a persistent online identifier is alternatively or additionally considered in deriving an evaluation of a purchasing interest of an entity associated with the persistent online identifier.

In a still other optional aspect of the invented method, the persistent online identifier may be or comprise a hash of a unique user address, wherein the user address may be or comprise an email address, a telephone number, a government issued identification number, an online account number, a postal address, a geolocational identifier, or other personally identifiable information known in the art.

A first alternate preferred embodiment of the invented method includes one or more of the aspects of associating a user identity with (a.) recordations of activity in requesting information from assets accessible via an electronic communications network by addressing universal resource identifiers or universal resource locators, to include applying a web browser to render web pages addressable by registered domain names of the World Wide Web; (b.) additional information such as purchasing history, residence address and income level; and/or (c.) estimations of proximity and ease of travel between a geographic location associated with the user identity and a point of sales or services of a product or service type, category, brand, make, or model.

In an even additional optional aspect of the invented method, the product or service of interest may be related to or comprise an automobile or other consumer product and/or the associated purchasing history may include citations of previous purchases related to automobile purchase, use, or maintenance.

In an even other additional optional aspect of the invented method, a visual rendering of map images is presented by a display screen as directed by a computational device, wherein the map images optionally, additionally or alternatively indicate locations of domiciles, work or employment locations, and/or point of sales facilities as harvested from digitized records of online and/or offline activities, events and associations.

In yet other additional optional aspects of the invented method, marketing messaging may be posted by mail service or courier, electronically transmitted, faxed or otherwise delivered by suitable means known in the art and addressed to an intended recipient as identified by the invented method.

In accordance with the invented method, a computational system is provided that may comprise or relate to acquiring online behavior associated with an entity identifier. The computational system may be or comprise a digital cellular smart phone, a bundled software and hardware internet-enabled personal computer or workstation. The computational system may be or include a bundled software and hardware product that includes a web browser and one or more user identifiers associable with an entity, a user identity, a cellular smartphone, a network communications-enabled computational system, or other suitable electronic communications device known in the art.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more embodiments are set forth in the accompanying drawings and the description below. Other features, objects, and advantages will be apparent to one of skill in the art from the description and drawings, and from the claims.

BRIEF DESCRIPTION OF THE DRAWINGS

These, and further features of the invention, may be better understood with reference to the accompanying specification and drawings depicting the preferred embodiment, in which:

FIG. 6A is an online activity database record table comprising a subset of information contained within an exemplary first activity database record of an online activity database of the evaluator system of FIG. 3;

FIG. 6B is an online activity database table comprising a plurality of online activity database records of the online activity database of the evaluator system of FIG. 3 and the first exemplary online activity data record of FIG. 4A;

FIG. 8A is an entity database record table comprising a subset of information contained within a first exemplary entity database record of an entity database of the evaluator system of FIG. 3 whereby a consumer database record of FIG. 4B is associated with one or more activity database records of FIG. 6B;

FIG. 8B is an entity database table comprising a plurality of entity database records of the entity database of the evaluator system of FIG. 3, wherein each entity database record preferably associates at least one consumer record of FIG. 4B and at least one online activity record of FIG. 6B;

FIG. 9A is a first formula database record table comprising a subset of information contained within a first exemplary formula database record of a formula database of the evaluator system of FIG. 3;

FIG. 9B is a second formula database record table comprising a subset of information contained within a second exemplary formula database record of a formula database of the evaluator system of FIG. 3;

FIG. 9C is a third formula database record table comprising a subset of information contained within a third exemplary formula database record of a formula database of the evaluator system of FIG. 3;

FIG. 9D is a fourth formula database record table comprising a subset of information contained within a fourth exemplary formula database record of a formula database of the evaluator system of FIG. 3;

FIG. 9E is a fifth formula database record table comprising a subset of information contained within a fifth exemplary formula database record of a formula database of the evaluator system of FIG. 3;

FIG. 9F is a formula database table comprising a plurality of formula database records of the formula database of the evaluator system of FIG. 3 and the first exemplary formula database record of FIG. 9A;

DETAILED DESCRIPTION

A method and apparatus for developing and managing Internet transactions is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

It is understood that word "exemplary" is used herein to mean "serving as an example, instance, or illustration." Any aspect described herein as "exemplary" is not necessarily to be construed as exclusive, preferred or advantageous over other aspects.

Figure 1:
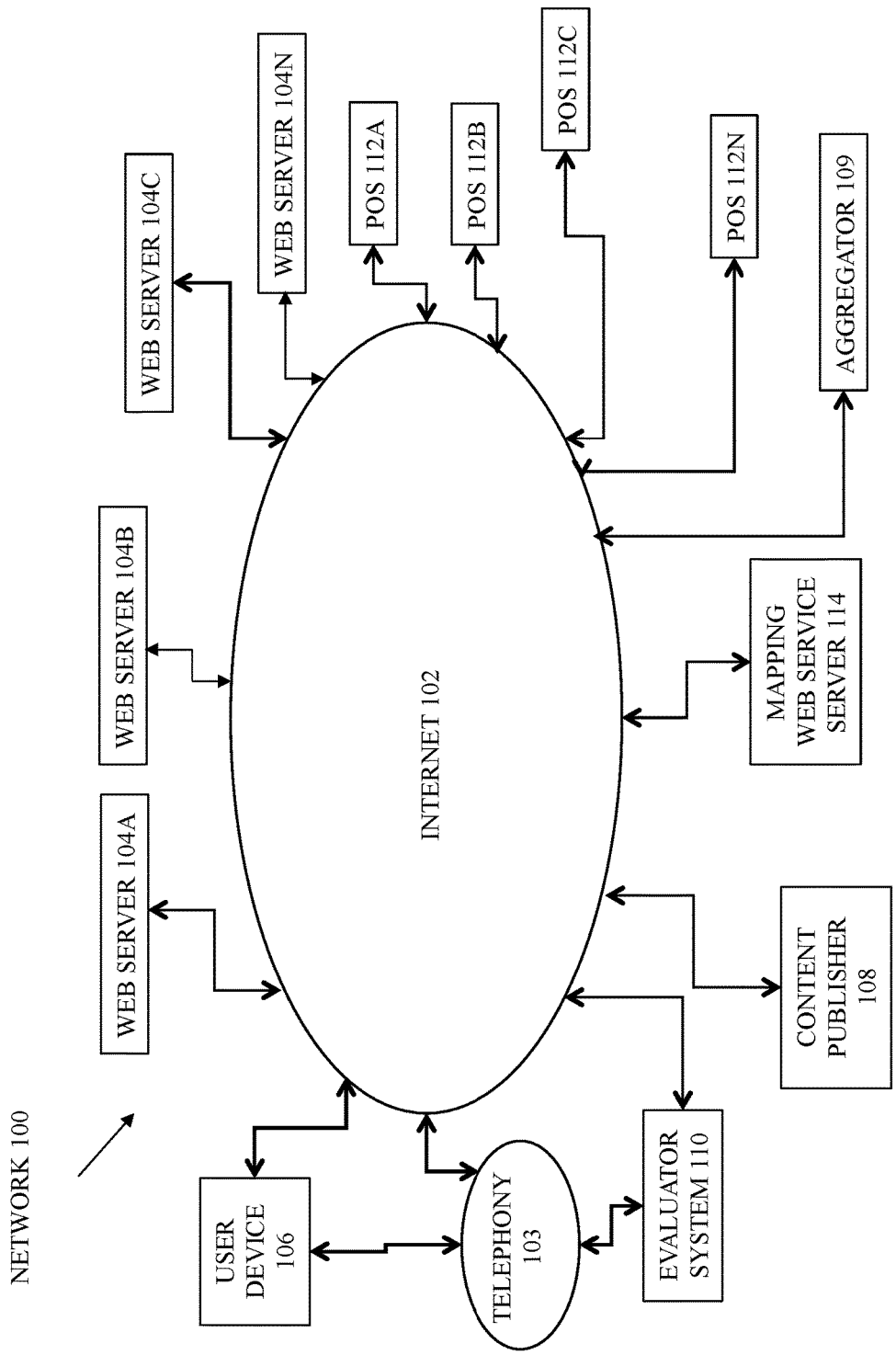
FIG. 1 is a block diagram of an electronic communications network which enables the invented method and that includes the Internet, a plurality of web servers, a plurality of point of sale servers, an online activity tracking information aggregator system, a mapping web service server, a content publishing system, an evaluator system and a user device.

Referring now generally to the Figures and particularly to FIG. 1, FIG. 1 is a block diagram of an electronics communications network 100 by which a first preferred embodiment of the method of the present invention ("first method"). The electronics communications network 100 (hereinafter, "network" 100) that optionally comprises the Internet 102, a telephony network 103, a plurality of web servers 104A-104N, a user device 106, a content publishing system 108 (hereinafter, "content publisher" 108), an online activity tracking information aggregator system 109 (hereinafter, "aggregator" 109), an evaluator system 110, a plurality of point of sale systems 112A-112N and a mapping web service server 114. The telephony network 103 is bi-directionally communicatively coupled with the Internet 102 and may be or comprise one or more wireless telephone communications networks and landline telephone networks. It is understood that the network 100 may further comprise additional electronic communications systems or networks, a plurality of content publishers 108 and aggregators 109 that are not indicated on FIG. 1 for the sake of clarity.

The user device 106 may be or comprise a bundled hardware and software product such as (a.) an IPHONE™ cellular telephone as marketed by Apple, Inc. of Cupertino, Calif.; (b.) an HTC TITAN II™ cellular telephone as marketed by AT&T, Inc. of Dallas, Tex. and running a WINDOWS 7™ operating system as marketed by Microsoft Corporation of Redmond, Wash.; (c.) a GALAXY NEXUS™ smart phone as marketed by Samsung Group of Seoul, Republic of Korea and/or running an ANDROID™; (d.) a network-communications enabled THINKSTATION WORKSTATION™ notebook computer marketed by Lenovo, Inc. of Morrisville, N.C.; (e.) a NIVEUS 5200 computer workstation marketed by Penguin Computing of Fremont, Calif. and running a LINUX™ operating system or a UNIX™ operating system; (f) a network-communications enabled personal computer configured for running WINDOWS XP™, VISTA™ or WINDOWS 7™ operating system marketed by Microsoft Corporation of Redmond, Wash.; (g.) a MACBOOK PRO™ personal computer as marketed by Apple, Inc. of Cupertino, Calif.; (h.) an IPAD™ tablet computer as marketed by Apple, Inc. of Cupertino, Calif.; (i.) a TOUGHPAD™ tablet computer as marketed by Panasonic Corporation of Kadoma, Osaka, Japan and running an ANDROID™ operating system as marketed by Google, Inc. of Mountain View, Calif.; or (j.) other suitable computational system or electronic communications device known in the art.

One or more of the plurality of web servers 104A-104N, the content publishers 108, the aggregators 109, the evaluator system 110, the plurality of point of sale systems 112A-112N or the mapping web service server 114 may be or comprise a bundled hardware and software product such as (a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, VISTA™ or WINDOWS 7™ operating system marketed by Microsoft Corporation of Redmond, Wash.; (d.) a MACBOOK PRO™ personal computer as marketed by Apple, Inc. of Cupertino, Calif.; (e.) an IPAD™ tablet computer as marketed by Apple, Inc. of Cupertino, Calif.; or (f.) other suitable computational system or electronic communications device known in the art.

The mapping web service server 114 (hereinafter, "the mapping system" 114) may be, comprise, host or enable bi-directional communications with a suitable commercially available mapping information provider known in the art, such as GOOGLE MAPS™ as provided by Google, Inc. of Mountain View, Calif. and accessible via a web browser at the domain name https://www.google.com/maps of the World Wide Web, MAPQUEST™ provided by Verizon Communications, Inc. and accessible via a web browser at the domain name https://www.google.com/maps of the World Wide Web https://www.mapquest.com.

Figure 2:
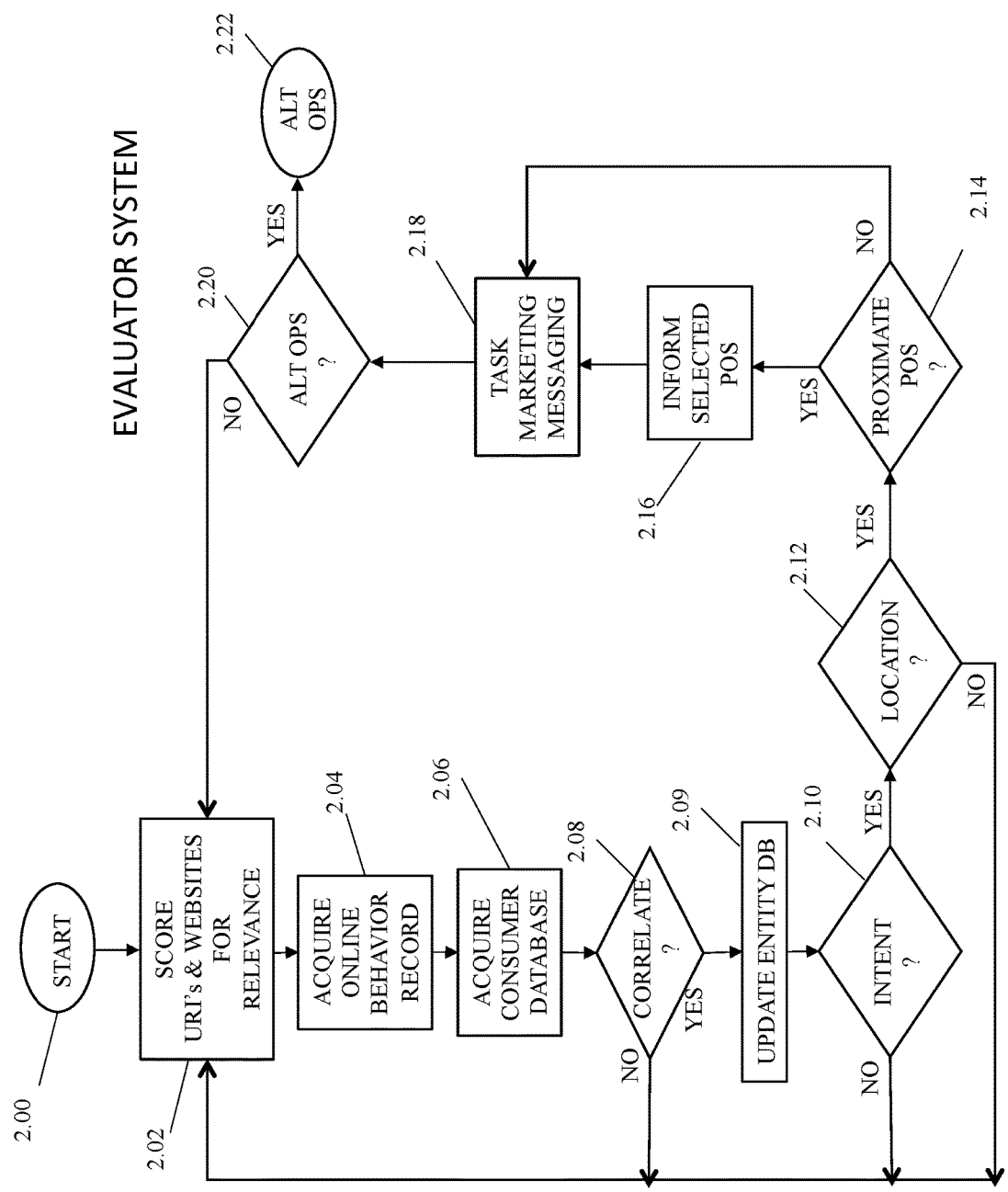
FIG. 2 is process chart of a first preferred embodiment of the invented method.
Figure 3:
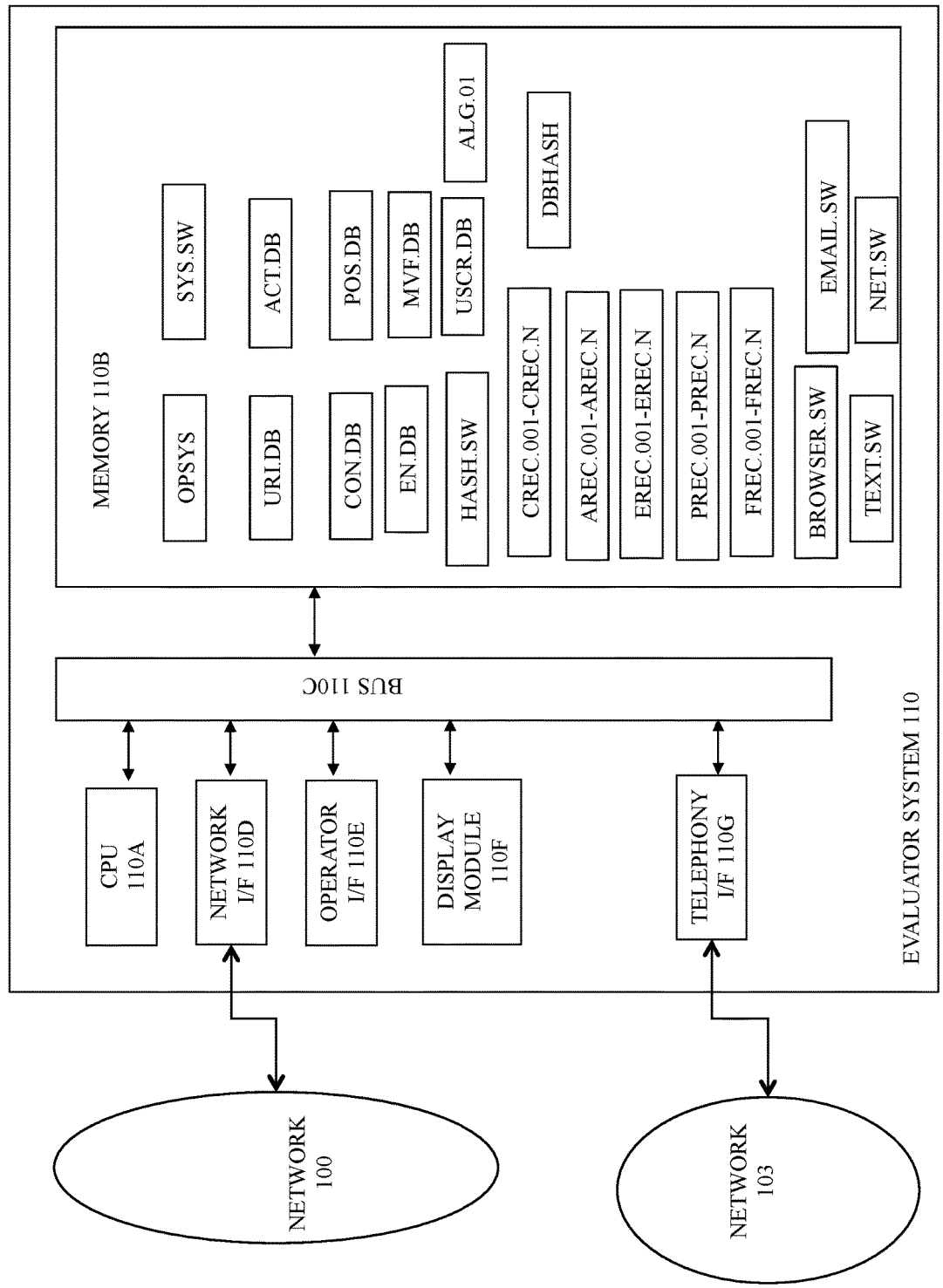
FIG. 3 is a detailed block diagram of the evaluator system of FIG. 1.

Referring now generally to the Figures and particularly to FIG. 2 and FIG. 3, FIG. 2 is a process chart of the first method and FIG. 3 is a block diagram of the evaluator system 110. In step 2.00 of the first method criteria for determining relevance of content of information addressable via a Universal Resource Identifier (hereinafter, "URI") regarding a product type or product model the computer as a relevance algorithm ALG.01-ALG.04 is stored with the evaluator system 110. In step 2.02 the separate content of a plurality of URI's, to include websites, of the network 100 or accessible via the network 100 are examined and scored for relevance to the selected product type and/or product model by the evaluator system 110 in accordance with the exemplary first relevance algorithm ALG.01, a URI scoring database USCR.DB, wherein the resultant scores are stored in a URI database URI.DB of the evaluator system 110. In step 2.04 a first activity record AREC.001 of online behavior of an entity associated with a first persistent online identifier ID.NET.001 (hereinafter, "first online identifier" ID.NET.001) and exhibiting indications of an intent to purchase a specified product or service, product type or service type, or a range of branded products or services is acquired by the evaluator system 110. It is understood that the first online identifier ID.NET.001 may be a software cookie, an element of a software cookie, an email address, a legal name of a natural born person, a telephone number, an account name, a government issued identifier or tax system identifier, a name of an organization, a name of a corporation, a name of a limited liability company, a name of an association, other identifier of a distinguishable entity and/or the first online identifier ID.NET.001 may be or comprise a partial or complete hash of any of these items of digitized information. It is understood that the term "entity" as meant in the present disclosure includes natural born human beings, families, software agents or processes, associations, organizations, partnerships, ventures, enterprises, businesses, companies, corporations, governmental actors and groups of entities.

In step 2.06 a consumer database CON.DB that includes information separately associated with identifiable entities is acquired by the evaluator system 110.

In step 2.08 a correlation between one or more of the entities referenced in the consumer database CON.DB and the first online identifier ID.NET.001 of the first activity record AREC.001 is attempted by the evaluator system 110. If no correlation is found in step 2.08, the evaluator system 110 returns to step 2.02.

If a correlation of information and the first online identifier ID.NET.001 is found by the evaluator system 110 in step 2.8, the evaluator system 110 proceeds onto step 2.09 and to update an entity database EN.DB with the contents of the first activity record AREC.001 wherein correlations between information stored in the consumer database CON.DB and the activity database ACT.DB are stored.

The evaluator system 110 proceeds from step 2.09 and to step 2.10 to apply one or more multivariate intent algorithms MVALG.001-MVALG.N of the multivariate database MV.DB of FIG. 3, FIG. 9A and FIG. 9B to the relevant information of the consumer database CON.DB and the first activity record AREC.001 to determine if a sufficient level of intention indications is present. When the resultant intention value of one or more multivariate intent algorithms MVALG.001-MVALG.N fail to indicate sufficient indications of purchasing intent in step 2.10, the evaluator system 110 proceeds to step 2.02.

In the alternative, when a sufficient indication of purchasing intent is found by the evaluator system 110 in step 2.10, the evaluator system 110 proceeds on to determine if an indication of geographic location is either directly or indirectly associated with the first persistent online identifier ID.NET.001 in step 2.12. If no geographic association is found in step 2.12, the evaluator system 110 returns to step 2.02. In the alternative, when a geographic association is found in step 2.12, the evaluator system 110 proceeds on to step 2.14 and determines whether one or more point of sale systems 112A-112N is associated with a point of sale location that is sufficiently proximate to the geographic location discovered in step 2.12.

When the evaluator system 110 determines in step 2.14 that one or more point of sale systems 112A-112N is associated with a point of sale location that is sufficiently proximate to the geographic location discovered in step 2.12, the evaluator system 110 in step 2.16 informs the selected point of sale systems 112A-112N of the finding of a sales prospect exhibiting behavior indicative of a purchasing intent of the selected product or service by product name, product type or brand. Marketing messaging may optionally be communicated to the sales prospect in step 2.18.

In the alternative, when the evaluator system 110 fails in step 2.14 to identify at least one point of sale system 112A-112N to be associated with a point of sale location that is sufficiently proximate to the geographic location discovered in step 2.12, the evaluator system 110 may optionally proceed on to step 2.18, or in other alternate preferred embodiments of the method of the present invention, the evaluator system 110 would proceed back to again perform step 2.02.

The evaluator system 110 determines in step 2.20 whether to temporarily halt the process of step 2.02 through 2.20 or to proceed on to alternate computational operations of step 2.22.

Referring now generally to the Figures and particularly to FIG. 3, FIG. 3 is a block diagram of the evaluator system 110. The evaluator system 110 includes a central processing unit 110A and a system memory 110B that are bi-directionally communicatively coupled by an internal communications bus 110C. The internal communications bus 110C additionally bi-directionally couples the central processing unit 110A and the system memory 110B with a network interface 110D, a human operator input module 110E, a display module 110F and a telephony interface 110G. The human operator input module 110E enables an operator to input commands and data to the central processing unit 110A and the system memory 110B via the internal communications bus 110C. The display module 110F enables visual rendering of information as directed by the central processing unit 110A. The network interface 110D bi-directionally communicatively couples the central processing unit 110A with the network 100.

The system memory 110B stores an operating system OP.SYS, a hashing derivation software HASH. SW and a system software SYS.SW. The system software SYS.SW enables the evaluator system 110 to perform and provide all relevant aspects of the invented method. The hash derivation software HASH. SW enables generation of the first hash HASH.001 and additional hashes HASH.002-HASH.N of personally identifying information, such as, but not limited to, generating hashes from one or more entity names NAME.001-NAME.N, email addresses EMAIL.001-EMAIL.N, cellular phone numbers CELL.001-CELL.N, account identifiers ACCT.001-ACCT.N, a mobile device identifier MOB.001, and/or a government issued identifier GOV.001. It is understood that the government issued identifier GOV.001 may be a passport number, a student identifier, a social insurance account number or identifier, a workman's compensation account number or identifier, a driver's license account number or identifier, a social services account number or identifier, and/or a Social Security Account Number of the government of the United States of America It is also understood that the hash derivation software HASH. SW may optionally or alternatively be in conformance with a commonly available hashing software, such as, but not limited to, a hashing software that applies the MD5 algorithm as designed by Ronald Rivest of the Computer Science and Artificial Intelligence Laboratory of the Massachusetts Institute of Technology of Cambridge, Mass., or other suitable hashing or cryptographic software or algorithm known in the art.

The system memory 110C further stores, maintains and makes accessible the entity database EN, the URI database URI.DB, the URI scoring database USCR.DB, the consumer information database CON.DB, an online activity database ACT.DB and a plurality of algorithms ALG.01-ALG.04. It is understood that in various alternate preferred embodiments of the invented method that one or more of the databases and algorithms applied therein may be alternatively or additionally stored outside of the evaluator system 110 in one or more data storage systems (not shown) that are accessible to the evaluator system 110 via the network 100 and/or an alternate electronic communications network (not shown).

The URI database URI.DB preferably maintains a listing of Universal Resource Identifiers, to include domain names of the World Wide Web, Universal Resource Locators, and other network addresses that facilitate locating and exchanging information with informational assets accessible via the network 100. The URI database URI.DB further maintains a refreshable score of relevancy of an associated URI to a particular product, product type, service type, specific service and/or brand.

The consumer database CON.DB includes consumer information separately with identified entities, wherein such consumer information preferably includes geolocational data of each entity and additional consumer information relevant in evaluating an intensity of interest in purchasing at least one product type and/or product model, such as an automobile type or a specific automobile make, model and year.

It is understood that in the present disclosure that the scope of meaning of the term automobile includes vehicles powered by an internal combustion engine, an electric motor, a hydrogen fuel cell, and/or a hybrid combination thereof.

The online activity database ACT.DB includes separate records, wherein each record is preferably associated with a particular persistent online identifier ID.NET.001-ID.NET.N and documenting activity such as searching, accessing and/or browsing activity within the network 100. It is understood that the numerical designation of ".N" is meant to indicate that the quantity of individual data of a series of a certain type of data, e.g., persistent online identifiers ID.NET.001-ID.NET.N, may be arbitrarily large and as required by a particular application of the invented method. It is further understood that the numerical designation of ".N" is not meant to indicate that different series of distinguishable instances of particular systems, servers, data or record types are of a same quantity of occurrences, but rather that each series referred to as having N members or instances may be arbitrarily large and as required by a particular application of the invented method.

It is further understood that one or more of the databases EN.DB, ACT.DB, CON.DB, URI.DB, USCR.DB & POS.DB may optionally, alternatively or additionally be or comprise a relational database management system, such as an IBM DB2 Universal Database™ server marketed by IBM Corporation of Armonk, N.Y., or other suitable relational database management system known in the art. It is further understood that one or more of the databases EN.DB, ACT.DB, CON.DB, URI.DB, USCR.DB & POS.DB may optionally, alternatively or additionally be or comprise an object-oriented database management system, such as an Object Oriented DBMS as marketed by Objectivity, Inc. of San Jose, Calif., or other suitable object-oriented database management system known in the art. It is yet further understood that one or more of the databases EN.DB, ACT.DB, CON.DB, URI.DB, USCR.DB & POS.DB may optionally, alternatively or additionally be or comprise a HADOOP™ distributed file system as developed by the Apache Software Foundation of Forest Hills, Md., or other suitable file system known in the art.

The evaluator system 110 further comprises a plurality of software programs stored in system memory 110B, to include a web browser BROWSER.SW, an email client EMAIL.SW, a texting client TEXT.SW, and a network communication software NET.SW. The web browser BROWSER.SW enables the evaluator system 110 to retrieve, present, render and traverse information resources on the World Wide Web via and/or within the network 100, and may be a SAFARI™ web browser provided by APPLE of Cupertino, Calif., or other suitable web browser known in the art.

The email client EMAIL.SW enables the evaluator system 110 to communicate by email transmissions with servers and systems 104A-114 of the network 100 via the telephony interface 110G and/or the network interface 110D. The texting client TEXT.SW enables the evaluator system 110 to communicate by text messaging with servers and systems 104A-114 of the network 100 via the network interface 110D and/or the telephony network interface 110.G. The network communication software NET.SW enables the evaluator system 110 to communicate by other suitable messaging protocols known in the art with servers and systems 104A-114 of the network 100 via the telephony interface 110G and/or the network interface 110D.

The evaluator system 110 may optionally store a database hash DBHASH but is a hash generated by applying the hashing software HASH.001 of a volume of information sourced from or referenced by one or more databases EN.DB, CON.DB, POS.DB & ACT.DB.

Figure 4:
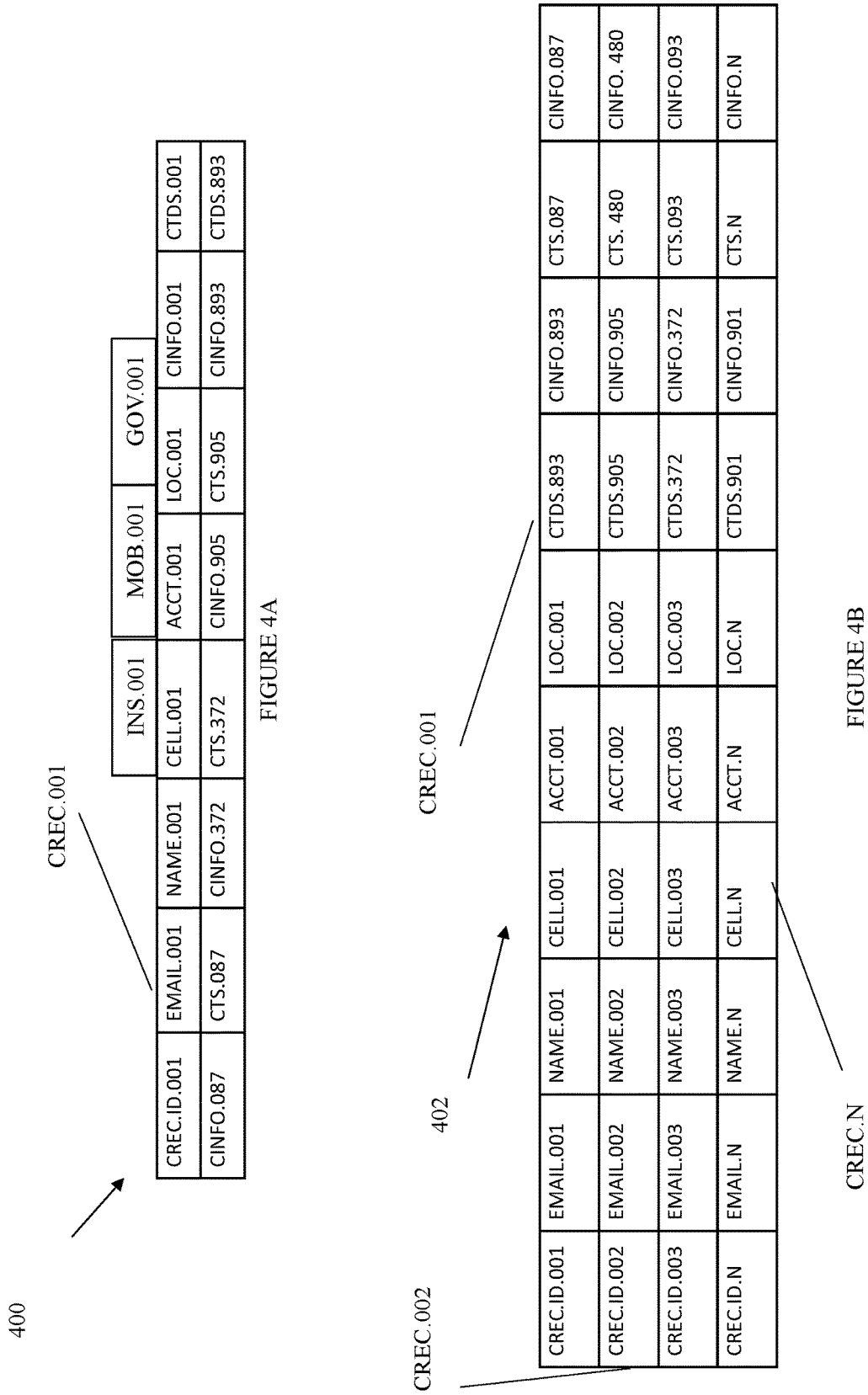
FIG. 4A is a consumer database record table comprising a subset of information contained within a first exemplary consumer database record of a consumer database of the evaluator system of FIG. 3.
FIG. 4B is a consumer database record table comprising a plurality of consumer database records of the consumer database of the evaluator system of FIG. 3 and the first exemplary consumer database record of FIG. 4A.

Referring now generally to the Figures and particularly to FIG. 4A, FIG. 4A is a first table 400 comprising a subset of information contained within a first exemplary consumer database record CREC.001 of the consumer database CON.DB of the evaluator system 110. The first exemplary consumer database record CREC.001 (hereinafter, "the first consumer record" CREC.001) includes a first consumer record identifier CREC.ID.001 that uniquely identifies the first consumer record CREC.001 within the consumer database CON.DB. The first consumer record CREC.001 preferably additionally includes one or more distinguishable instances of personally identifiable information, such as a first entity name NAME.001, a first email address EMAIL.001, a first cellular phone number CELL.001, a first account identifier ACCT.001, a first insurance process identifier INS.001, a first mobile device identifier MOB.001 and/or a first government issued identifier GOV.001 that identify a first entity. The first consumer record CREC.001 preferably yet additionally includes a first geographic location identifier LOC.001, and a plurality of consumer information data fields CINF0.001-CINFO.N that preferably contain information related to an entity that is related to one or more of the distinguishable instances personally identifiable information of the same first record CREC.001. One or more of the plurality of consumer information data fields CINFO.001-CINFO.N may be associated with an individual consumer data record time-date stamp CTDS.001-CTDS.N, wherein each consumer data record time-date stamp CTDS.001-CTDS.N preferably indicates when a time and day associated with the generation, occurrence, receipt or observation of the information of one or more of the plurality of consumer information data fields CINFO.001-CINFO.N.

Referring now generally to the Figures and particularly to FIG. 4B, FIG. 4B is a first database table 402 comprising a plurality of consumer database records CREC.001-CRE.N of which the first consumer record CREC.001 is an example.

Figure 5:
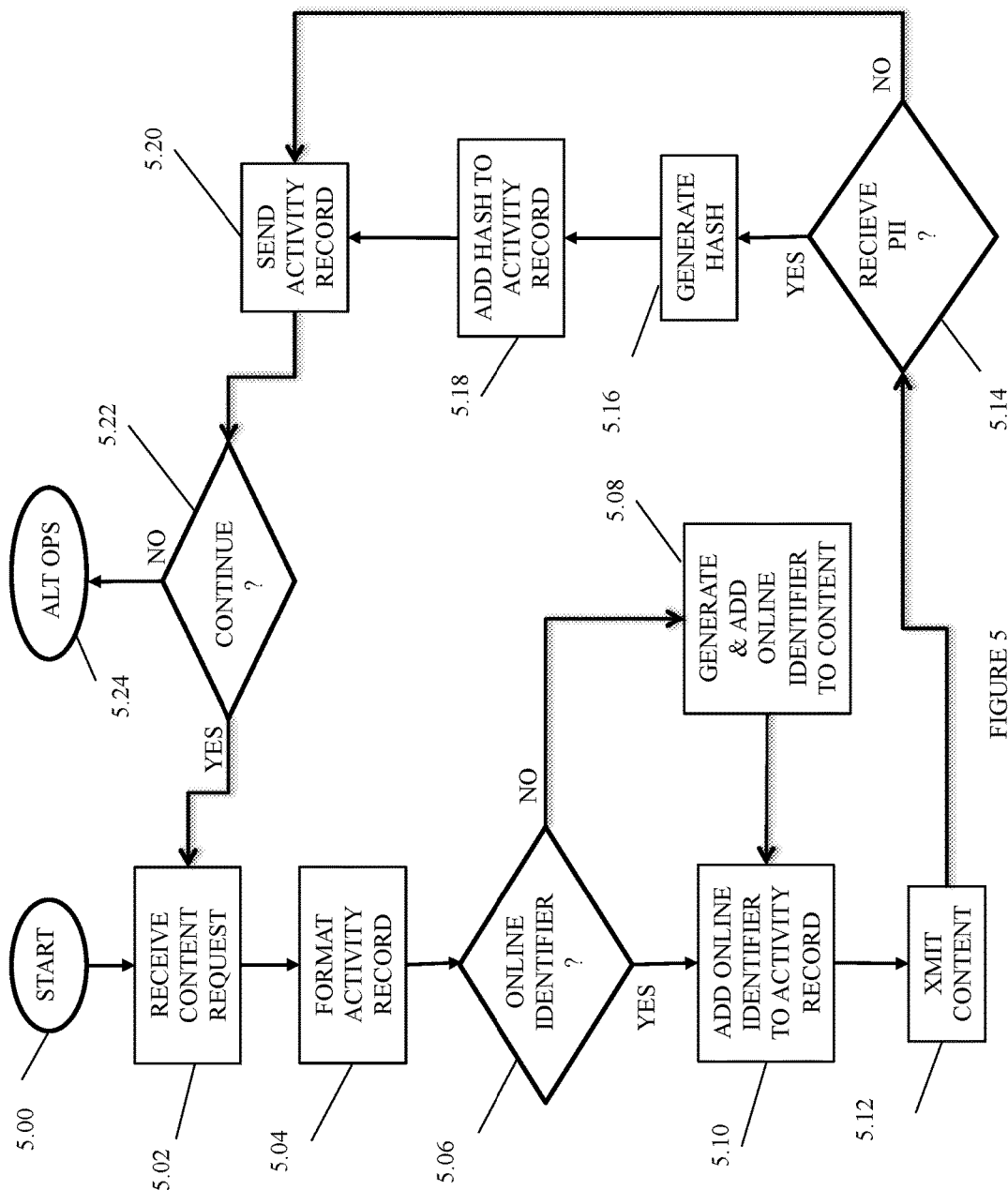
FIG. 5 is a flowchart of a generation of an online activity record by one or more servers and systems of the electronic communications network of FIG. 1.

Referring now generally to the Figures and particularly to FIG. 5, FIG. 5 is a flow chart of a generation of an activity record AREC.001-AREC.N by one or more servers 104A-104N and systems 108 & 109 of the network 2. For the purpose of clarity of illustration, the method of FIG. 5 will be discussed in the disclosure as an instance of the content publisher 108 interacting with the user device 106 as an example of generation of a first exemplary activity record AREC.001. It is understood that the method of FIG. 5 is also applied by the servers 104A-104N and system 109 in generation of other activity records AREC.001-AREC.N.

Figure 25:
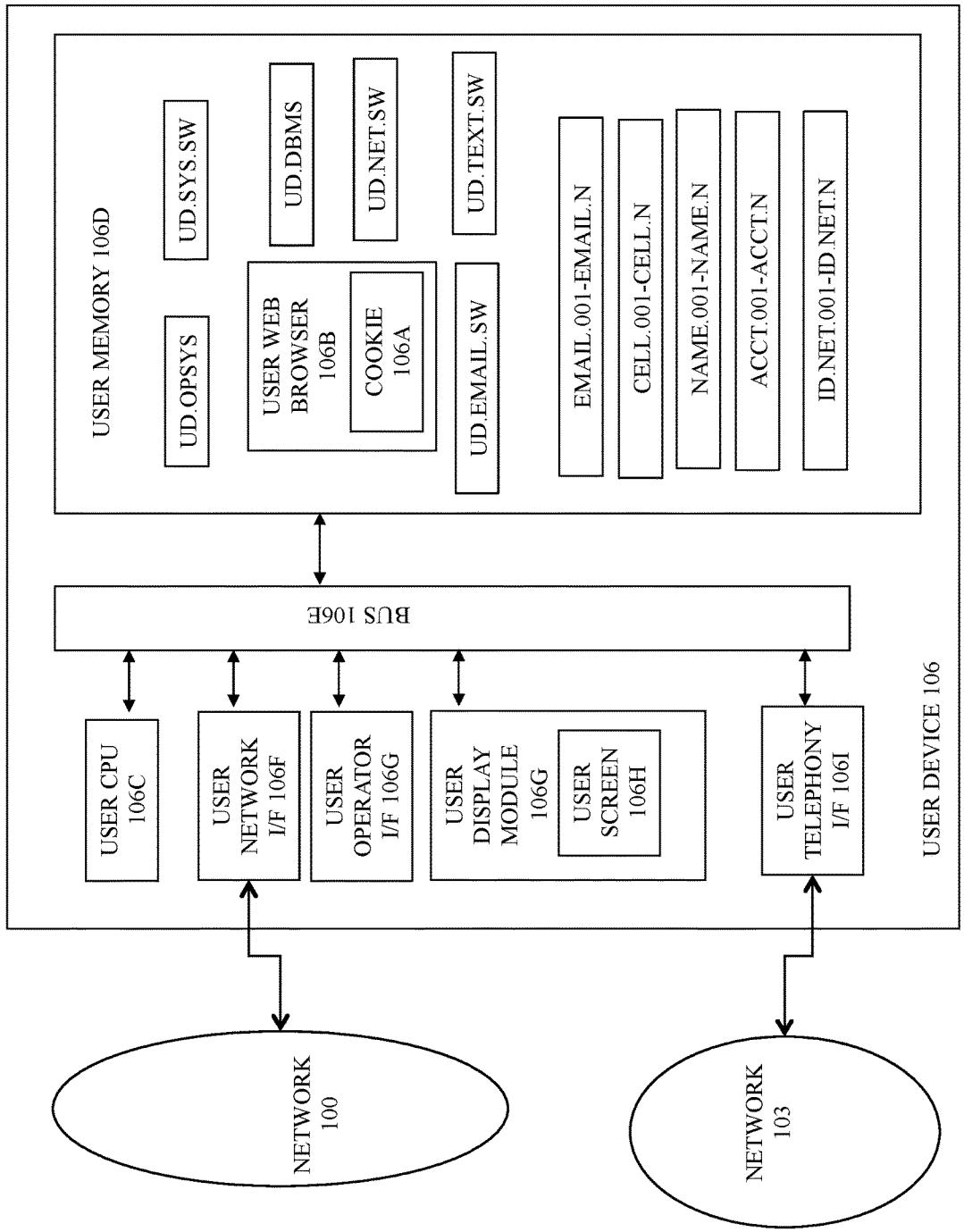
FIG. 25 is a block diagram of the user device of the electronic communications network of FIG. 1.

In step 5.00 the content publisher 108 connects with the network 100. In step 5.02 the content publisher 108 receives a content request message either directly from the user device 106 or from the user device 106 via a web server 104A-104N. In step 5.04 the content publisher 108 generates and formats an exemplary first activity record AREC.001. The content publisher 108 in step 5.06 determines whether the content request message received in step 5.02 includes a persistent online identifier ID.NET.001-ID.NET.N, such as a software cookie 106A that had been previously recorded into a user web browser 106B (as shown in FIG. 25) or other suitable persistent online identifier ID.NET.001-ID.NET.N associated with the user device 104. When the content publisher 108 in step 5.06 does not detect a persistent online identifier ID.NET.001-ID.NET.N in the content request message received in step 5.02, the content publisher 108 proceeds on to step 5.08 and assigns a persistent online identifier ID.NET.001-ID.NET.N to a digitized content. The persistent online identifier ID.NET.001-ID.NET.N detected in step 5.06 or alternatively newly assigned in step 5.08 is written into the first exemplary activity record AREC.001 in step 5.10.

The digitized content is communicated to the user device 106 in step 5.12, with either (a.) the persistent online identifier ID.NET.001-ID.NET.N detected in step 5.06, or (b.) the persistent online identifier ID.NET.001-ID.NET.N assigned in step 5.08.

In step 5.14 the content publisher 108 determines whether the user device 106 has submitted a personally identifying information, e.g., such as an entity name NAME.001-NAME.N, an email address EMAIL.001-EMAIL.N, a cellular phone number CELL.001-CELL.N, account identifier ACCT.001-ACCT.N, an insurance process identifier INS.001, a mobile device identifier MOB.001, or a government issued identifier GOV.001.

When the content publisher 108 detects receipt of a personally identifying information in step 5.14, the content publisher 108 applies the hashing algorithm MD5 to the received personally identifying information in step 5.16 to derive an exemplary first hash HASH.001 (hereinafter, "the first hash" HASH.001) and adds the first hash HASH.001 to the activity record AREC.001-AREC.N in step 5.18.

In step 5.20 the content publisher 108 determines sends the first activity record AREC.001-AREC.N of step 5.04 with the first has HASH.001 to the evaluator system 110. The content publisher 108 next determines in step 5.22 whether to perform another instance of the loop of steps 5.02 through 5.22 to alternatively proceed on to alternate operations in step 5.24.

Referring now generally to the Figures and particularly to FIG. 6A, FIG. 6A is an online activity database record table 600 comprising a subset of information contained within an exemplary first online activity database record AREC.001 of the online activity database ACT.DB of the evaluator system 110. The exemplary first online activity database record AREC.001 (hereinafter, "the first activity record" AREC.001, preferably includes a first activity record identifier AREC.ID.001 that uniquely identifies the first activity record AREC.001 within the online activity database ACT.DB. The first activity record AREC.001 preferably further includes a first hash HASH.001 of a personally identifiable information, e.g., the first network identifier ID.NET.001, that is acquired or observed by at least one of the plurality of webservers 104A-104N, one more content publishers 108, one or more aggregators 109, and/or one or more of the plurality of point of sales system POS 112A-112N. For the sake of clarity of explanation, the present disclosure shall explicate the case where the first hash HASH.001 is equal to and represents the first distinguishable instances personally identifiable information.

The first activity record AREC.001 still further preferably includes information that documents activity within the network associated with the first hash HASH.001, wherein such information may include domain names visited in browsing sessions, user behavior within websites, search engine tasking and URI's addressed and applied for access to information.

For example, a first activity data field set DFS.001 of the first activity record AREC.001 includes a first URI address URI.001 that indicates a first Universal Resource Indicator that was visited and a most recent activity time and date ATDS.001 that this first Universal Resource Indicator was accessed; a second activity data field set DFS.002 of the first activity record AREC.001 includes a second URI address URI.002 that is a domain name of a website that was visited and a second date time stamp ATDS.002 of a most recent activity time and date that this website was accessed; a third activity data field set DFS.003 of the first activity record AREC.001 documents user behavior within a website and optionally includes a behavior date time stamp ATDS.003 of a most recent activity time and date that this website behavior was observed; and a fourth activity data field set DFS.004 of the first activity record AREC.001 includes plurality of keyword submitted for search requests to a search engine and a most recent search activity time and date ATDS.004 that this search was tasked with the indicated keywords. It is understood that one or more online activity database records AREC.001-AREC.N may contain other recordations of user interaction with the network associable with one or more persistent online identifiers ID.NET.001-ID.NET.N.

Figure 7A:
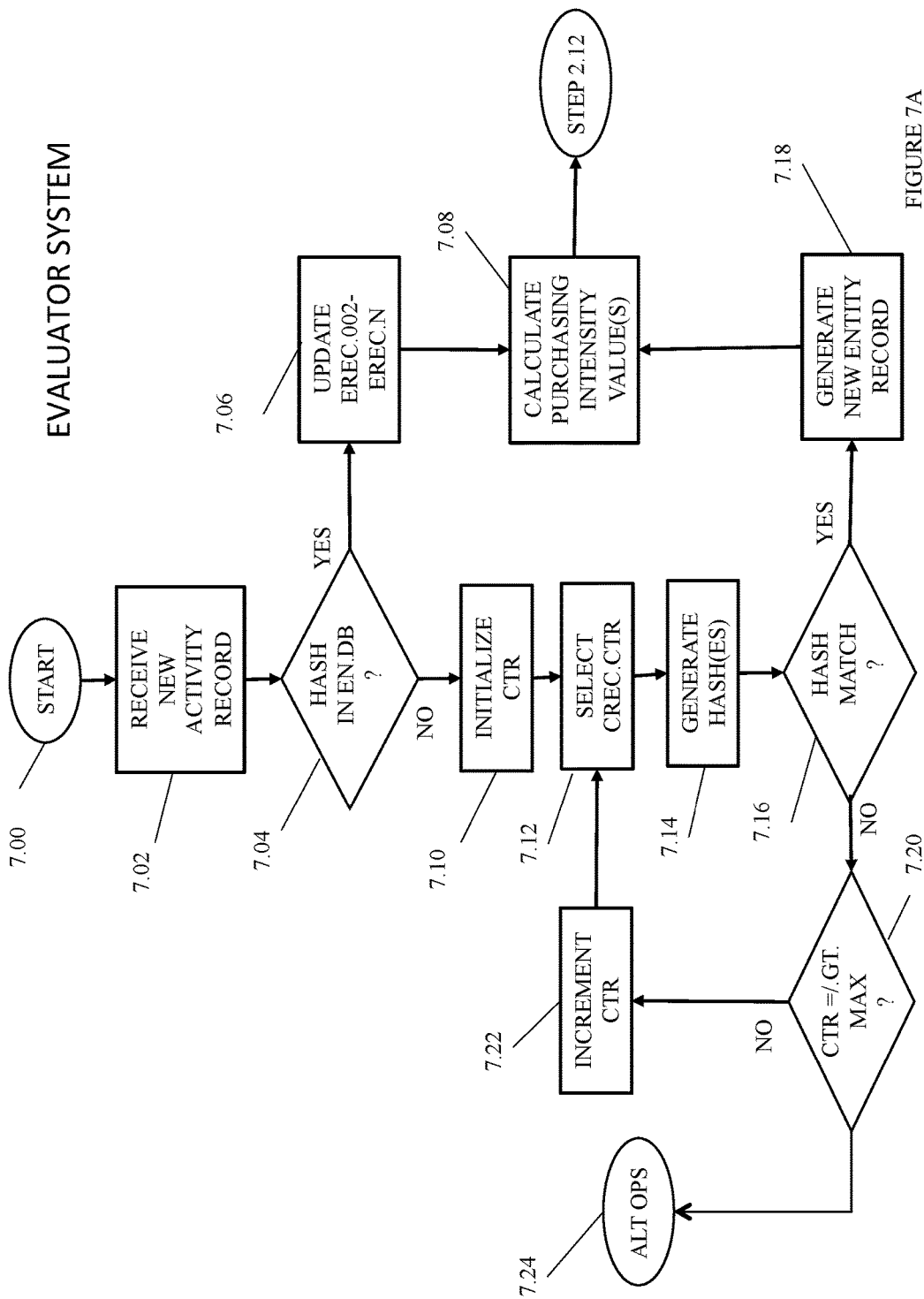
FIG. 7A is a flowchart of the generation of a first exemplary entity record by the evaluator system of FIG. 3.

Referring now generally to the Figures and particularly to FIG. 6B, FIG. 6B is an online activity database table 602 comprising a plurality of online activity database records AREC.001-AREC.N of the online activity database ACT.DB of which the first activity record AREC.001 is an example. In a plurality of the online activity database records AREC.001-AREC.N includes a HASH.001-HASH.N that is observed as a persistent online identifiers ID.NET.001-ID.NET.N by one or more of the plurality of webservers 104A-104N, one more content publishers 108, one or more aggregators 109, and/or one or more of the plurality of point of sales system POS 112A-112N Referring now generally to the Figures and particularly to FIG. 7A, FIG. 7A is a flowchart of the generation of a first exemplary entity record EREC.001 by the evaluator system 110. In the interest of clarity of explanation, the method of FIG. 7A will be discussed in reference to a first activity record AREC.001 and a first consumer record CREC.001 in generating a first entity record EREC.001. It is understood that the method of FIG. 7A may be applied to the plurality of activity records AREC.001-AREC.N and the plurality of consumer records CREC.001-CREC.N to generate the plurality of entity records EREC.001-EREC.N.

In step 7.00 the evaluator system 110 connects to the network 100 and receives the first activity record AREC.001 containing the first hash HASH.001 in step 7.02. The evaluator system 110 determines in step 7.04 whether the first hash HASH.001 is already recorded in an existing entity record EREC.002-EREC.N. When the evaluator system 110 determines in step 7.04 that the first hash HASH.001 is already recorded in an existing entity record EREC.002-EREC.N, the evaluator system 110 proceeds on to step 7.06 and adds the first activity record identifier AREC.ID.001 to the entity record EREC.002-EREC.N that already contains the first hash HASH.001, and the evaluator system 110 thereupon proceeds on to step 7.08 to newly calculate one or more purchasing intensity values from the information associated by the entity record EREC.002-EREC.N comprising the first hash HASH.001.

When the evaluator system 110 determines in step 7.04 that the first hash HASH.001 is not recorded in an existing entity record EREC.002-EREC.N, the evaluator system 110 initializes a counter value CTR in step 7.10 begins selecting counter records CREC.001-CREC.N in succeeding instantiations of steps 7.12 and steps 7.14. In step 7.12 the evaluator system 110 selects a consumer record CREC.CTR and applies the hash algorithm of step 5.16 to each personally identifying information detected in the consumer record CREC.CTR selected in the most recent execution of step 7.12. When the evaluator system 110 in step 7.16 finds a match of a hash generated in the most recent execution of step 7.14 with the first hash HASH.001, the evaluator system 110 proceeds on to step 7.18 and generate the first entity record EREC.001. Given that in the explanatory example of the generation of the first entity record EREC.001, it is understood that a hash of the first email address EMAIL.001 of the first consumer record CREC.001 matches the first hash HASH.001, in step 7.18 the evaluator system 110 populates the first entity record EREC.001 with the first hash HASH.001, the first consumer record identifier CREC.ID.001, first activity record identifier AREC.ID.001, the first consumer location LOC.001 harvested from the first consumer record CREC.001, and optionally additional information harvested from the first consumer record CREC.001 and the first activity record AREC.001. Optionally, the first entity record EREC.001 may be populated to include or reference additional information harvested from any other activity records AREC.001 that reference or include (a.) the first hash HASH.001, or (b.) any online identifier ID.NET.001-ID.NET.N that included in or is referenced by the first activity record AREC.001.

When the evaluator system 110 in step 7.16 fails to find a match of any hash generated in the most recent execution of step 7.14, the evaluator system 110 proceeds on to step 7.20 to determine if the counter value CTR has reached or exceeded a maximum counter value MAX that indicates that all of the plurality of consumer records CREC.001-CREC.N have been processed in an instantiation of step 7.14.

When the evaluator system 110 determines in step 7.20 that the counter value CTR has not reached or exceeded the maximum value MAX, the evaluator system 110 proceeds on to step 7.22 and increments the counter value CTR. The evaluator system 110 proceeds from step 7.22 to an additional execution of step 7.12. Alternatively, the evaluator system 110 proceeds from step 7.20 to step 7.24 when the evaluator system 110 determines in step 7.20 that the counter value CTR has reached or exceeded the maximum value MAX and to perform alternate operations of step 7.24.

Figure 7B:
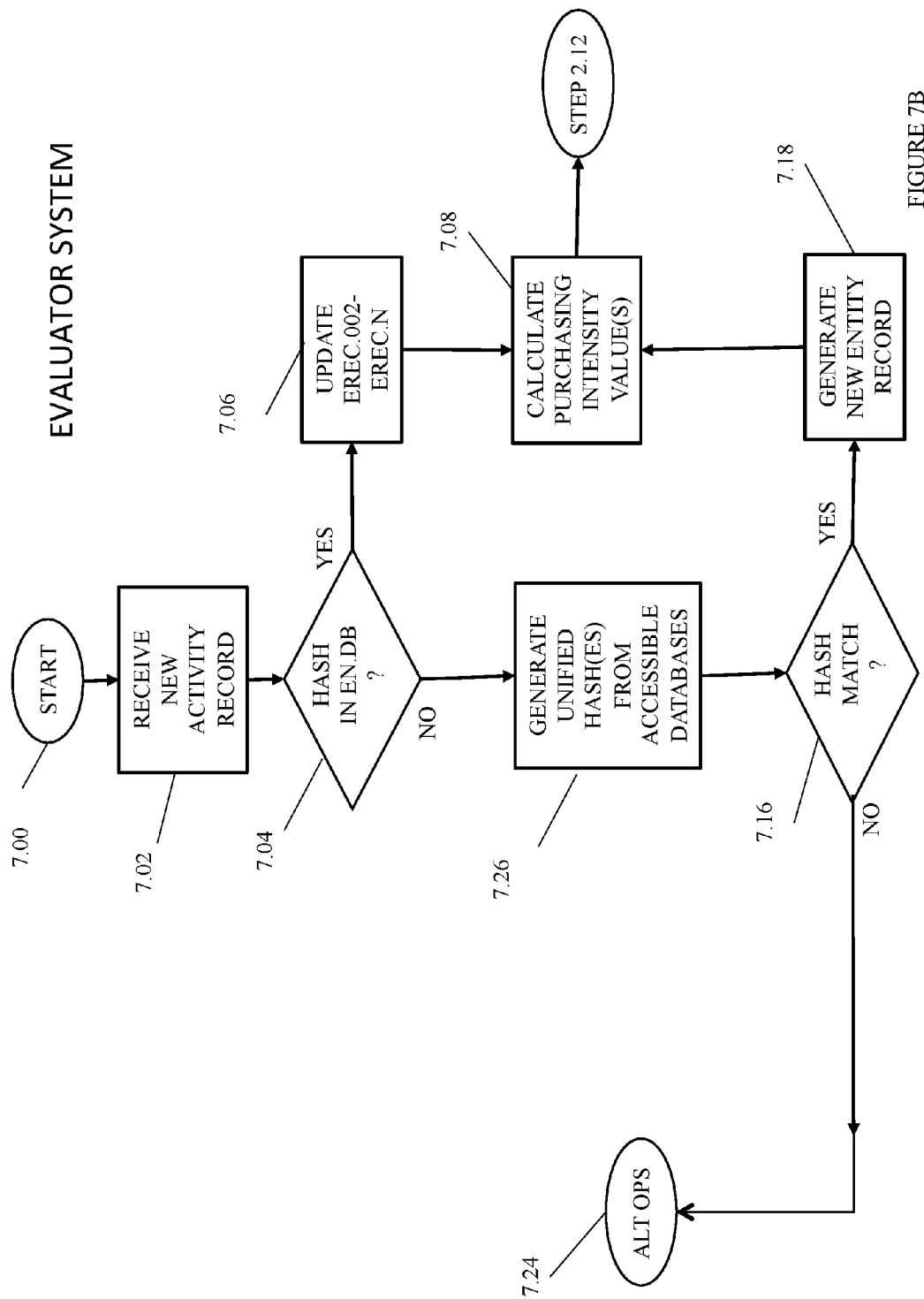
FIG. 7B is a flowchart of an alternate method of correlating newly received hashes of personally identifying information with a volume of information accessible via the entity database of FIG. 3 and the generation of entity record by the evaluator system of FIG. 3.

Referring now generally to the Figures and particularly to FIG. 7B, FIG. 7B is a flowchart of an alternate method of correlating hashes of personally identifying information with an information accessible via the entity database EN.DB and the generation of entity record EREC.001-EREC.N by the evaluator system of FIG. 3. In step 7.04 when a previously received hash is not detected in a newly received activity record AREC.001-ACRE.N, the evaluator system 110 proceeds onto step 2.26 and to apply the hashing software HASW. SW to generate a database hash DBHASH from the some or all of the body of information included in or referenced by the entity database EN.DB, to include but not limited to the information contained in the consumer record database CON.DB, the consumer information records CREC.001-CREC.N, the activity database ACT.DB, and/or the activity records AREC.001-AREC.N. It is understood that the database hash DBHASH but is rather a hash of a volume of information sourced from one or more databases. It is understood that the database hash DBHASH may have been previously generated before a particular execution of step 7.26 whereby the previously stored database hash DBHASH is accessed by the evaluator system 110 an compared for hash matches in instant execution of step 7.16

When a hash match is found in step 7.16 between the hash HASH.001-HASH.N received in step 7.02 and the database hash DBHASH generated in step 7.26, the evaluator system 110 proceeds on from step 7.16 to step 7.18 and to generate a new entity record EREC.001-EREC.N. In the alternative, when a hash match is not found in step 7.16 between the hash HASH.001-HASH.N received in step 7.02 and the database hash DBHASH generated in step 7.26, the evaluator system 110 proceeds on from step 7.16 to step 7.18 and to generate a new entity record EREC.001-EREC.N.

Referring now generally to the Figures and particularly to FIG. 8A, FIG. 8A is an entity database table 800 comprising a subset of information contained within a first exemplary entity database record EREC.001 of the entity database EN.DB. The first exemplary entity database record EREC.001 (hereinafter, "the first entity record" EREC.001") includes a first entity record identifier EREC.ID.001, the first hash HASH.001, the first consumer record identifier CREC.ID.001 and the first activity record identifier AREC.ID.001 and thereby indicates that the information of the first consumer record CREC.001 and the first activity record AREC.001 are associated with the same first entity. The entity identified by first email address EMAIL.001 the first consumer record CREC.001 is further associated with the first geographic location identifier LOC.001, wherein the first geographic location identifier LOC.001 indicates a primary locus of presence of the first entity, such as a domicile of the entity is a natural born person, or a leading operations station if the first entity is a venture or business operation. It is further understood that one or more of the plurality of entity database records EREC.001-EREC.N may associate one or more consumer records CREC.001-CREC.001 with one or more activity records AREC.001-AREC.N whereby a same entity may be associated with one or more hashes HASH.001-HASH.N of personally identifiable information.

Referring now generally to the Figures and particularly to FIG. 8B, FIG. 8B is an entity database table 802 comprising a plurality of entity database records EREC.001-EREC.N of the entity database EN.DB of which the first entity record EREC.001 is an example. Each entity database record EREC.001-EREC.N includes a unique entity record identifier EREC.ID.001-EREC.ID.N and preferably associates at least one consumer record CREC.001-CREC.N with at least one activity record AREC.001-AREC.N, and with a unique hash HASH.001-HASH.N, wherein each unique hash HASH.001-HASH.N is observed by at least one of the plurality of webservers 104A-104N, one more content publishers 108, one or more aggregators 109, and/or one or more of the plurality of point of sales system POS 112A-112N to be a persistent online identifier ID.NET.001-ID.NET.N.

Referring now generally to the Figures and particularly to FIG. 9A through FIG. 9E, FIG. 9A through FIG. 9E each formula database record tables comprising a subset of information contained within a particular formula database record of the multivariate formula database MVF.DB of the evaluator system 110.

FIG. 9A is a first formula database record table 900 comprising a subset of information contained within a first exemplary formula database record FREC.001 of the multivariate formula database MVF.DB. The first exemplary formula database record FREC.001 includes a first formula record identifier FREC.ID.001, a first formula identifier IFRM.ID.001, a first product identifier PROD.ID.001, and the first multivariate formula FORM.001. The first multivariate formula FORM.001 is adapted to derive from data associated with an entity record EREC.001-EREC.N an intensity value that indicates an intensity and urgency of an intent by an entity identified in the selected entity record EREC.001-EREC.N to purchase the first product identified by the first product identifier PROD.ID.001. The first exemplary formula database record FREC.001 further includes individual criteria CRIT.001, CRIT.843, & CRIT.967 of information that may be contained in consumer records CREC.001-CREC.N or activity records AREC.001-AREC.N. Each individual criteria CRIT.001, CRIT.843, & CRIT.967 is associated with a mathematical function operator OP.001, OP.843 & OP.967, wherein each paired mathematical function operator OP.001, OP.843 & OP.967 is separately applied to information associated with a selected EREC.001-EREC.N and matching a criteria CRIT.001, CRIT.843, & CRIT.967, and the results of these operations may be summed to generate an intensity value that indicates an intensity and urgency of an intent by an entity identified in the selected entity record EREC.001-EREC.N to purchase the first product identified by the first product identifier PROD.ID.001.

FIG. 9B is a second formula database record table 902 comprising a subset of information contained within a second exemplary formula database record FREC.002 of the multivariate formula database MVF.DB. The second exemplary formula database record FREC.002 includes a second formula record identifier FREC.ID.002, a second formula identifier IFRM.ID.002 and a second product type identifier PRODT.ID.001, and a second multivariate formula FORM.002. The second multivariate formula FORM.002 is adapted to derive from data associated with an entity record EREC.001-EREC.N an intensity value that indicates an intensity and urgency of an intent by an entity identified in the selected entity record EREC.001-EREC.N to purchase the second product type identified by the second product identifier PROD.ID.001. The second exemplary formula database record FREC.002 further includes individual criteria CRIT.589, CRIT.826, & CRIT.594 of information that may be contained in consumer records CREC.001-CREC.N or activity records AREC.001-AREC.N. Each individual criteria CRIT.589, CRIT.826, & CRIT.594 is associated with a mathematical function operator OP.589, OP.826 & OP.594, wherein each paired mathematical function operator OP.589, OP.826 & OP.594 is separately applied to information associated with a selected entity record EREC.001-EREC.N and matching a criteria CRIT.589, CRIT.826, & CRIT.594, and the results of these operations may be summed to generate an intensity value that indicates an intensity and urgency of an intent by an entity identified in the selected entity record EREC.001-EREC.N to purchase the second product identified by the second product type identifier PROD.ID.002.

FIG. 9C is a third formula database record table 904 comprising a subset of information contained within a third exemplary formula database record FREC.003 of the multivariate formula database MVF.DB. The third exemplary formula database record FREC.003 includes a third formula record identifier FREC.ID.003, a third formula identifier IFRM.ID.003 and a third service identifier SERV.ID.003, and the third multivariate formula FORM.003. The third multivariate formula FORM.003 is adapted to derive from data associated with an entity record EREC.001-EREC.N an intensity value that indicates an intensity and urgency of an intent by an entity identified in the selected entity record EREC.001-EREC.N to purchase the third service identified by the third service identifier SERV.ID.003. The third exemplary formula database record FREC.003 further includes individual criteria CRIT.583, CRIT.921, & CRIT.563 of information that may be contained in consumer records CREC.001-CREC.N or activity records AREC.001-AREC.N. Each individual criteria CRIT.583, CRIT.921, & CRIT.563 is associated with a mathematical function operator OP.583, OP.921 & OP.563, wherein each paired mathematical function operator OP.589, OP.921 & OP.563 is separately applied to information associated with a selected EREC.001-EREC.N and matching a criteria CRIT.583, CRIT.921, & CRIT.563, and the results of these operations may be summed to generate an intensity value that indicates an intensity and urgency of an intent by an entity identified in the selected entity record EREC.001-EREC.N to purchase the third service identified by the third service identifier SERV.ID.003.

FIG. 9D is a fourth formula database record table 906 comprising a subset of information contained within a fourth exemplary formula database record FREC.004 of the multivariate formula database MVF.DB. The fourth exemplary formula database record FREC.004 includes a fourth formula record identifier FREC.ID.004, a fourth formula identifier IFRM.ID.004 and a fourth service type identifier SERVT.ID.004, and the fourth multivariate formula FORM.004. The fourth multivariate formula FORM.004 is adapted to derive from data associated with an entity record EREC.001-EREC.N an intensity value that indicates an intensity and urgency of an intent by an entity identified in the selected entity record EREC.001-EREC.N to purchase the fourth service type identified by the fourth service type identifier SERVT.ID.004. The fourth exemplary formula database record FREC.004 further includes individual criteria CRIT.615, CRIT.358 & CRIT.227 of information that may be contained in consumer records CREC.001-CREC.N or activity records AREC.001-AREC.N. Each individual criteria CRIT.615, CRIT.358 & CRIT.227 is associated with a mathematical function operator OP.615, OP.358 & OP.227, wherein each paired mathematical function operator OP.615, OP.358 & OP.227 is separately applied to information associated with a selected EREC.001-EREC.N and matching a criteria CRIT.615, CRIT.358 & CRIT.227, and the results of these operations may be summed to generate an intensity value that indicates an intensity and urgency of an intent by an entity identified in the selected entity record EREC.001-EREC.N to purchase the fourth service type identified by the fourth service type identifier SERVT.ID.004.

FIG. 9E is a fifth formula database record table 908 comprising a subset of information contained within a fifth exemplary formula database record FREC.005 of the multivariate formula database MVF.DB. The fifth exemplary formula database record FREC.005 includes a fifth formula record identifier FREC.ID.005, a fifth formula identifier IFRM.ID.005 and a fifth brand identifier BRND.ID.005, and the fifth multivariate formula FORM.005. The fifth multivariate formula FORM.005 is adapted to derive from data associated with an entity record EREC.001-EREC.N an intensity value that indicates an intensity and urgency of an intent by an entity identified in the selected entity record EREC.001-EREC.N to purchase the fifth brand identified by the fifth brand identifier BRND.ID.005. The fifth exemplary formula database record FREC.005 further includes individual criteria CRIT.593, CRIT.696 & CRIT.178 of information that may be contained in consumer records CREC.001-CREC.N or activity records AREC.001-AREC.N. Each individual criteria CRIT.593, CRIT.696 & CRIT.178 is associated with a mathematical function operator OP.593, OP.696 & OP.178, wherein each paired mathematical function operator OP.593, OP.696 & OP.178 is separately applied to information associated with a selected EREC.001-EREC.N and matching a criteria CRIT.593, CRIT.696 & CRIT.178, and the results of these operations may be summed to generate an intensity value that indicates an intensity and urgency of an intent by an entity identified in the selected entity record EREC.001-EREC.N to purchase the fifth brand identified by the fifth brand identifier BRND.ID.005.

FIG. 9F is a formula database table 910 comprising a plurality of formula database records FREC.001-FREC.N of the multivariate formula database MVF.DB.

Figure 10:
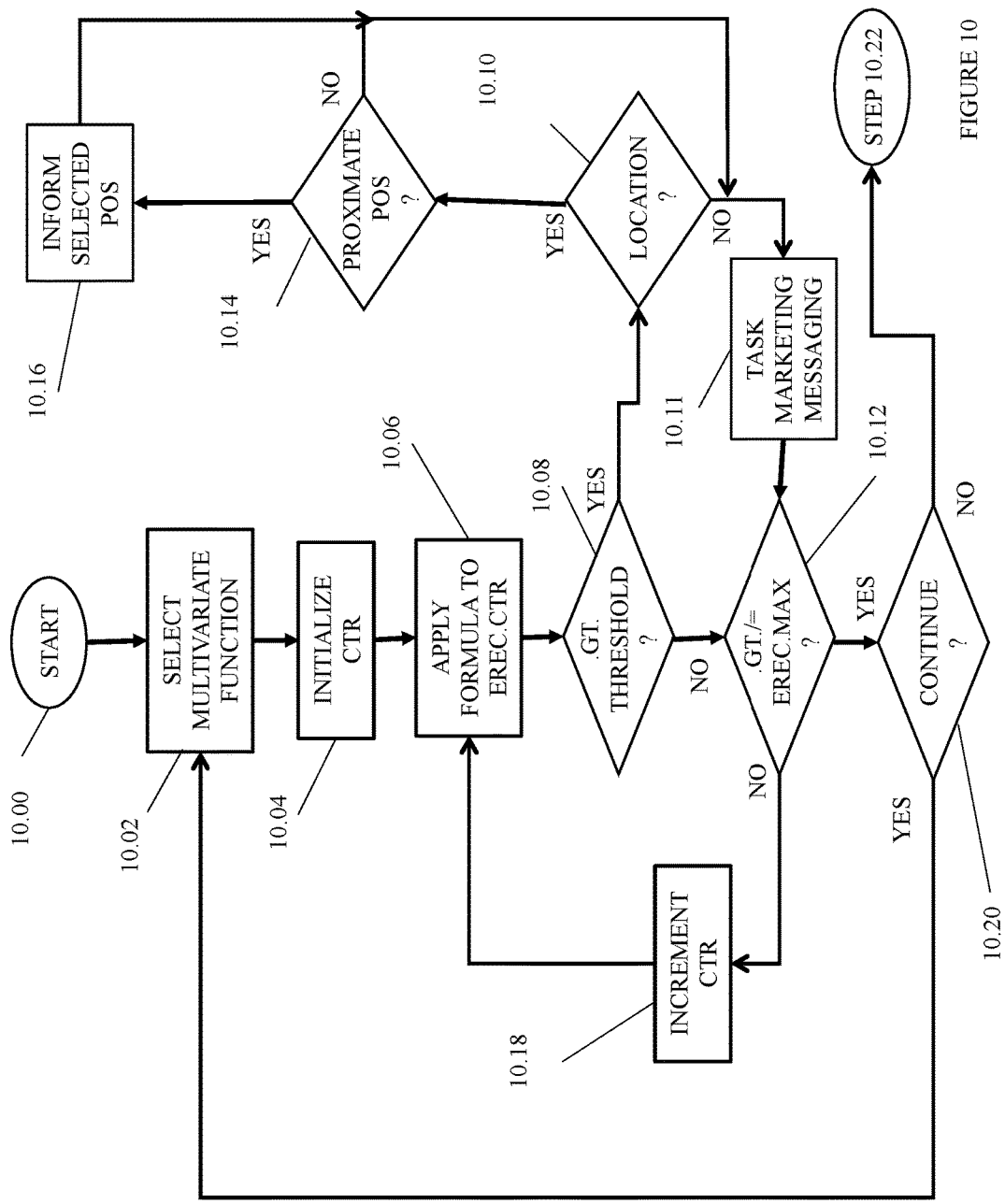
FIG. 10 is a flowchart of a generation of a purchasing intensity value by the evaluator system of FIG. 3 by application of a formula selected from the formula database of FIG. 9B in view of an entity record selected from the entity record database of FIG. 8B.

Referring now generally to the Figures and particularly FIG. 10, FIG. 10 is a flowchart of a generation of a purchasing intensity value by the evaluator system 110 by application of a formula FORM.001-FORM.N selected from the multivariate formula database MVF.DB in view of an entity record EREC.001-EREC.N selected from the entity record database EN.DB. In step 10.00 the system software SYS.SW directs the evaluator system 110 to access the multivariate formula database MVF.DB and in step 10.02 an individual formula FORM.001-FORM.N is selected from the multivariate formula database MVF.DB and in step 10.04 a loop counter CTR is initialized to a null value. The selected individual formula FORM.001-FORM.N is separately applied to each entity record EREC.001-EREC.N in multiple executions of step 10.06 in the loop of step 10.06 through step 10.14. In step 10.08 each resultant purchasing intention value of each application of the selected individual formula FORM.001-FORM.N to a unique entity record EREC.001-EREC.N of step 10.06 is evaluated with a threshold purchasing intensity value. When the resultant purchasing intention value of an application of the selected individual formula FORM.001-FORM.N to a unique entity record EREC.001-EREC.N of step 10.06 is evaluated to be greater than or equal to a threshold purchasing intensity value in step 10.08, the evaluator system 110 proceeds to step 10.10.

The evaluator system 110 determines in step 10.10 if an indication of geographic location is either directly or indirectly associated with the currently examined entity record EREC.001-EREC.N. If no geographic association is found in step 10.10, the evaluator system 110 optionally performs step 10.11 proceeds to distribute marketing information to one or more postal or electronic addresses referenced by or included in the instant entity record EREC.CTER. Alternatively or additionally the evaluator system proceeds from step 10.10 or step 10.11 and returns to step 10.12.

In the alternative, when a geographic association is found in step 10.10 the evaluator system 110 proceeds on to step 10.14 and determines whether one or more point of sale systems 112A-112N is associated with a point of sale location that is sufficiently proximate to the geographic location discovered in step 10.10. When the evaluator system 110 determines in step 10.14 that one or more point of sale systems 112A-112N is associated with a point of sale location that is sufficiently proximate to the geographic location discovered in step 10.10, the evaluator system 110 in step 10.16 informs the selected point of sale systems 112A-112N of the finding of a sales prospect exhibiting behavior indicative of a purchasing intent of the selected product or service by product name, product type or brand, and optionally provides one or more selected point of sale systems 112A-112N with one or more personally identifying information associated with the currently examined entity record EREC.001-EREC.N.

The evaluator system 110 proceeds from either step 10.10 or step 10.16 and to execute step 10.12 and to determine if the counter value CTR has achieved a maximum value count of entity records EREC.001-EREC.N. When the evaluator system 110 determines in step 10.12 that the counter value CTR has not achieved a maximum value count of entity records EREC.001-EREC.N, the evaluator system 110 proceeds from step 10.12 to step 10.18 and increments the counter value CTR. The evaluator system 110 proceeds from 10.18 to another instantiation of step 10.06.

In the alternative, when the evaluator system 110 determines in step 10.12 that the counter value CTR has achieved a maximum value count of entity records EREC.001-EREC.N, the evaluator system 110 proceeds from step 10.12 to step 10.20 and determine whether to select and apply an alternate multivariate formula database MVF.DB in an additional instantiation the loop of steps 10.02 through step 10.18. In the alternative, the evaluator system 110 may determine to proceed in step 10.20 to step 10.22 and to perform alternate computational operations.

Figure 11:
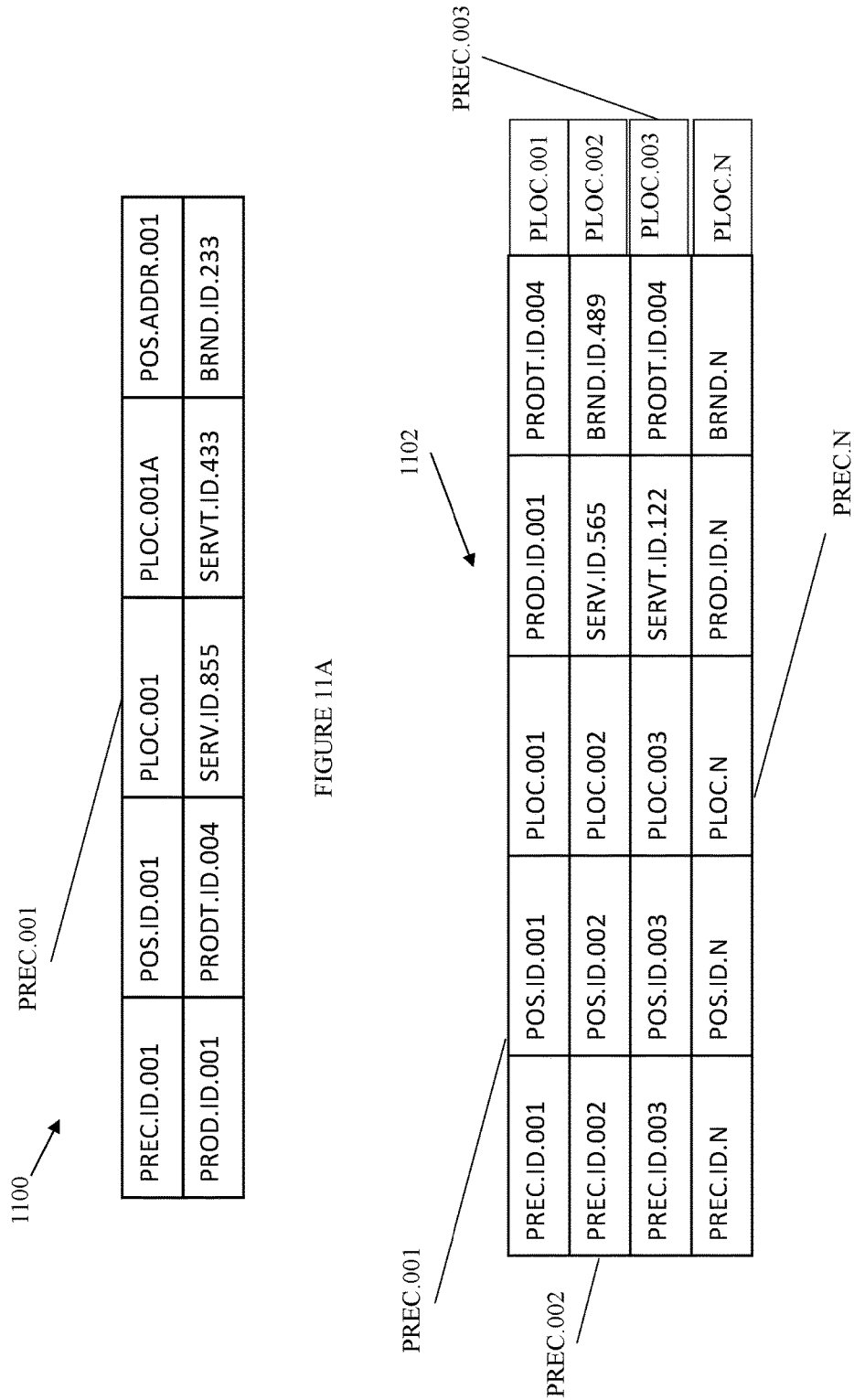
FIG. 11A is a first exemplary point of sale database record table comprising a subset of information contained within a first exemplary point of sale agent record of the POS database of the evaluator system of FIG. 3.
FIG. 11B is a point of sale database table comprising a plurality of point of sale database records of the point of sale database of the evaluator system of FIG. 3 and the first exemplary point of sale database record of FIG. 11A.

FIG. 11A is a first exemplary point of sale database record table 1100 comprising a subset of information contained within a first exemplary point of sale agent record PREC.001 of the point of sale database POS.DB (hereinafter, "the POS database" POS.DB). The first exemplary point of sale agent record PREC.001 includes a first point of sale record identifier PREC.ID.001, a first POS location data PLOC.001, an alternate POS location data PLOC.001A, and a POS network address POS.ADDR.001. The POS network address POS.ADDR.001 is a network address at which the first POS system 112A may be accessed. The first POS location data PLOC.001 identifies a first geographic point of sales location and the alternate POS location data PLOC.001A identifies a second geographic point of sales location. The first point of sale record identifier PREC.ID.001 uniquely identifies the first exemplary point of sale agent record PREC.001 within the POS database POS.DB. The first exemplary point of sale agent record PREC.001 optionally further includes one or more identifiers of products, types of products, services, types of services and brands that are available for sale at the geographic location identified by the first POS location data PLOC.001 and/or at the alternate geographic location identified by the alternate POS location data PLOC.001A. The first exemplary point of sale agent record PREC.001 further includes the first product identifier PROD.ID.001, a fourth product type identifier PROD-T.ID.004 that identifies a fourth product type, an $855^{th}$ service identifier SERV.ID.855 that identifies an $855^{th}$ service, a $433^{rd}$ service type identifier SERVT.ID.433 that identifies a $433^{rd}$ service type, and a $233^{rd}$ brand identifier BRND.ID.233 that identifies a $233^{rd}$ brand.

FIG. 11B is a point of sale database table 1102 comprising a plurality of point of sale database records PREC.001-PREC.N of the POS database POS.DB of the evaluator system 110.

Figure 12:
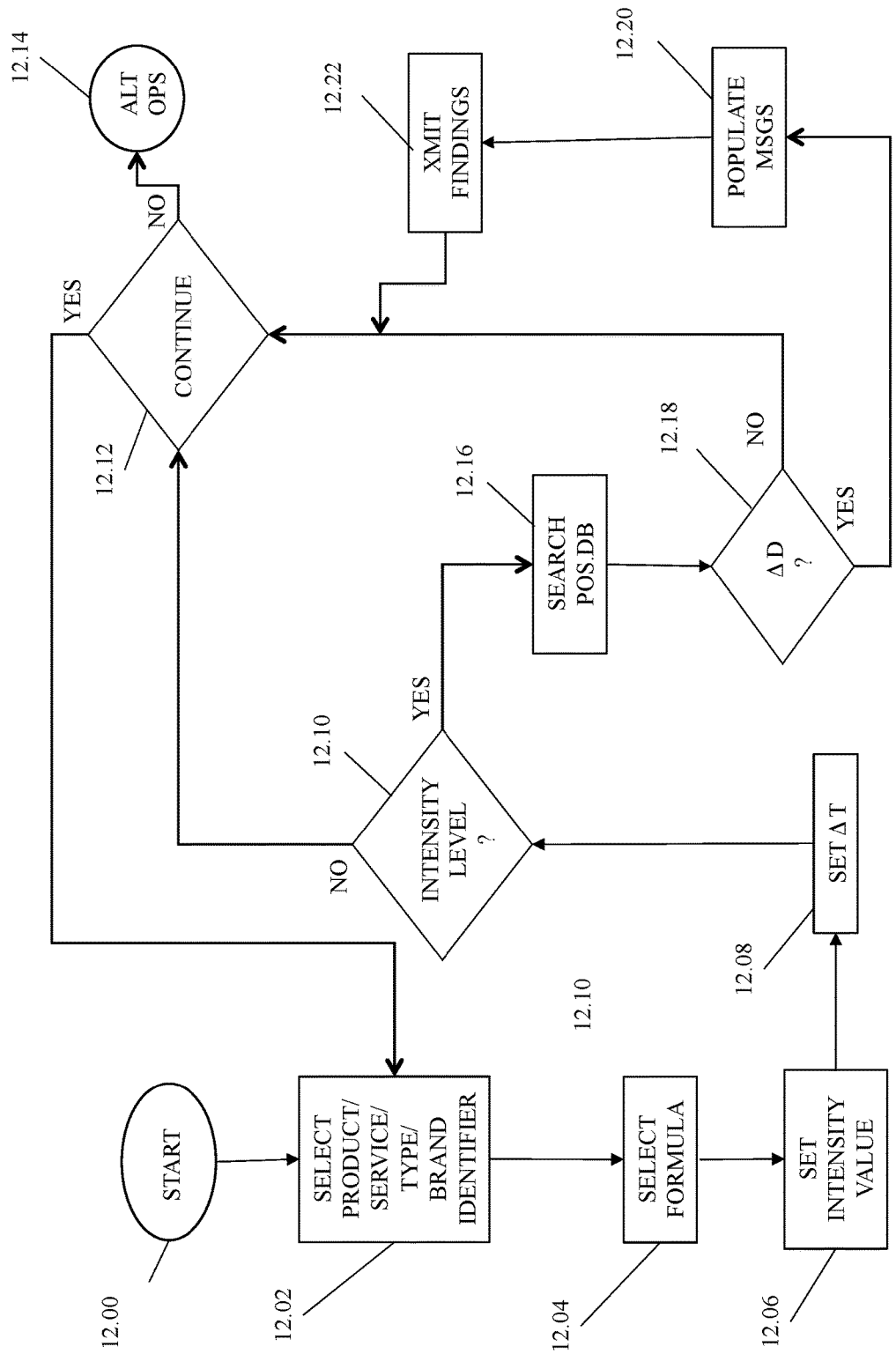
FIG. 12 is a flowchart of the evaluator system of FIG. 3 in generating purchasing intensity values without necessity of a query message from a point of sale agent.

FIG. 12 is a flowchart of the evaluator system 110 in generating purchasing intensity values without necessity of receipt of a query message from a POS system POS 112A-112N. In step 12.00 the evaluator system operating system OPSYS launches the system software SYS.SW and the system software SYS.SW directs the evaluator system 110 in step 12.02 to select an item identifier, e.g., product identifier PROD.ID.001-PROD.ID.N, product type identifier PROD-T.ID.001-PRODT.ID.N, a service identifier SERV.ID.001-SERV.ID.N, a service type identifier SERVT.ID.001-SERVT.ID.N, or a brand identifier BRND.ID.001-BRND.ID.N. The evaluator system 110 selects a multivariate formula FORM.001-FORM.N corresponding to the item identifier selected in step 12.02. In step 12.06 the evaluator system 110 receives, determines or selects a threshold intensity value to be applied in step 12.12. In optional step 12.08 a time length value ΔT is received or set by the evaluator system 110 that may be applied to by the evaluator system 110 in the method of FIG. 12 to disregard information associated with an entity record EREC.001-EREC.N that is associated with a time date stamp TDS.001-TDS.N that indicates a time less recent than a current time date value than the time length value ΔT.

In step 12.10 the evaluator system 110 searches the entity records EREC.001-EREC.N of the entity data base EN.DB and applies the multivariate formula FORM.001-FORM.N selected in step 12.04 to each entity records EREC.001-EREC.N. When no purchasing intensity value is generated in step 12.12 that exceeds the threshold intensity value of step 12.06, the evaluator system 110 proceeds from step 12.12 and to step 12.14. In step 12.14 the evaluator system determines whether it is directed by user command or the system software SYS.SW to return to another execution of step 12.02 or to proceed on to alternate operations of step 12.16.

When at least one purchasing intensity value is generated in step 12.12 that exceeds the threshold intensity value of step 12.06, the evaluator system 110 proceeds from step 12.12 to step 12.18 and to search the POS database POS.DB for point of sale records PREC.001-PREC.N that include a POS location data PLOC.001-PLOC.N that is determined to indicate a geographic location that is closer than a maximum displacement value ΔD from a geographic location indicated by a geographic location identifier LOC.001-LOC.N of an entity record EREC.001-EREC.N selected in step 12.12 from which a purchasing intensity value is derived that is greater than the threshold value of step 12.06.

It is understood that the displacement value ΔD may be generated by application of the mapping web service of the mapping system 114. It is further understood that the displacement value ΔD may be expressed as estimated travel distance by known roads and common travel routes, as estimated travel time by known roads and common travel routes, as an average travel time by known roads and common travel routes, or other suitable parameters of travel time or transportation convenience known in the art and estimated to be found between a geographic location identifier LOC.001-LOC.N of an entity record EREC.001-EREC.N examined in step 12.18 and a POS location value PLOC.001-PLOC.N of a POS record PREC.001-PREC.N selected in step 12.18.

If no POS record PREC.001-PREC.N is found in step 12.20 that contains a POS location value PLOC.001-PLOC.N that meets the distance variance criteria of step 12.20, the evaluator 110 proceeds from step 12.20 to step 12.14. In step 12.22 the evaluator system 110 formats and populates one or more messages PMSG.001-PMSG.N individually addressed to POS systems 112A-112N. In step 12.24 the one or more messages PMSG.001-PMSG.N generated in step 12.22 are communicated via the network 100 to the POS systems 112A-112N noted as addressees in the one or more messages PMSG.001-PMSG.N.

Figure 13:
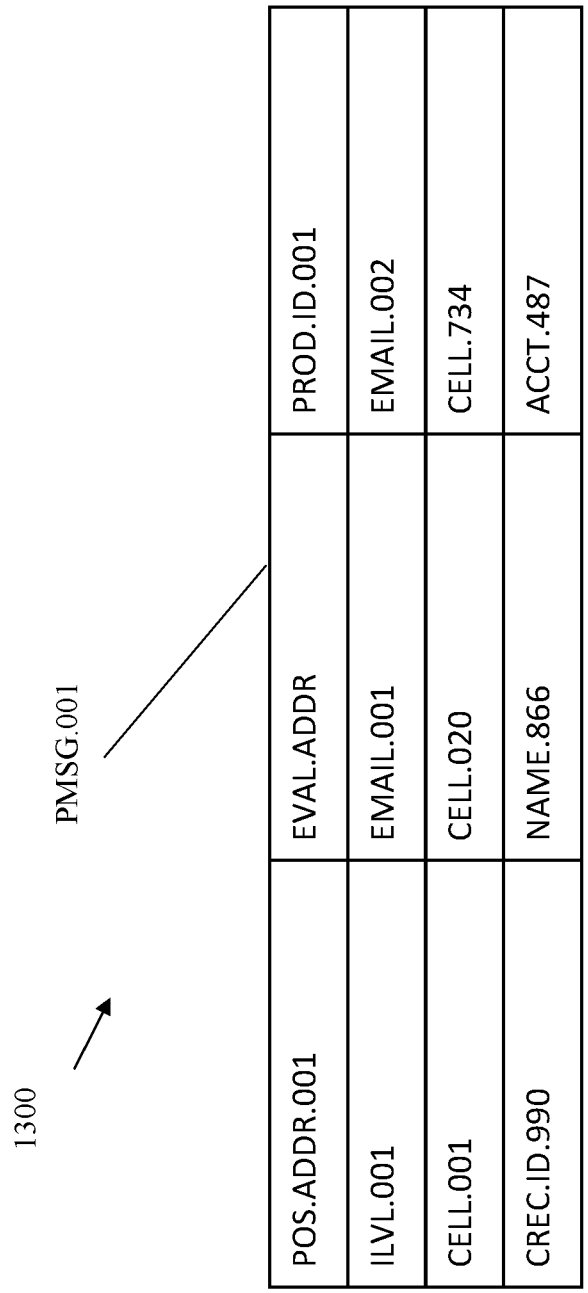
FIG. 13 is a representation of aspects of a first exemplary purchasing intensity value message as sent from the evaluator system of FIG. 3.

FIG. 13 is a message table 1300 showing aspects of a first exemplary purchasing intensity value message PMSG.001 as sent from the evaluator system 110 to a POS system 112A-112N. The first exemplary purchasing intensity value message PMSG.001 includes a first POS network address POS.ADDR.001 of the first POS system 112A as the destination address; an evaluator network address EVAL.ADDR of the evaluator system as the sender address, the first product identifier PROD.ID.001, optionally the intensity threshold level of step 12.06, and a plurality of personally identifying information of potential customers as extracted from information associated with an entity record EREC.001-EREC.N. The personally identifying information of the first exemplary purchasing intensity value message PMSG.001 includes email addresses EMAIL.001 & EMIL.002, cellular telephone numbers CELL.001, CELL.020 & CELL.734, a 990$^{th}$ consumer record identifier CREC.ID.990, a 866$^{th}$ legal name NAME.886, and a 487$^{th}$ account identifier ACCT.487.

Figure 14:
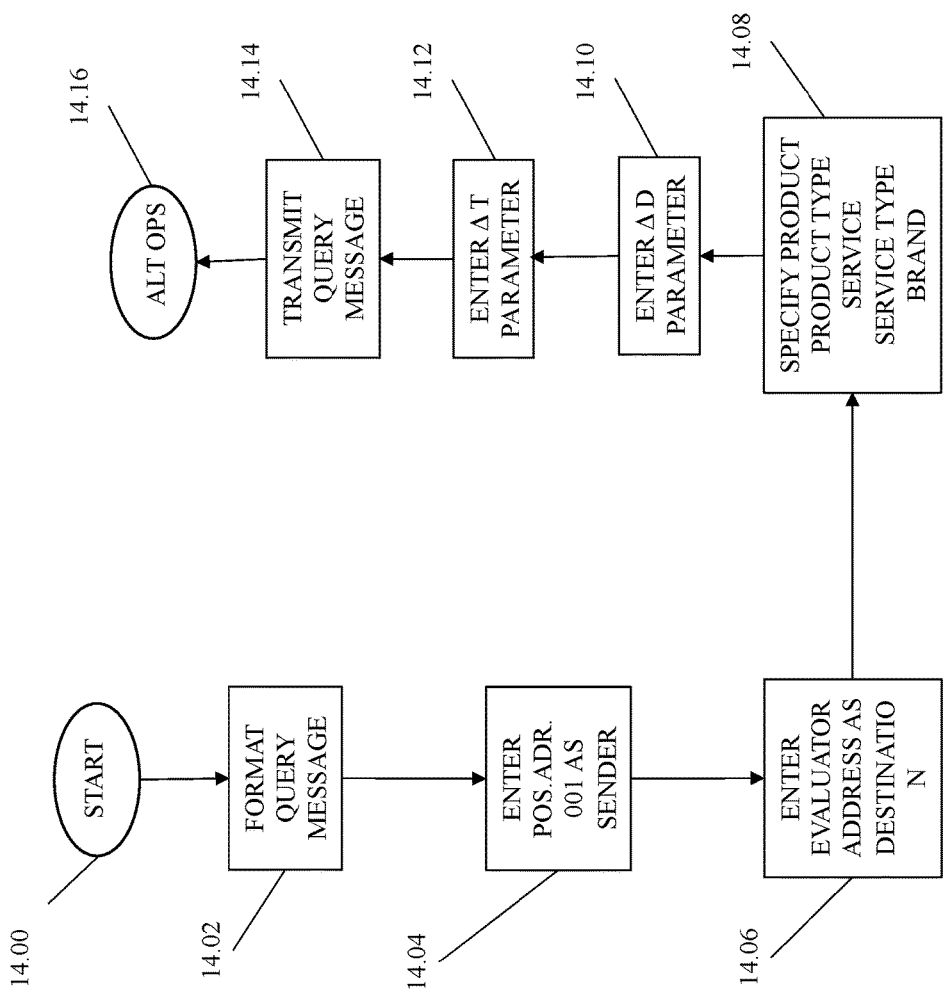
FIG. 14 is a flowchart of a point of sale system of FIG. 1 in generating a first exemplary query message and sending the first exemplary query message to the evaluator system of FIG. 3.

Referring now generally to the Figures and particularly to FIG. 14, FIG. 14 is a flowchart of the first point of sale system 112A in generating a first exemplary query message QMSG.001 and sending the first exemplary query message QMSG.001 to the evaluator system 110.

In the interest of clarity of explanation, the method of FIG. 14 will be discussed in reference to the first POS system 112A generating a first query message QMSG.001. It is understood that the method of FIG. 14 may be applied to the generation of a plurality of query messages QMSG.001-QMSG.N by one of the POS systems 112A-112N.

In step 14.00 the first POS system 112A connects with the network 100 and formats the first query message QMSG.001 in step 14.02. The first POS system 112A enters its own first POS network address POS.ADDR.001 into the first query message QMSG.001 in step 14.04 as a sender address and enters the evaluator network address EVAL.ADDR as a destination address of the first query message QMSG.001 in step 14.06.

In step 14.08 the first POS system 112A enters the first product identifier PROD.ID.001 into the first query message QMSG.001. It is understood that in alternate and modified applications of the method of FIG. 14, a POS system 112A-112N may insert into a query message QMSG.001-Q.MSG.N one or more item identifiers, e.g., one or more product identifiers PROD.ID.001-PROD.ID.N, one or more product type identifiers PRODT.ID.001-PRODT.ID.N, one or more service identifiers SERV.ID.001-SERV.ID.N, one or more service type identifiers SERVT.ID.001-SERVT.ID.N and/or one or more brand identifiers BRND.ID.001-BRND.N.

In step 14.10 the first POS system 112A enters an optional distance variance value ΔD into the first query message QMSG.001. The first POS system 112A thereby provides instruction parameters for the evaluator system 110 to search for entity records EREC.001-EREC.N that refer to information indicating that one or more identifiable entities that are associated with both (a.) a geographic location sufficiently close to a selected point of sale location, and (b.) information indicating a sufficiently high and current purchasing intensity level of specified goods and/or services to be of interest to an operator of the first POS system 112A.

In optional step 14.12 the first POS system 112A enters into the first query message QMSG.001 a time displacement value ΔT, whereby the first POS system 112A specifies a time window limitation of data to be considered in the derivation of purchasing intensity values. In optional step 14.14 the first POS system 112A enters into the first query message QMSG.001 a first purchasing intensity level value ILEVL.001 into the first query message QMSG.001.

The first POS system 112A transmits the first query message QMSG.001 via the network 100 in step 14.16 and therefrom proceeds to step 14.18 and to perform alternate computational operations.

Figure 15:
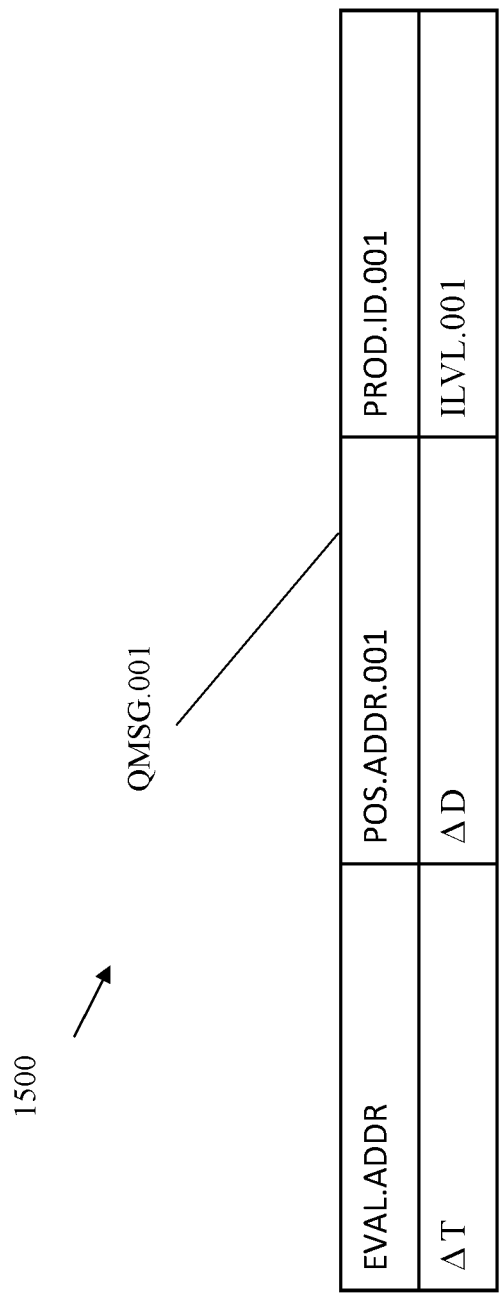
FIG. 15 is a query table of aspects of the first exemplary query message as sent to the evaluator system of FIG. 3.

Referring now generally to the Figures and particularly to FIG. 15, FIG. 15 is a query message table 1500 presenting aspects of the first exemplary query message QMSG.001 as sent to the evaluator system 110. The first query message QMSG.001 includes the evaluator system network address EVAL.ADDR as the destination address, the first POS network address POS.ADDR.001, the second product identifier PROD.ID.02, an optional time displacement value ΔT, an optional distance variance value ΔD, and an optional first purchasing intensity level value IVEVL.001.

Figure 16:
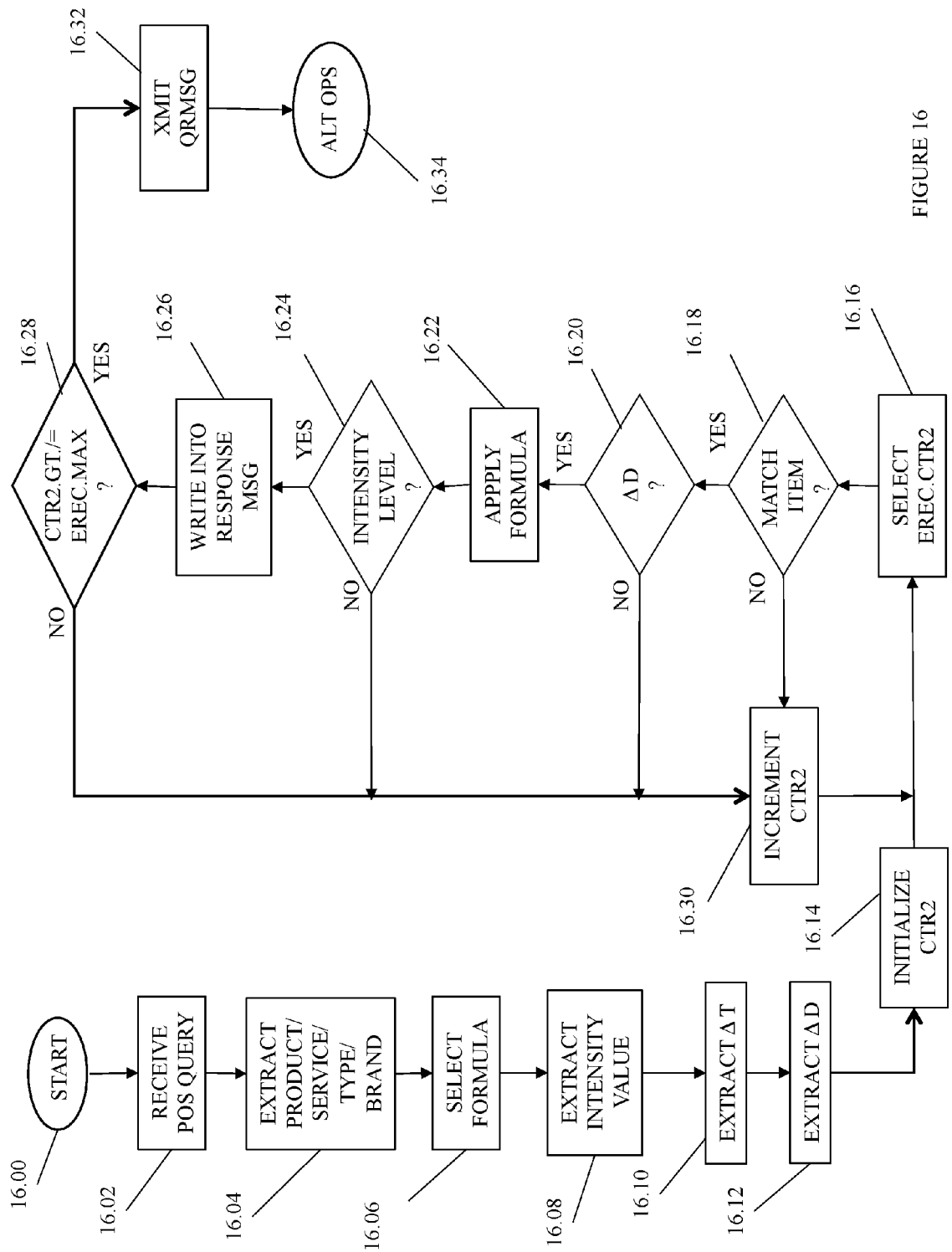
FIG. 16 is a flowchart of the evaluator system of FIG. 3 in generating a first exemplary query response message and sending the first exemplary query message to a point of sale system of FIG. 1.

Referring now generally to the Figures and particularly to FIG. 16, FIG. 16 is a flowchart of the evaluator system 110 in generating a first exemplary query response message RMSG.001 and sending the first exemplary query message RMSG.001 to the sender of a query message QMSG.001-Q.MSG.N received by the evaluator system 110.

In the interest of clarity of explanation, the method of FIG. 16 will be discussed in reference to the evaluator system 110 receiving the first query message QMSG.001 and generating a first query response message RMSG.001 received from the first POS system 112A. It is understood that the method of FIG. 14 may be applied to the generation of a plurality of query response messages RMSG.001-RMSG.N in response to receipt of each of a plurality of query messages QMSG.001-QMSG.N by one of the POS systems 112A-112N. It is further understood that the method of FIG. 16 may be modified and applied by one of ordinary skill in the art to query messages QMSG.001-QMSG.N that specify two or more item identifiers, e.g., one or more product identifiers PROD.ID.001-PROD.ID.N, one or more product type identifiers PRODT.ID.001-PRODT.ID.N, one or more service identifiers SERV.ID.001-SERV.ID.N, one or more service type identifiers SERVT.ID.001-SERVT.ID.N and/or one or more brand identifiers BRND.ID.001-BRND.N, in a search of the entity database EN.DB in harvesting relevant personally identifying information of entities, e.g., entity name NAME.001-NAME.N, an email address EMAIL.001-EMAIL.N, a cellular phone number CELL.001-CELL.N, account identifier ACCT.001-ACCT.N an insurance process identifier INS.001, a mobile device identifier MOB.001, or a government issued identifier GOV.001, as described in steps 16.16 through 16.30.

In step 16.00 the evaluator system 110 connects with the network 100 and in step 16.02 receives the first query message QMSG.001 and in step 16.04 the evaluator system 110 extracts the second product identifier PROD.ID.002 from the first query message QMSG.001. In step 16.06 the evaluator system 110 selects a formula FORM.001-FORM.N from the multivariate formula database MVF.DB associated with the first product identifier, i.e., the second multivariate formula FORM.002.

In optional step 16.08 the evaluator system 110 extracts the first purchasing intensity level value IVEVL.001 from the first query message QMSG.001. It is understood that in alternate applications of the method of FIG. 16 that a default intensity level value may be applied by the evaluator system 110 in evaluating the significance of a purchasing intensity value as generated in the method of FIG. 16.

In optional step 16.10 the evaluator system 110 extracts the optional time displacement value ΔT from the first query message QMSG.001, and in optional step 16.12 the evaluator system 110 extracts the optional distance variance value ΔD from the first query message QMSG.001. It is understood that in alternate applications of the method of FIG. 16 that a default time displacement value ΔT may be applied by the evaluator system 110 in the method of FIG. 16 rather than a time displacement value ΔT as read from the first query message QMSG.001. It is also understood that in alternate applications of the method of FIG. 16 that a default distance variance value ΔD may be applied by the evaluator system 110 in the method of FIG. 16 rather than a distance variance value ΔD as read from the first query message QMSG.001.

The evaluator system 110 initializes a second counter value CTR2 in step 16.14 begins selecting counter records CREC.001-CREC.N in succeeding instantiations of step 16.16. In step 16.8 the evaluator system 110 selects a single entity record EREC.CTR2 for examination in the following steps 16.18 through 16.28. In step 16.18 the evaluator system 110 determines if the first product identifier PROD.ID.001 is associated with the selected EREC.CTR2. When the evaluator system 110 determines that entity record EREC.CTR2 is associated with the first product identifier PROD.ID.001, the evaluator system 110 proceeds on to step 16.20. In step 16.20 the evaluator system 110 calculates a derived distance value in view of a location value LOC.001-LOC.N associated with the selected entity record EREC.001 and the first POS location PLOC.001 associated with the first POS server 112A in the POS database POS.DB, wherein if the derived distance value is less than or equal to distance variance value ΔD harvested from the first query message QMSG.001, or in an alternative less than or equal to a default distance variance value ΔD, the evaluator system 110 proceeds on to execute step 16.22.

In step 16.22 the evaluator system 110 applies the multivariate formula FORM.001-FORM.N, i.e., the first formula FORM.001 in the instant example, as selected in step 16.06 to information associated by the entity record EREC.CTR2 as selected in the most recent instantiation of step 16.16 to calculate a purchasing intensity value in view of the instant selected entity record EREC.CTR2. The evaluator system 110 in step 16.24 then compares the calculated purchasing intensity value of step 16.22 with the first intensity level value ILVL.001 as harvested from the first query message QMSG.001 to determine if the instant calculated purchasing intensity value is greater than or equal to the first intensity level value ILVL.001. When the value comparison of step 16.24 indicates that the calculated purchasing intensity value is greater than or equal to the first intensity level value ILVL.001, the evaluator system 110 proceeds on to step 16.26 and to write into the first query response message RMSG.001 one or more personally identifying information, e.g., such as an entity name NAME.001-NAME.N, an email address EMAIL.001-EMAIL.N, a cellular phone number CELL.001-CELL.N, an account identifier ACCT.001-ACCT.N, an insurance process identifier INS.001, a mobile device identifier MOB.001, or a government issued identifier GOV.001, as read from information associated by the selected entity record EREC.CTR2. Optionally or additionally, the evaluator system 110 may write additional information associated by the selected entity record EREC.CTR2, such as, but not limited to location data LOC.001-LOC.N and other associated information DATA.001-DATA.N.

The evaluator system 110 proceeds from step 16.26 and to step 16.28 to determine if the second counter value CTR2 has reached or exceeded the maximum counter value MAX that indicates that all of the plurality of consumer records CREC.001-CREC.N have been processed in an instantiation of steps 16.16 through 16.26.

When the evaluator system 110 determines in step 16.28 that the second counter value CTR2 has not reached or exceeded the maximum value MAX, the evaluator system 110 proceeds on to step 16.30 and increments the second counter value CTR2. The evaluator system 110 proceeds from step 16.30 to an additional execution of step 16.16. Alternatively, the evaluator system 110 proceeds from step 16.28 to step 16.32 when the evaluator system 110 determines in step 16.28 that the second counter value CTR2 has reached or exceeded the maximum value MAX, wherein the evaluator system 110 proceeds from step 16.32 to step 16.34 and to perform alternate computational operations.

Alternatively, evaluator system 110 in step 16.24 may compare the calculated purchasing intensity value of step 16.22 with a default intensity level value as provided to or by the evaluator system 110 and to proceed from step 16.22 and on to step 16.24 if the instant calculated purchasing intensity value of step 16.22 is determined to be greater than or equal to the default intensity level.

Figure 17:
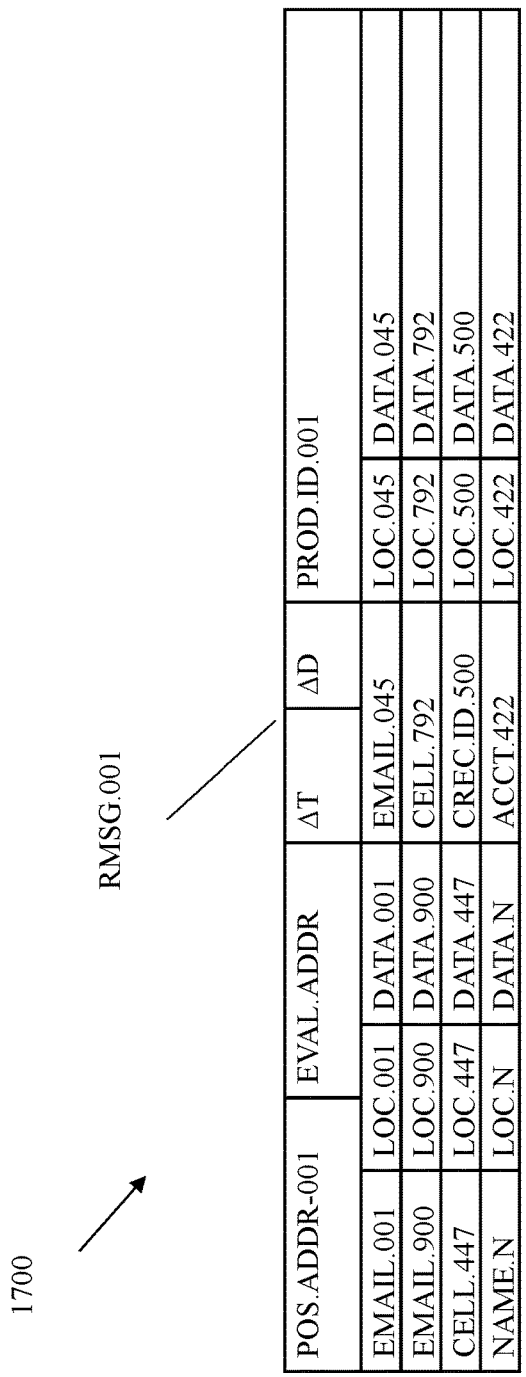
FIG. 17 is a response table of aspects of the first exemplary query response message as sent from the evaluator system of FIG. 3.

Referring now generally to the Figures and particularly to FIG. 17, FIG. 17 is a response table 1700 of aspects of the first exemplary query response message RMSG.001 as sent from the evaluator system 110. The first exemplary query response message RMSG.001 includes the first POS system network address POS.ADDR-001 as the destination address, the evaluator system network address EVAL.ADDR as the sender address, and a plurality of instances of personally identifying information EMAIL, EMAIL.900, CELL.447, NAME.N, EMAIL.045, CELL.792 & ACCT.422 and a first consumer record identifier CREC.ID.001. It is understood that the first consumer record identifier CREC.ID.001 may be used to access personally identifying information included in, associated with or referenced by first consumer record CREC.001.

The first exemplary query response message RMSG.001 may further additionally or alternatively include the first product identifier PROD.ID.001 as extracted by the evaluator system 110 in step 16.04 of the method of FIG. 16, the distance variance value ΔD as applied by the evaluator system 110 in step 16.20 of the method of FIG. 16, and the time displacement value ΔT applied by the evaluator system 110 in step 16.22 of the method of FIG. 16.

The first exemplary query response message RMSG.001 may further additionally or alternatively include location data LOC, LOC.900, LOC.447, LOC.045, LOC.792, LOC.492 & LOC.N that are each individually and uniquely associated with separate instances of personally identifying information comprised within the first exemplary query response message RMSG.001, and/or additional information DATA, DATA.900, DATA.447, DATA.045, DATA.792, DATA.492 & DATA.N that is also individually uniquely associated with separate instances of personally identifying information comprised within the first exemplary query response message RMSG.001. It is noted that a 500th consumer record identifier CREC.ID.001 may optionally be associated within the with a $500^{th}$ entity location data LOC.500 and/or a $500^{th}$ consumer record information DATA.500.

Figure 18:
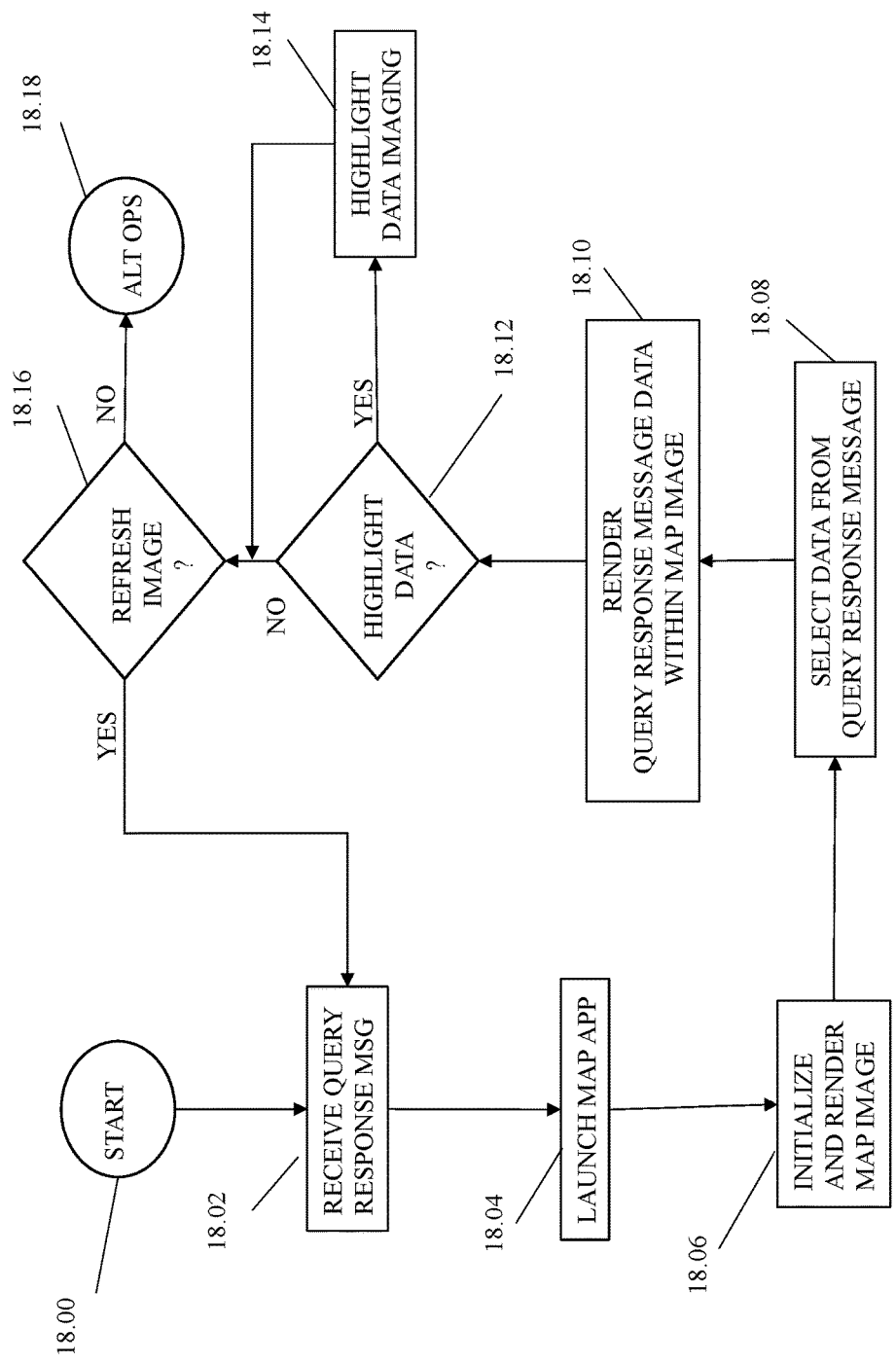
FIG. 18 is a flowchart of one of the point of sale systems of FIG. 1 visually rendering a map image, wherein the map images indicates locations selected from the consumer database records of FIG. 4B.

Referring now generally to the Figures and particularly to FIG. 18, FIG. 18 is a flowchart of a point of sale system 112A-112N visually rendering an exemplary first map image MAP.IMG.001, wherein the map image indicates locations selected from the consumer database records CREC.001-CREC.N and optionally a point of sale location PLOC.001 associated with retail sales of one or more of items identified by a product identifier PROD.ID.001-PROD.ID.N, a product type identifier PRODT.ID.001-PRODT.ID.N, a service identifier SERVID.001-SERVID.N, a service type identifier SERVT.ID.001-SERVT.ID.N, and/or a brand identifier BRND.ID.001-BRND.ID.N. It is understood the invented method enables, and that the aspects of the method of FIG. 18 may be performed by, other suitable servers and computers system known in the art, including but not limited to, the plurality of web servers 104A-104N, the user device 106, the content publisher 108, the aggregator 109, the evaluator system 110, other point of sale systems 112B-112N and the mapping web service server 114, to render the first map image MAP.IMG.001 and other suitable images of geographically related data known in the art.

For the purpose of clarity of illustration, the method of FIG. 18 will be discussed in the disclosure as an instance of the first POS system 112A generating the first map image MAP.IMG.001 in view of the first query response message RMSG.001. It is understood that the method of FIG. 18 may also be applied in whole or in part by one or more other servers 104A-104N & 114 and systems 112A-112N, 109, 108 & 110 in rendering information harvested from one or more entity records EREC.001-EREC.N, consumer records CREC.001-CREC.N and/or activity records AREC.001-AREC.N.

The first POS system 112A in step 18.00 connects with the network 100 and receives the first query response message RMSG.001 in step 1802. In step 18.04 the first POS system 112A launches a map application software MAP.SW and in step 18.06 renders a first map image MAP.IMG.001 via a first POS system display screen 112A.A. It is understood that the map application software MAP.SW may in step 18.06 rely upon and render information received via the network 100, to include rendering data requested from the mapping system 114 and received by the map application software MAP.SW. In step 18.08 the first POS system 112A selects location data LOC, LOC.900, LOC.447, LOC.045, LOC.792, LOC.492 & LOC.N from the first query response message RMSG.001. In step 18.10 the first POS system 112A renders visual avatars AVT.001-AVT.N, wherein each avatar AVT.001-AVT.N is separately representative of one particular location data LOC, LOC.900, LOC.447, LOC.045, LOC.792, LOC.492 & LOC.N. In step 18.12 the first POS system 112A determines whether to highlight one or more avatars AVT.001-ACT.N, wherein each highlight expresses information read from a data DATA.001-DATA.N of the first query response message RMSG.001 that is separately associated with a particular location data LOC, LOC.900, LOC.447, LOC.045, LOC.792, LOC.492 & LOC.N that a selected AVT.001-AVT.N shares an association.

In step 18.14 the first POS system 112A optionally renders visual highlights of one or more avatar AVT.001-AVT.N as representing information interpreted from a data DATA,001 DATA.900, DATA.447, DATA.045, DATA.792, DATA.492 & DATA.N associated with a same location data LOC.001-LOC.N as the highlighted avatar AVT.001-AVT.N.

The first POS system 112A proceeds from either step 18.12 or step 18.14 to step 18.16 as directed by either a POS system user or the POS system software POS. SW, wherein the first POS system 112A in step 18.16 whether to proceed to an additional execution of step 18.02 and continue rendering and visually modifying the avatars AVT.001-AVT.N. In the alternative, the first POS system 112A may proceed from step 18.16 to step 18.18 as directed by either the POS system user or the POS system software POS.SW and therefrom to perform alternate computational operations.

Figure 19:
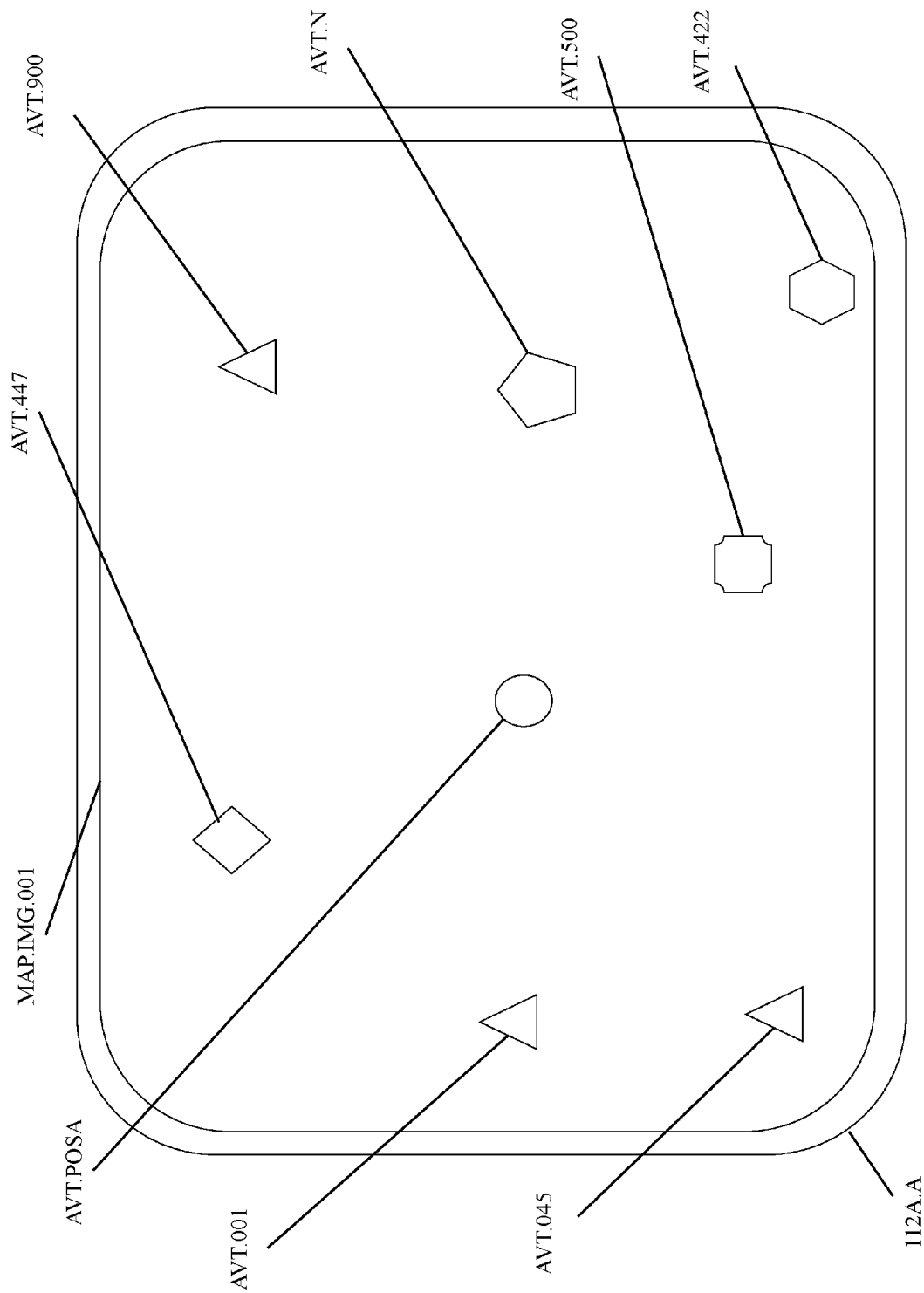
FIG. 19 is a representation of a rendering of the map image as generated by the method of FIG. 18 and by a point of sale system of FIG. 1.

Referring now generally to the Figures and particularly to FIG. 19, FIG. 19 presents the first map image MAP.IMG.001 visually rendered by the first POS screen 112A.A and including a plurality of representative avatars AVT.001-AVT.N & AVT.POSA. The first POS avatar AVT.POSA represents the geographic position represented by the first POS location data PLOC.001. The circular shape of the first POS avatar AVT.POSA indicates the nature of the first POS avatar AVT.POSA as representing the geographic location of the first geographic point of sales location. The three triangular shape avatars AVT.001, AVT.045 & AVT.900 respectively represent entity location data LOC.001, LOC.045 & LOC.900 stored in associated consumer records CREC.001-CREC.N, wherein the triangular avatar shapes indicate an association with an identified email address EMAI.001, EMAIL.045 & EMAIL.900.

A diamond shape of the $447^{th}$ avatar AVT.447 indicates the nature of the $447^{th}$ avatar AVT.447 as representing a geographic location of an entity associated with a $447^{th}$ cellular phone number CELL.447. A pentagonal shape of the $N^{th}$ avatar AVT.N indicates the nature of the $N^{th}$ avatar AVT.N as representing a geographic location of an entity associated with a legal entity name NAME.N. A hexagonal shape of the $422^{nd}$ avatar AVT.422 indicates the nature of the $422^{nd}$ avatar AVT.422 as representing a geographic location of an entity associated with a $422^{nd}$ account identifier ACC.422. A relieved orthogonal shape of the $500^{th}$ avatar AVT.500 indicates the nature of the $500^{th}$ avatar AVT.500 as representing a geographic location of an entity associated with a $500^{th}$ consumer record CREC.500.

It is understood that additional information associated by one or more identity records EREC.001-EREC.N and the location data represented in the first map image MAP.IMG.001 may optionally be visually indicated by addition to, or association with, the avatars AVT.001-AVT.N of coloring, shading, sizing, and other suitable visual indicators known in the art.

It is further understood the invented method enables other suitable servers and computers system known in the art, including but not limited to, the plurality of web servers 104A-104N, the user device 106, the content publisher 108, the aggregator 109, the evaluator system 110, other point of sale systems 112B-112N and the mapping web service server 114, to partially or completely render the first map image MAP.IMG.001 of FIG. 19 and other suitable images of geographically related data known in the art.

Figure 20:
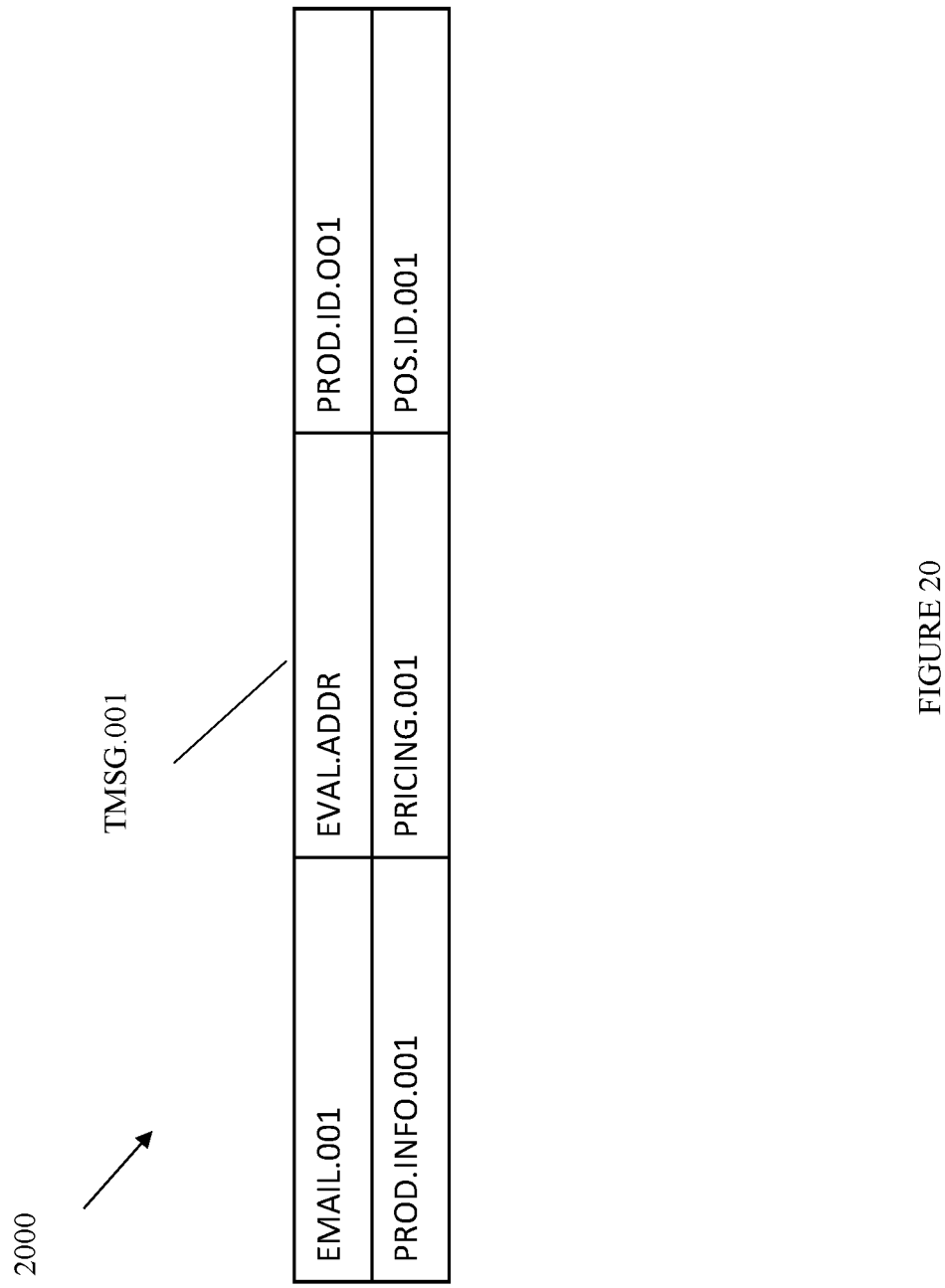
FIG. 20 is a representation of aspects of a targeted marketing message as sent from the evaluator system of FIG. 3 and addressed to an address selected from the consumer database of FIG. 4B.

Referring now generally to the Figures and particularly to FIG. 20, FIG. 20 is a target message table 2000 of aspects of a first targeted marketing message TMSG.001 as sent from the evaluator system 110 and addressed to a first email address EMAIL.001 selected from a first consumer record CREC.001 of the consumer database CON.DB. The first email address EMAIL.001 is entered as a destination address and the evaluation system email address EVAL.ADDR is entered as a sender address. The first target message TMSG.001 further includes the product identifier PROD.ID.001, a first product information payload PROD. INFO.001, a first product pricing data PRICING.001, and the first POS system identifier.

Figure 21:
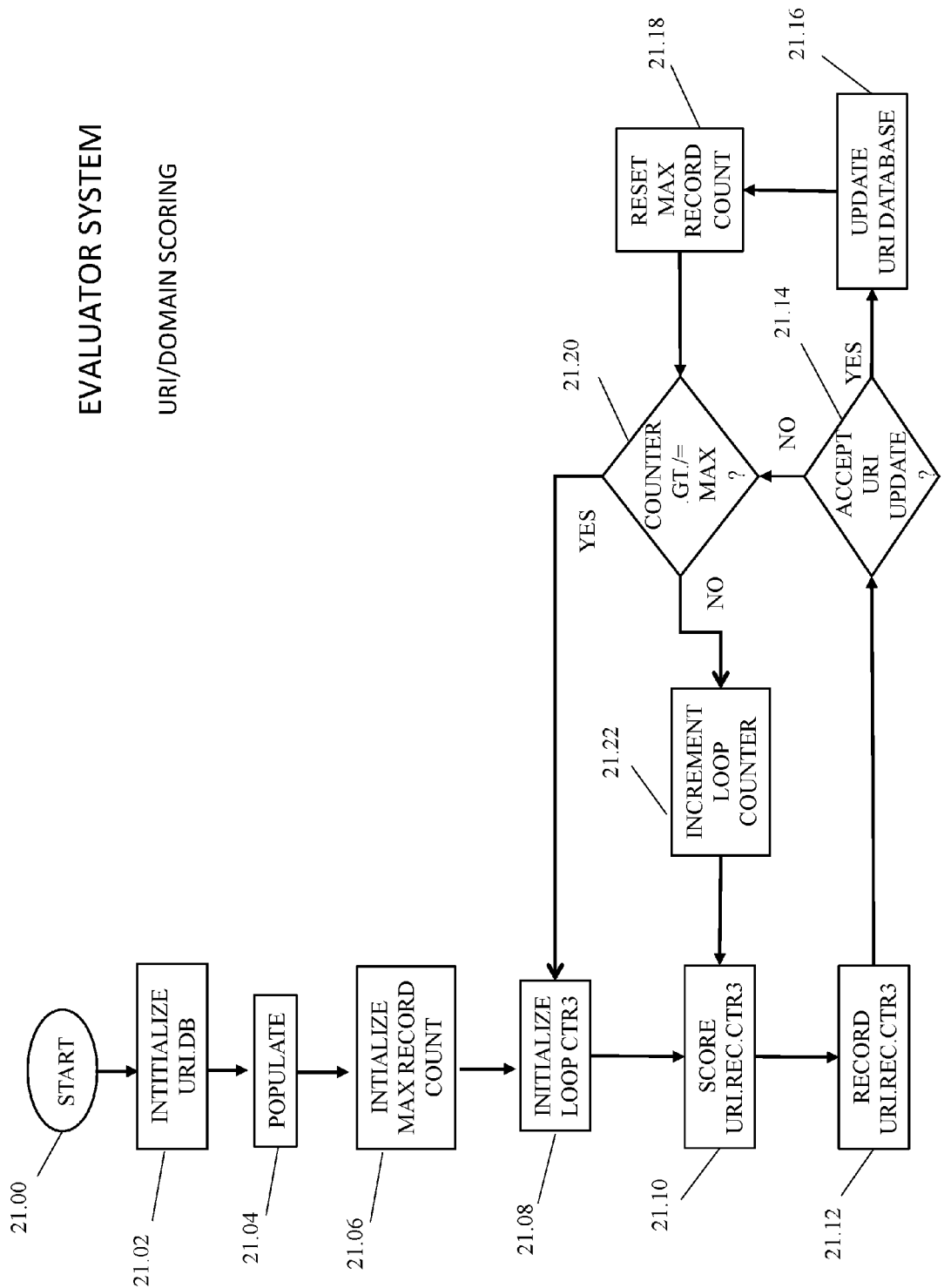
FIG. 21 is a flowchart of the evaluator system of FIG. 3 in scoring universal resource locators in relation to specific product models, product types, services, service types and brands and in view of content accessible via a particular universal resource locator.

FIG. 21 is a flowchart of the evaluator system 110 in scoring a relevance factor of universal resource identifiers URI.001-URIN in relation to specific product models PROD.001-PROD.N, product types PRODT.001-PRODT.N, services SERV.001-SERVT.N, service types SERVT.001-SERV.N and brands BRND.001-BRND.N, and in view of content accessible via a particular universal resource locator URI.001-URI.N.

In step 21.00 the evaluator system 110 connects with the network 100 and initializes the URI database URI.DB. The evaluator system 110 populates the URI.DB with URI records URI.REC.001-URI.REC.N in step 21.02 with separate universal resource locator identifiers URLID.001-URLID.N, to include domain names of the World Wide Web, Universal Resource Locators of the World Wide Web, and Internet Protocol Addresses of the Internet 102. The evaluator system 110 counts the quantity of URI records URI.REC.001-URI.REC.N in step 21.06 and sets a maximum URI database record count value VAL.MAX to be equal to that quantity of URI records URIREC.001-URI.REC.N.

The evaluator system 110 initializes a third loop counter CTR3 in step 21.08 and proceeds to score an informational resource accessible via the network 100 and referenced in a selected URI record URI.REC.CTR3 in step 21.10, wherein the scoring is performed according to the URI scoring algorithm ALGO.001 and the scoring information of the URI scoring database USCR.DB. The resultant of the scoring of the selected URI record URI.REC.CTR3 of step 21.10 is recorded in the URI database URI.DB in step 21.12.

The evaluator system 110 determines in step 21.14 whether one or more new universal resource identifiers have been received via the network 100, and if so, proceeds to update the URI database URI.DB with new URI database records URI.001-URI.N in step 21.16. The evaluator system 110 resets the maximum URI database record count value VAL.MAX in step 21.18 in view of the additional count of universal resource locators accepted in step 21.14 and thereupon proceeds on to step 21.20.

In the alternative outcome to step 21.14, when the evaluator system 110 determines in step 21.14 that no new universal resource indicators are to be accepted, the evaluator system 110 proceeds on to step 21.20. In step 21.20 the evaluator system 110 determines whether the current value of the third counter CTR3 is greater than or equal to the maximum URI database record count value VAL.MAX and proceeds on to step 21.22 if the current value of the third counter CTR3 is less than the maximum URI database record count value VAL.MAX. In step 21.22 the evaluator system 110 increments the value of the third counter CTR3. In the alternative, when the evaluator system 110 determines in step 21.20 that the current value of the third counter CTR3 is greater than or equal to the maximum URI database record count value VAL.MAX, the evaluator system 110 proceeds from step 21.20 to an additional execution of step 21.08.

Figure 22:
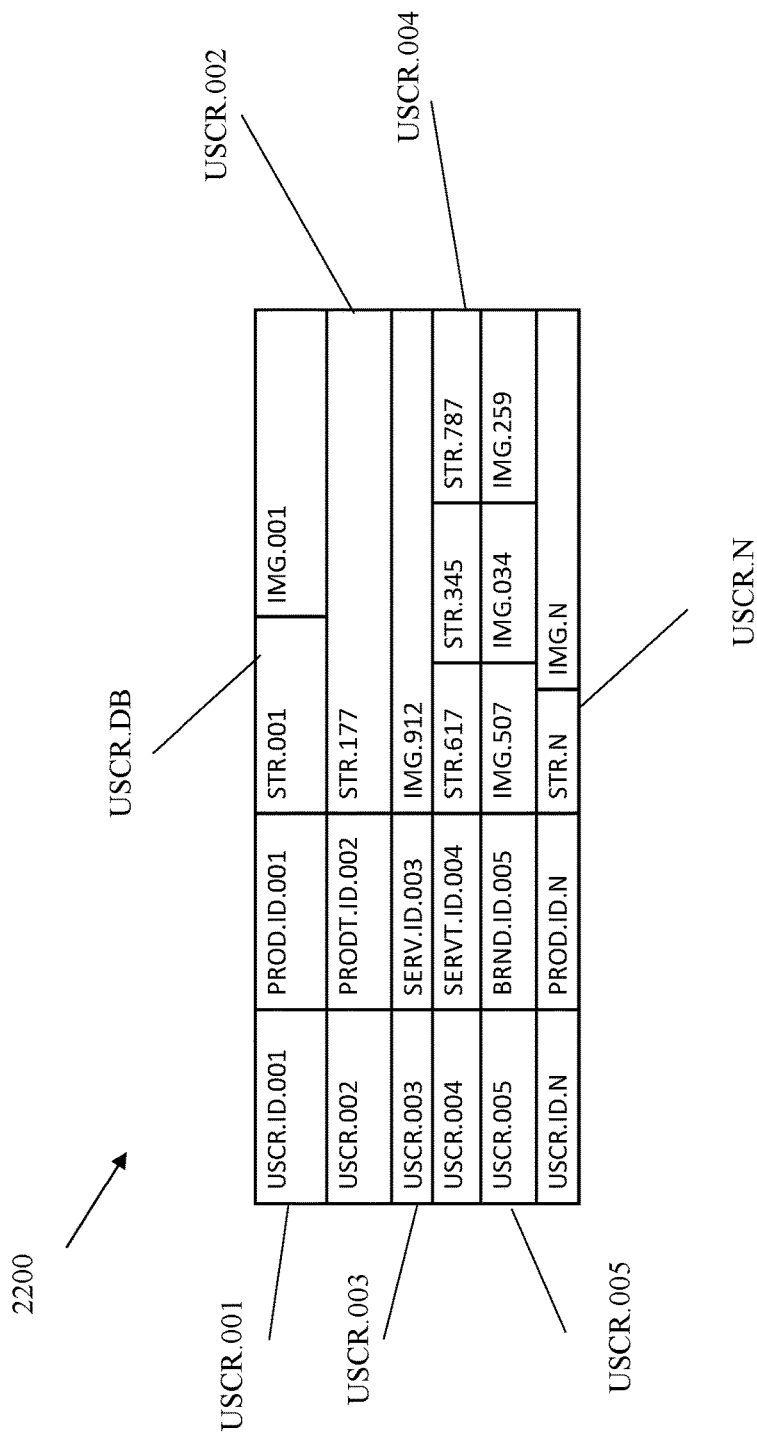
FIG. 22 is URI score record table of selected contents of an exemplary URI scoring record as applied by the method of FIG. 21.

FIG. 22 is URI score record table 2200 of selected contents of an exemplary first URI score record USCR.REC.001 as applied by the method of FIG. 21. A plurality of URI score records USCR.REC.001-USCR.REC.N, wherein each URI score records USCR.REC.001-USCR.REC.N includes a unique URI score record identifier USCR.ID.001-USCR.ID.N, a single item identifier, e.g., one of the first product identifier PROD.ID.001, the second product type identifier PRODT.002, the third service identifier SERV.ID.003, the fourth service type identifier SERVT.004, the fifth brand BRND.005, and the Nth product identifier PROD.ID.N.

Each URI score record USCR.REC.001-USCR.REC.N further includes one or more character strings STR.001 and image files IMG.001-IMG.N. The evaluator system 110 attempts to sequentially match character strings STR.001-STR.N and image files IMG.001-IMG.N of each URI score record USCR.REC.001-USCR.REC.N with information accessed at an address of URI identifier URI.ID.001-URI.ID.N of a URI record URI.REC.001-URI.N, and when a match is found between a URI identifier and one or more character strings STR.001 and image files IMG.001-IMG.N of a specific URI score record USCR.REC.001, the item identifier associated with the matching URI score record USCR.REC.001 is written into the URI record URI.REC.001-URIREC.N, whereby positive finding of a relatedness of the URI identifier URLID.001-URLID.N is recorded in the URI database URLDB.

Figure 23:
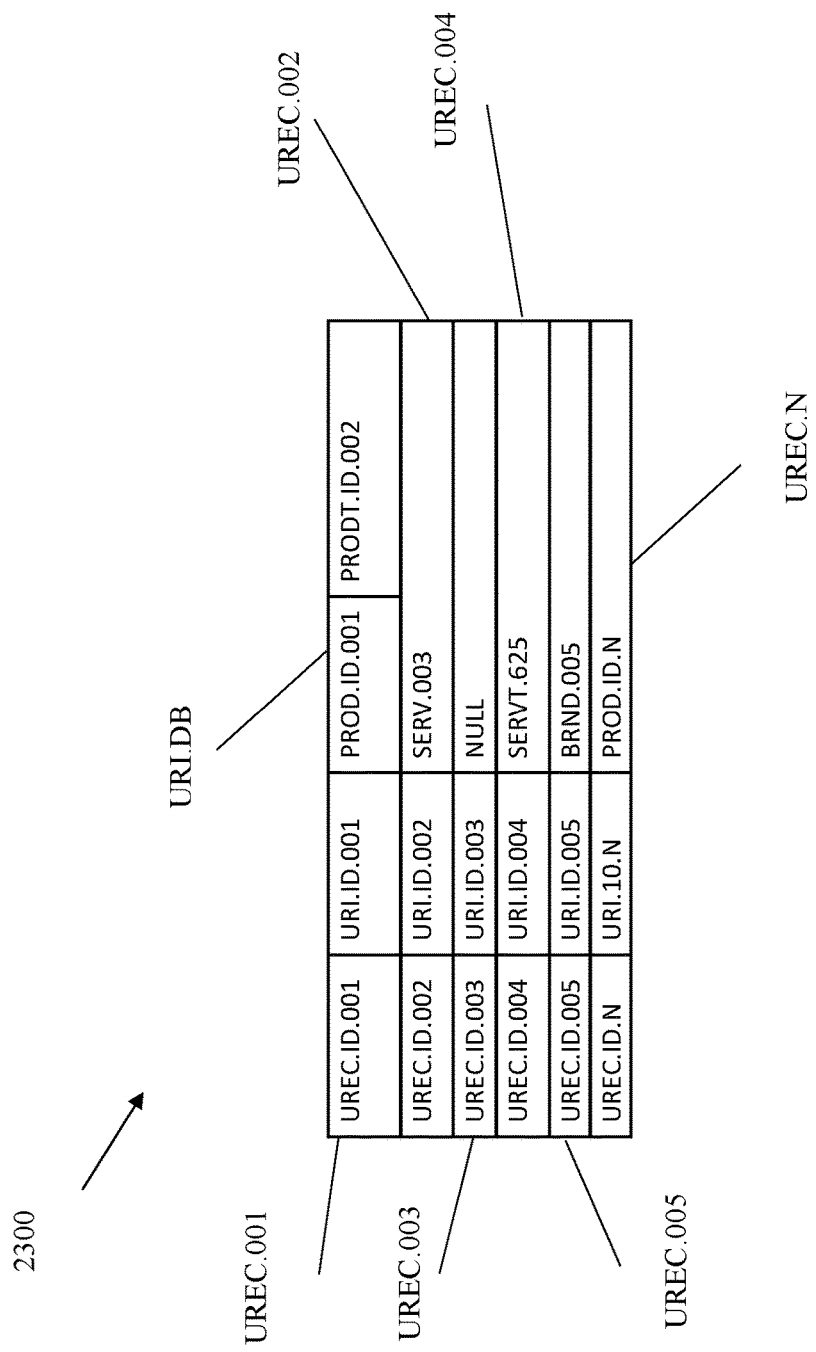
FIG. 23 is a URI database table of selected contents of a plurality of URI score records.

FIG. 23 is a URI database table 2300 of selected contents of a plurality of URI score records URI.REC.001-URI.SCR.N. A first URI record UREC.001 includes a first URI record identifier UREC.ID.001, the first URI identifier URI.ID.001, the first product identifier and the second product type identifier PRODT.ID.002. The presence of the first product identifier PROD.ID.001 in the first URI record UREC.001 will cause the first multivariate formula FORM.001 when applied in step 2.10, step 10.06, step 12.10, or step 16.22 to an activity record AREC.001-AREC.N that includes a recordation of a recent visit to the information accessible at the first URI identifier UREC.ID.001 to increase the resulting purchasing intensity score.

The presence of the second product type identifier PRODT.ID.002 in the first URI record UREC.001 will also cause the second multivariate formula FORM.002 when applied in step 2.10, step 10.06, step 12.10, or step 16.22 to an activity record AREC.001-AREC.N that includes a recordation of a recent visit to the information accessible at the second URI identifier UREC.ID.002 to increase the resulting purchasing intensity score.

A second URI record UREC.002 includes a second URI record identifier UREC.ID.002, a second URI identifier URI.ID.002 and the third service identifier SERV.ID.003. The presence of the third service identifier SERV.ID.003 in the second URI record UREC.001 will also cause the third multivariate formula FORM.003 when applied in step 2.10, step 10.06, step 12.10, or step 16.22 to an activity record AREC.001-AREC.N that includes a recordation of a recent visit to the information accessible at the second URI identifier UREC.ID.002 to increase the resulting purchasing intensity score.

A third URI record UREC.003 includes a third URI record identifier UREC.ID.003 and a null value for matches with item identifiers.

A fourth URI record UREC.004 includes a fourth URI record identifier UREC.ID.004, a fourth URI identifier URI.ID.004 and a $625^{th}$ service type identifier SERVT.ID.625.

A fifth URI record UREC.005 includes a fifth URI record identifier UREC.ID.005, a fifth URI identifier URI.ID.005 and the fifth brand identifier BRND.ID.005. The presence of the fifth brand identifier BRND.ID.005 in the fifth URI record UREC.005 will also cause the fifth multivariate formula FORM.005 when applied in step 2.10, step 10.06, step 12.10, or step 16.22 to an activity record AREC.001-AREC.N that includes a recordation of a recent visit to the information accessible at the fifth URI identifier UREC.ID.005 to increase the resulting purchasing intensity score.

Figure 24:
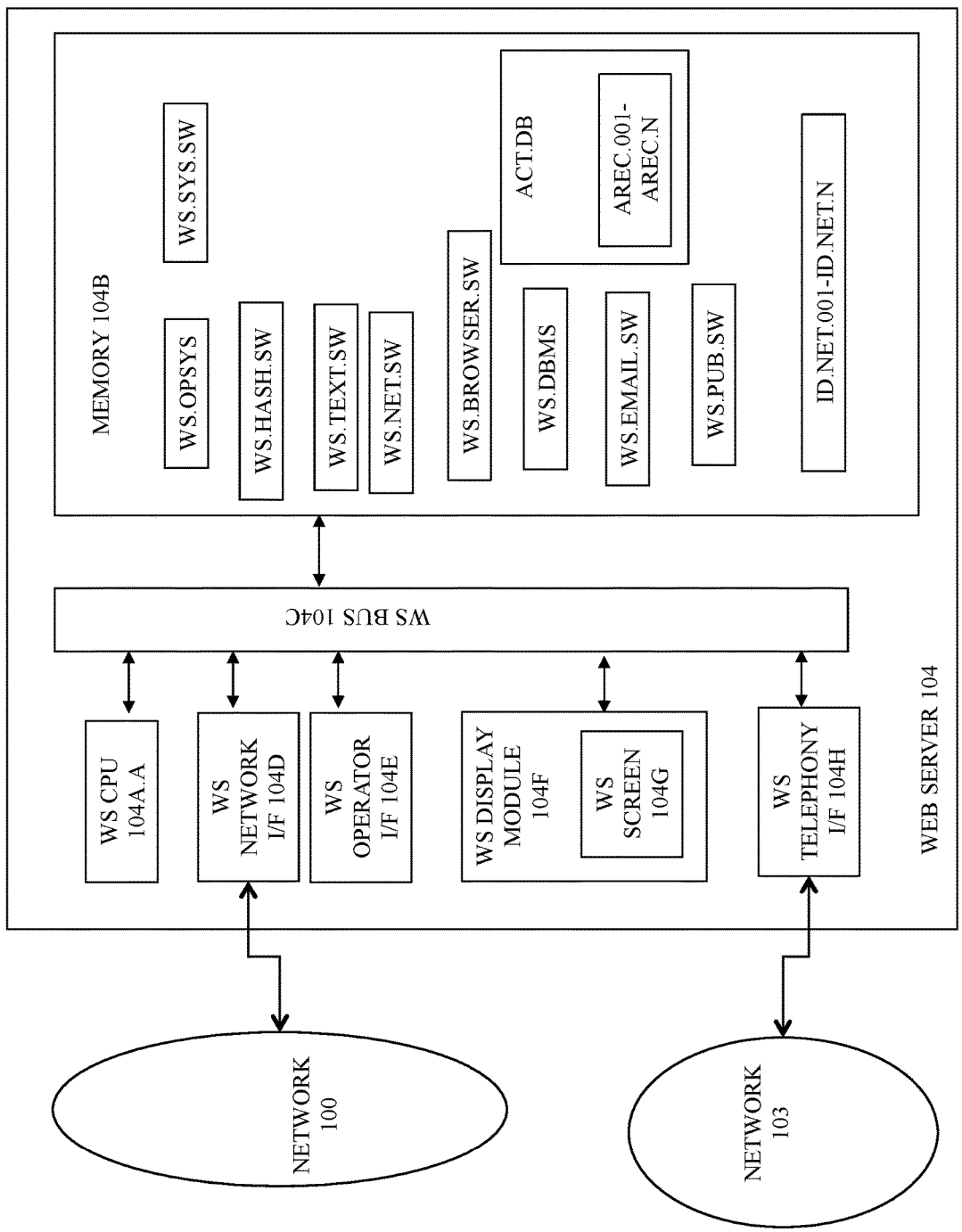
FIG. 24 is a block diagram of an exemplary webserver of the electronic communications network of FIG. 1.

Referring now generally to the Figures and particularly to FIG. 24, FIG. 24 is a block diagram of the exemplary first web server 104A. It is understood that one or more other webservers 104B-104N may include some or all of the aspects and elements of the exemplary first web server 104A as disclosed herein.

The first web server system 104A includes a WS central processing unit 104A.A and a WS system memory 104B that are bi-directionally communicatively coupled by a WS internal communications bus 104C. The WS internal communications bus 104C additionally bi-directionally couples the WS central processing unit 104A.A and the WS system memory 104B with a WS network interface 104D, a WS human operator input module 104E, a display module 104F that includes the WS display screen 104G and a WS telephony interface 104H. The WS human operator input module 104E enables an operator to input commands and data to the WS central processing unit 104A.A and the WS system memory 104B via the WS internal communications bus 104C. The WS display module 104F enables visual rendering of information at the WS display screen 104A.A as directed by the WS central processing unit 104A.A. The WS network interface 104D bi-directionally communicatively couples the WS central processing unit 104A.A with the WS network 100.

The WS system memory 104B stores a WS operating system WS.OP.SYS, a WS system software WS.SYS.SW, and a WS database management system WS.DBMS. The WS system software WS.SYS.SW enables the first web server system 104A to perform and provide all aspects of the invented method relevant to operations of the first web serve 104A, to include web page publishing and hash generation.

The WS database management system WS.DBMS stores, updates and manages digitized information, databases and database records as record to implement the aspects of the invention as disclosed herein and required of the first web server 104A. The WS database management system WS.DBMS may optionally, alternatively or additionally be or comprise a relational database management system, such as an IBM DB2 Universal Database™ server marketed by IBM Corporation of Armonk, N.Y., or other suitable relational database management systems known in the art. It is further understood that one or more of the databases EN.DB, ACT.DB, CON.DB, URLDB, USCR.DB & POS.DB optionally, alternatively or additionally be or comprise an object-oriented database management system, such as an Object Oriented DBMS as marketed by Objectivity, Inc. of San Jose, Calif., or other suitable object-oriented database management system known in the art.

A web page publishing software WS.PUB.SW enables the first web server 104A to generate and transmit information suitable for rendering by the user web browser 106B. A WS hash derivation software WS.HASH.SW enables generation of the first hash HASH.001 and additional hashes HASH.002-HASH.N of personally identifying information. It is understood that the WS hash derivation software WS.HASH.SW may optionally or alternatively be in conformance with a commonly available hashing software, such as, but not limited to, a hashing software that applies the MD5 algorithm as designed by Ronald Rivest of the Computer Science and Artificial intelligence Laboratory of the Massachusetts Institute of Technology of Cambridge, Mass. or other suitable hashing or cryptographic software or algorithms known in the art.

It is understood that in various alternate preferred embodiments of the invented method that one or more of the databases and algorithms applied therein may be alternatively or additionally stored outside of the first web server system 104A in one or more data storage systems (not shown) that are accessible to the first web server system 104A via the network 100 and/or an alternate electronic communications network (not shown).

The first web server 104A further comprises a plurality of software programs stored in system memory 104B, to include a WS web browser BROWSER.SW, a WS email client WS.EMAIL.SW, a WS texting client WS.TEXT.SW, and a WS network communication software WS.NET.SW. The WS email client WS.EMAIL.SW enables the first web server 104A to communicate by email transmissions with servers and systems 104B-114 of the network 100 via the WS telephony interface 104H and/or the WS network interface 104D. The WS texting client WS.TEXT.SW enables the first web server 104A to communicate by text messaging with servers and systems 104B-114 of the network 100 via the WS network interface 104D and/or the WS telephony network interface 104H. The WS network communication software WS.NET.SW enables the first web server 104A to communicate by other suitable messaging protocols known in the art with servers and systems 104A-114 of the network 100 via the telephony interface 104H and/or the network interface 104D.

Referring now generally to the Figures and particularly to FIG. 25, FIG. 25 is a block diagram of the user device 106.

The user device 106 includes a UD central processing unit 106C and a UD system memory 106D that are bi-directionally communicatively coupled by a UD internal communications bus 106E. The UD internal communications bus 106E additionally bi-directionally couples the UD central processing unit 106C and the UD system memory 106D with a UD network interface 106F, a UD human operator input module 106G, a display module 106H that includes a UD display screen 106I, and a UD telephony interface 106J. The UD human operator input module 106G enables an operator to input commands and data to the UD central processing unit 106C and the UD system memory 106D via the UD internal communications bus 106E. The UD display module 106H enables visual rendering of information at the UD display screen 106I as directed by the UD central processing unit 106C. The UD network interface 106F bi-directionally communicatively couples the UD central processing unit 106C with the UD network 100.

The UD system memory 106D stores a UD operating system UD.OP.SYS, a UD system software UD. SYS. SW, and a UD database management system UD.DBMS. The UD system software UD.SYS.SW enables the user device 106 to perform and provide all aspects of the invented method relevant to operations of the user device 106, to include web browsing and electronic messaging.

The UD database management system UD.DBMS stores, updates and manages digitized information, values, counters, databases and database records as record to implement the aspects of the invention as disclosed herein and required of the user device 106. The UD database management system UD.DBMS may optionally, alternatively or additionally be or comprise a relational database management system, such as an IBM DB2 Universal Database™ server marketed by IBM Corporation of Armonk, N.Y., or other suitable relational database management system known in the art. It is further understood that one or more of the databases EN.DB, ACT.DB, CON.DB, URI.DB, USCR.DB & POS.DB optionally, alternatively or additionally be or comprise an object-oriented database management system, such as an Object Oriented DBMS as marketed by Objectivity, Inc. of San Jose, Calif., or other suitable object-oriented database management system known in the art.

It is understood that in various alternate preferred embodiments of the invented method that one or more of the databases and algorithms applied therein may be alternatively or additionally stored outside of the user device 106 in one or more data storage systems (not shown) that are accessible to the user device 106 via the network 100 and/or an alternate electronic communications network (not shown).

The user device 106 further comprises a plurality of software programs stored in the UD system memory 106D, to include the web browser 106B that may include the cookie 106A, a UD email client EMAIL. SW, a UD texting client TEXT. SW, and a UD network communication software UD.NET.SW. The user web browser 106B enables the user device 106 to retrieve, present, render and traverse information resources on the World Wide Web via and/or within the network 100. It is understood that the user web browser 106B may be or comprise a SAFARI™ web browser provided by APPLE of Cupertino, Calif., or other suitable web browser known in the art.

The UD email client UD.EMAIL.SW enables the user device 106 to communicate by email transmissions with servers and systems 104A-106 of the network 100 via the UD telephony interface 106I and/or the UD network interface 106F. The UD texting client UD.TEXT.SW enables the user device 106 to communicate by text messaging with servers and systems 104A-106 of the network 100 via the UD network interface 106F and/or the UD telephony network interface 106I. The UD network communication software UD.NET.SW enables the user device 106 to communicate by other suitable messaging protocols known in the art with servers and systems 106-106 of the network 100 via the UD telephony interface 106I and/or the UD network interface 106F.

Figure 26:
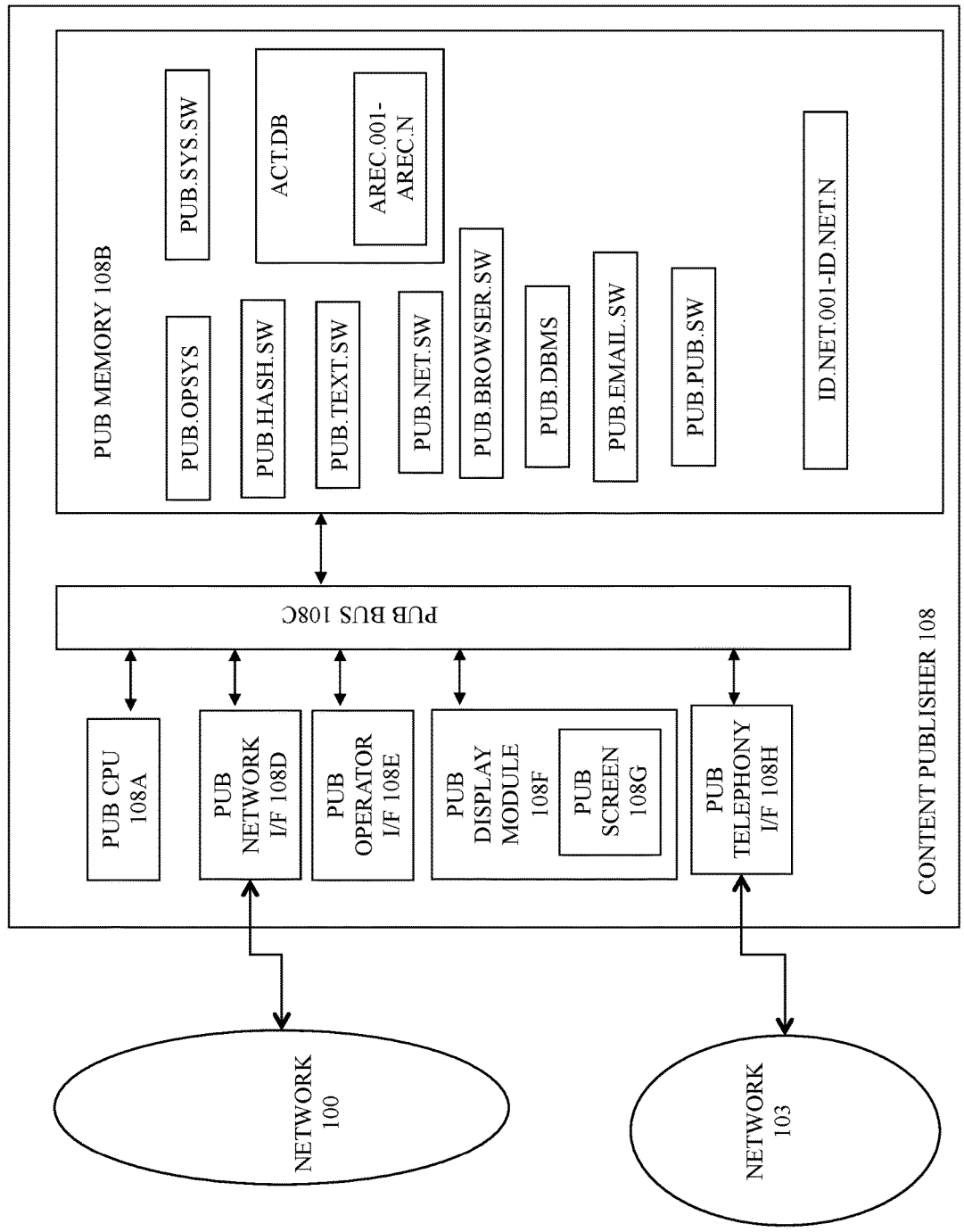
FIG. 26 is a block diagram of content publishing system of the electronic communications network of FIG. 1.

Referring now generally to the Figures and particularly to FIG. 26, FIG. 26 is a block diagram of the content publisher 108.

The content publisher 108 includes a PUB central processing unit 108A and a PUB system memory 108B that are bi-directionally communicatively coupled by a PUB internal communications bus 108C. The PUB internal communications bus 108C additionally bi-directionally couples the PUB central processing unit 108A and the PUB system memory 108B with a PUB network interface 108D, a PUB human operator input module 108E, a display module 108F that includes a PUB display screen 108G, and a PUB telephony interface 108H. The PUB human operator input module 108E enables an operator to input commands and data to the PUB central processing unit 108A and the PUB system memory 108B via the PUB internal communications bus 108C. The PUB display module 108F enables visual rendering of information at the PUB display screen 108A.A as directed by the PUB central processing unit 108A. The PUB network interface 108D bi-directionally communicatively couples the PUB central processing unit 108A with the PUB network 100.

The PUB system memory 108B stores a PUB operating system PUB.OP.SYS, a PUB system software PUB.SYS.SW, and a PUB database management system PUB.DBMS. The PUB system software PUB.SYS.SW enables the content publisher 108 to perform and provide all aspects of the invented method relevant to operations of the content publisher 108, to include web page publishing and hash generation.

The PUB database management system PUB.DBMS stores, updates and manages digitized information, values, variables, counters, databases and database records as record to implement the aspects of the invention as disclosed herein and required of the content publisher 108. The PUB database management system PUB.DBMS may optionally, alternatively or additionally be or comprise a relational database management system, such as an IBM DB2 Universal Database™ server marketed by IBM Corporation of Armonk, N.Y., or other suitable relational database management system known in the art. It is further understood that one or more of the databases EN.DB, ACT.DB, CON.DB, URI.DB, USCR.DB & POS.DB optionally, alternatively or additionally be or comprise an object-oriented database management system, such as an Object Oriented DBMS as marketed by Objectivity, Inc. of San Jose, Calif., or other suitable object-oriented database management system known in the art.

A PUB web page publishing software PUB.AG.SW enables the content publisher 108 to generate and transmit information suitable for rendering by the user web browser 106B. A PUB hash derivation software PUB.HASH.SW enables generation of the first hash HASH.001 and additional hashes HASH.002-HASH.N of personally identifying information. It is understood that the PUB hash derivation software PUB.HASH.SW may optionally or alternatively be in conformance with a commonly available hashing software, such as, but not limited to, a hashing software that applies the MD5 algorithm as designed by Ronald Rivest of the Computer Science and Artificial Intelligence Laboratory of the Massachusetts Institute of Technology of Cambridge, Mass., or other suitable hashing or cryptographic software or algorithm known in the art.

It is understood that in various alternate preferred embodiments of the invented method that one or more of the databases and algorithms applied therein may be alternatively or additionally stored outside of the content publisher 108 in one or more data storage systems (not shown) that are accessible to the content publisher 108 via the network 100 and/or an alternate electronic communications network (not shown).

The content publisher 108 further comprises a plurality of software programs stored in the PUB system memory 108B, to include a PUB web browser PUB.BROWSER.SW, a PUB email client EMAIL.SW, a PUB texting client TEXT.SW, and a PUB network communication software PUB.NET.SW. The PUB web browser PUB.BROWSER.SW enables the aggregator 109 to retrieve, present, render and traverse information resources on the World Wide Web via and/or within the network 100. It is understood that the PUB web browser PUB.BROWSER.SW may be or comprise a SAFARI™ web browser provided by APPLE of Cupertino, Calif., or other suitable web browser known in the art.

The PUB email client PUB.EMAIL.SW enables the content publisher 108 to communicate by email transmissions with servers and systems 104A-114 of the network 100 via the PUB telephony interface 108H and/or the PUB network interface 108D. The PUB texting client PUB.TEXT.SW enables the content publisher 108 to communicate by text messaging with servers and systems 104A-114 of the network 100 via the PUB network interface 108D and/or the PUB telephony network interface 108H. The PUB network communication software PUB.NET.SW enables the content publisher 108 to communicate by other suitable messaging protocols known in the art with servers and systems 108-114 of the network 100 via the PUB telephony interface 108H and/or the PUB network interface 108D.

Figure 27:
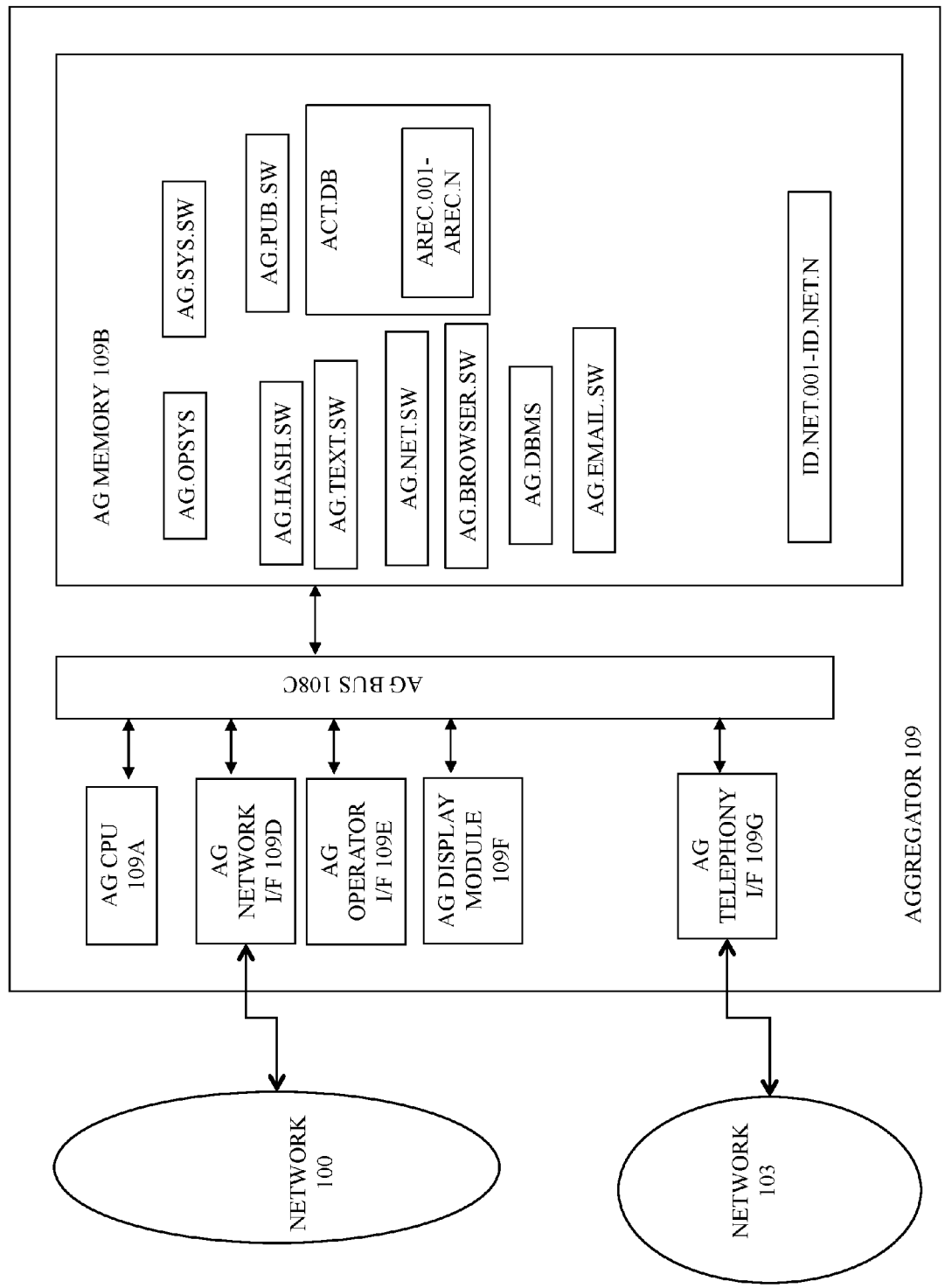
FIG. 27 is a block diagram of aggregator system of the electronic communications network of FIG. 1.

Referring now generally to the Figures and particularly to FIG. 27, FIG. 27 is a block diagram of the aggregator 109.

The aggregator 109 includes an AG central processing unit 109A and an AG system memory 109B that are bi-directionally communicatively coupled by an AG internal communications bus 109C. The AG internal communications bus 109C additionally bi-directionally couples the AG central processing unit 109A and the AG system memory 109B with an AG network interface 109D, an AG human operator input module 109E, a display module 109F that includes an AG display screen 109G, and an AG telephony interface 109H. The AG human operator input module 109E enables an operator to input commands and data to the AG central processing unit 109A and the AG system memory 109B via the AG internal communications bus 109C. The AG display module 109F enables visual rendering of information at the AG display screen 109A.A as directed by the AG central processing unit 109A. The AG network interface 109D bi-directionally communicatively couples the AG central processing unit 109A with the AG network 100.

The AG system memory 109B stores an AG operating system AG.OP.SYS, an AG system software AG.SYS.SW, and an AG database management system AG.DBMS. The AG system software AG.SYS.SW enables the aggregator 109 to perform and provide all aspects of the invented method relevant to operations of the aggregator 109, to include web page publishing and hash generation. It is understood that the AG hash derivation software AG.HASH.SW may optionally or alternatively be in conformance with a commonly available hashing software, such as, but not limited to, a hashing software that applies the MD5 algorithm as designed by Ronald Rivest of the Computer Science and Artificial Intelligence Laboratory of the Massachusetts Institute of TechnologyOf Cambridge, Mass., or other suitable hashing or cryptographic software or algorithm known in the art.

The AG database management system AG.DBMS stores, updates and manages digitized information, variables, values, counters, databases and database records as record to implement the aspects of the invention as disclosed herein and required of the aggregator 109. The AG database management system AG.DBMS may optionally, alternatively or additionally be or comprise a relational database management system, such as an IBM DB2 Universal Database™ server marketed by IBM Corporation of Armonk, N.Y., or other suitable relational database management system known in the art. It is further understood that one or more of the databases EN.DB, ACT.DB, CON.DB, URI.DB, USCR.DB & POS.DB optionally, alternatively or additionally be or comprise an object-oriented database management system, such as an Object Oriented DBMS as marketed by Objectivity, Inc. of San Jose, Calif., or other suitable object-oriented database management system known in the art.

An AG web page publishing software AG.PUB.SW enables the aggregator 109 to generate and transmit information suitable for rendering by the user web browser 10B. A hash derivation software AG.HASH. SW enables generation of the first hash HASH.001 and additional hashes HASH.002-HASH.N of personally identifying information. It is understood that the hash derivation software AG.HASH. SW may optionally or alternatively be in conformance with a commonly available hashing software, such as, but not limited to, a hashing software that applies the MD5 algorithm as designed by Ronald Rivest of the Computer Science and Artificial Intelligence Laboratory of the Massachusetts Institute of Technology of Cambridge, Mass., or other suitable hashing or cryptographic software or algorithm known in the art.

It is understood that in various alternate preferred embodiments of the invented method that one or more of the databases and algorithms applied therein may be alternatively or additionally stored outside of the aggregator 109 in one or more data storage systems (not shown) that are accessible to the aggregator 109 via the network 100 and/or an alternate electronic communications network (not shown).

The aggregator 109 further comprises a plurality of software programs stored in the AG system memory 109B, to include an AG web browser AG.BROWSER.SW, an AG email client EMAIL. SW, an AG texting client TEXT. SW, and an AG network communication software AG.NET.SW. The AG web browser AG.BROWSER.SW enables the aggregator 109 to retrieve, present, render and traverse information resources on the World Wide Web via and/or within the network 100, and may be a SAFARI™ web browser provided by APPLE of Cupertino, Calif., or other suitable web browser known in the art.

The AG email client AG.EMAIL.SW enables the aggregator 109 to communicate by email transmissions with servers and systems 104A-114 of the network 100 via the AG telephony interface 109H and/or the AG network interface 109D. The AG texting client AG.TEXT.SW enables the aggregator 109 to communicate by text messaging with servers and systems 104A-114 of the network 100 via the AG network interface 109D and/or the AG telephony network interface 109H. The AG network communication software AG.NET.SW enables the aggregator 109 to communicate by other suitable messaging protocols known in the art with servers and systems 109-114 of the network 100 via the AG telephony interface 109H and/or the AG network interface 109D.

Figure 28:
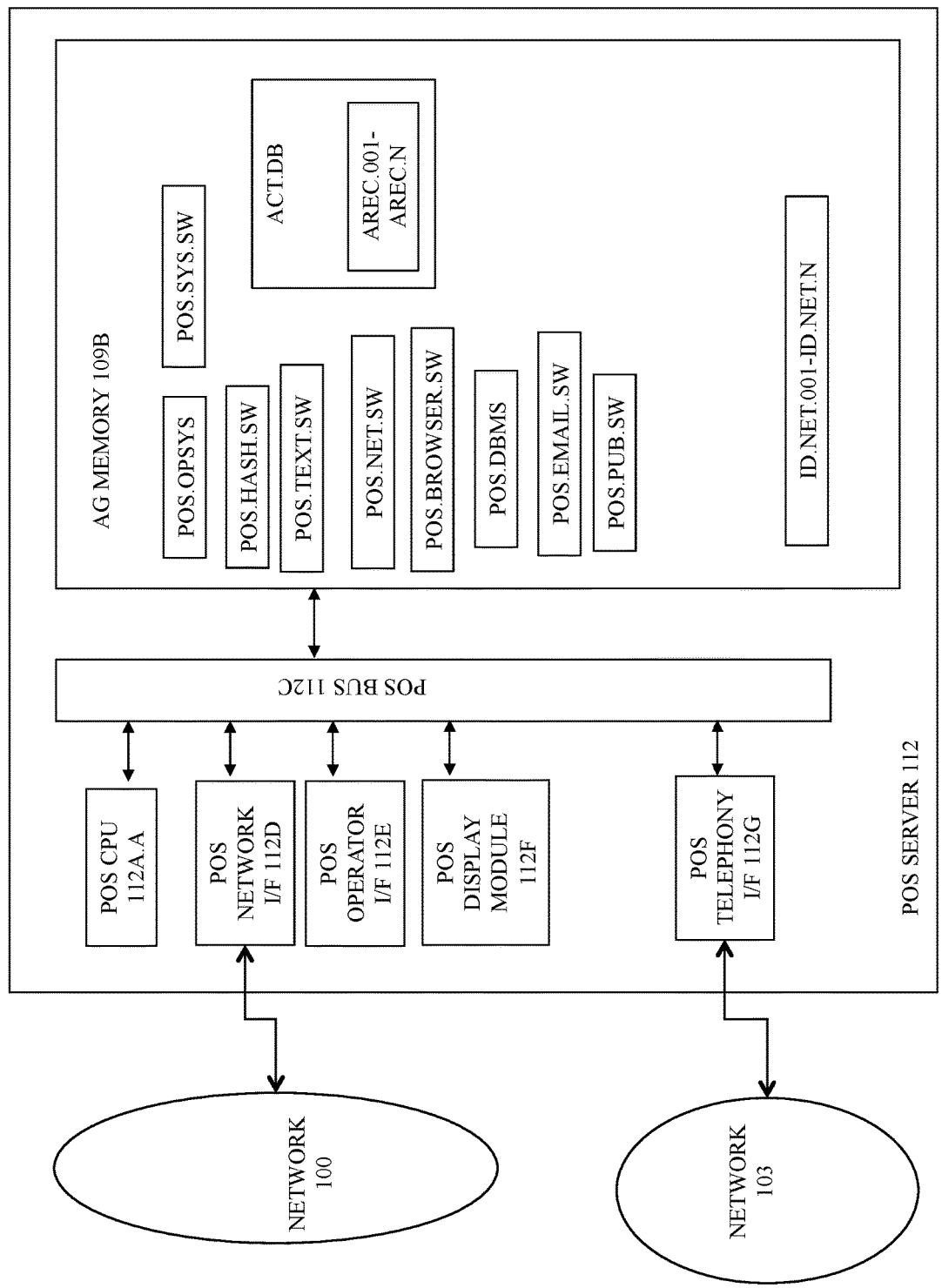
FIG. 28 is a block diagram of an exemplary point of sale system of the electronic communications network of FIG. 1.

Referring now generally to the Figures and particularly to FIG. 28, FIG. 28 is a block diagram of the exemplary first POS system 112A. It is understood that one or more other POS systems 112B-112N may include some or all of the aspects and elements of the exemplary first POS system 112A as disclosed herein.

The first POS system 112A includes a POS central processing unit 112A.A and a POS system memory 112B that are bi-directionally communicatively coupled by a POS internal communications bus 112C. The POS internal communications bus 112C additionally bi-directionally couples the POS central processing unit 112A.A and the POS system memory 112B with a POS network interface 112D, a POS human operator input module 112E, a display module 112F that includes the POS display screen 112G and a POS telephony interface 112H. The POS human operator input module 112E enables an operator to input commands and data to the POS central processing unit 112A.A and the POS system memory 112B via the POS internal communications bus 112C. The POS display module 112F enables visual rendering of information at the POS display screen 112A.A as directed by the POS central processing unit 112A.A. The POS network interface 112D bi-directionally communicatively couples the POS central processing unit 112A.A with the POS network 100.

The POS system memory 112B stores a POS operating system POS.OP.SYS, a POS system software POS.SYS.SW, and a POS database management system POS.DBMS. The POS system software POS.SYS.SW enables the first POS system 112A to perform and provide all relevant aspects of the invented method, to include web page publishing and hash generation.

The POS database management system POS.DBMS stores, updates and manages digitized information, values, variable, counters, databases and database records as record to implement the aspects of the invention as disclosed herein and required of the first POS system 112A. The POS database management system POS.DBMS may optionally, alternatively or additionally be or comprise a relational database management system, such as an IBM DB2 Universal Database™ server marketed by IBM Corporation of Armonk, N.Y., or other suitable relational database management system known in the art. It is further understood that one or more of the databases EN.DB, ACT.DB, CON.DB, URI.DB, USCR.DB & POS.DB optionally, alternatively or additionally be or comprise an object-oriented database management system, such as an Object Oriented DBMS as marketed by Objectivity, Inc. of San Jose, Calif., or other suitable object-oriented database management system known in the art.

A web page publishing software POS.PUB.SW enables the first POS system 112A to generate and transmit information suitable for rendering by the user web browser 106B. A POS hash derivation software POS.HASH.SW enables generation of the first hash HASH.001 and additional hashes HASH.002-HASH.N of personally identifying information. It is understood that the POS hash derivation software POS.HASH.SW may optionally or alternatively be in conformance with a commonly available hashing software, such as, but not limited to, a hashing software that applies the MD5 algorithm as designed by Ronald Rivest of the Computer Science and Artificial Intelligence Laboratory of the Massachusetts Institute of Technology of Cambridge, Mass., or other suitable hashing or cryptographic software or algorithm known in the art.

It is understood that in various alternate preferred embodiments of the invented method that one or more of the databases and algorithms applied therein may be alternatively or additionally stored outside of the first POS system 112A in one or more data storage systems (not shown) that are accessible to the first POS system 112A via the network 100 and/or an alternate electronic communications network (not shown).

The first the POS A further comprises a plurality of software programs stored in system memory 112B, to include a POS web browser BROWSER.SW, a POS email client EMAIL.SW, a POS texting client TEXT.SW, and a POS network communication software POS.NET.SW. The POS email client EMAIL.SW enables the first POS system 112A to communicate by email transmissions with servers and systems 112A-114 of the network 100 via the POS telephony interface 112H and/or the POS network interface 112D. The POS texting client POS.TEXT.SW enables the first POS system 112A to communicate by text messaging with servers and systems 112A-114 of the network 100 via the POS network interface 112D and/or the POS telephony network interface 112H. The POS network communication software POS.NET.SW enables the first POS system 112A to communicate by other suitable messaging protocols known in the art with servers and systems 112-114 of the network 100 via the telephony interface 112H and/or the POS network interface 112D.

Figure 29:
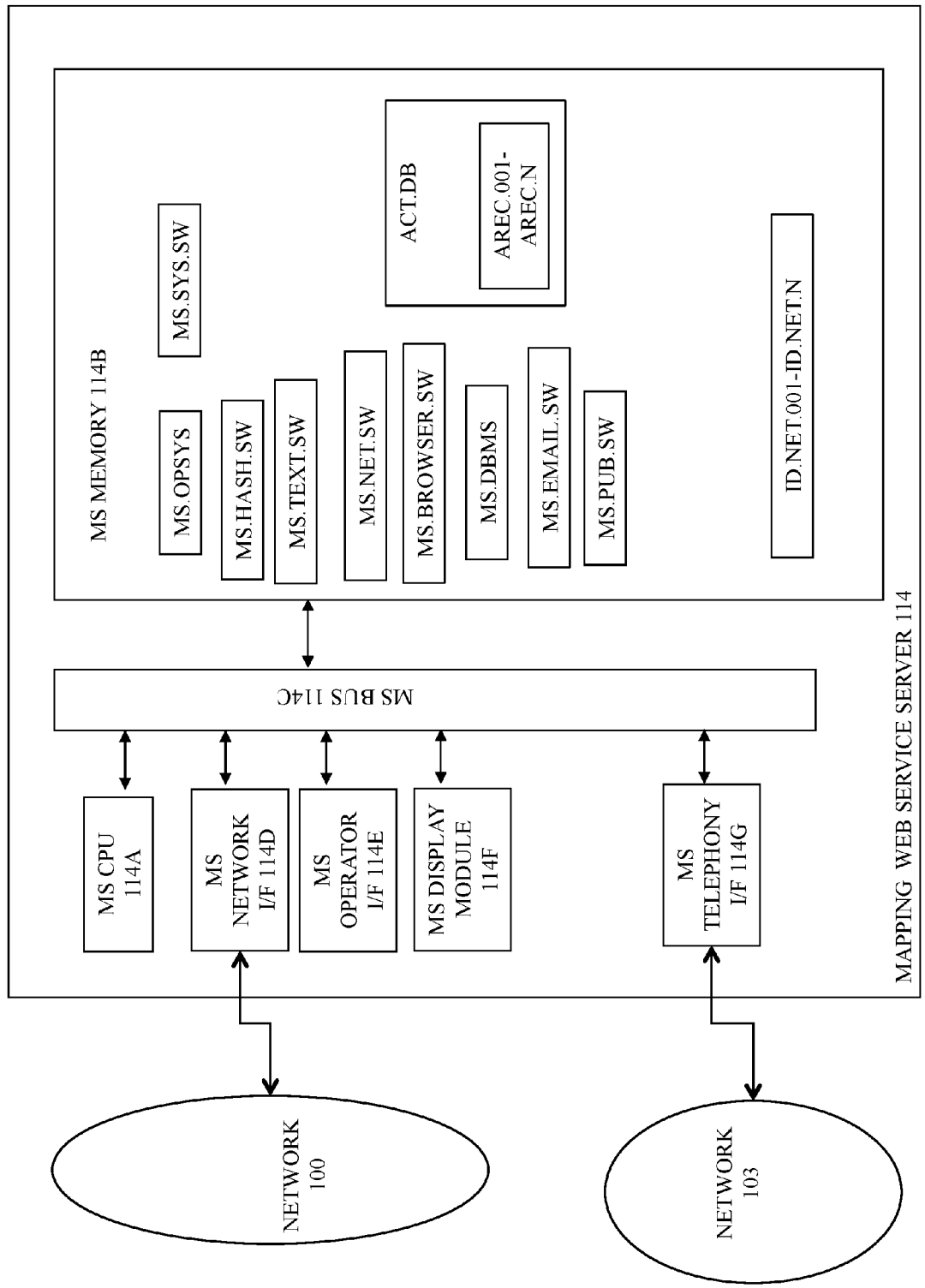
FIG. 29 is a block diagram of the mapping web service server of the electronic communications network of FIG. 1.

Referring now generally to the Figures and particularly to FIG. 29, FIG. 29 is a block diagram of the mapping system 114.

The mapping system 114 includes an MS central processing unit 114A and an MS system memory 114B that are bi-directionally communicatively coupled by an MS internal communications bus 114C. The MS internal communications bus 114C additionally bi-directionally couples the MS central processing unit 114A and the MS system memory 114B with an MS network interface 114D, an MS human operator input module 114E, a display module 114F that includes an MS display screen 114G, and an MS telephony interface 114H. The MS human operator input module 114E enables an operator to input commands and data to the MS central processing unit 114A and the MS system memory 114B via the MS internal communications bus 114C. The MS display module 114F enables visual rendering of information at the MS display screen 114G as directed by the MS central processing unit 114A. The MS network interface 114D bi-directionally communicatively couples the MS central processing unit 114A with the MS network 100.

The MS system memory 114B stores an MS operating system MS.OP.SYS, an MS system software MS.SYS.SW, and an MS database management system MS.DBMS. The MS system software MS.SYS.SW enables the mapping system 114 to perform and provide all aspects of the invented method relevant to operations of the mapping system 114, to include web page publishing and hash generation.

The MS database management system MS.DBMS stores, updates and manages digitized information, values, counters, databases and database records as record to implement the aspects of the invention as disclosed herein and required of the mapping system 114. The MS database management system MS.DBMS may optionally, alternatively or additionally be or comprise a relational database management system, such as an IBM DB2 Universal Database™ server marketed by IBM Corporation of Armonk, N.Y., or other suitable relational database management system known in the art. It is further understood that one or more of the databases EN.DB, ACT.DB, CON.DB, URI.DB, USCR.DB & POS.DB optionally, alternatively or additionally be or comprise an object-oriented database management system, such as an Object Oriented DBMS as marketed by Objectivity, Inc. of San Jose, Calif., or other suitable object-oriented database management system known in the art.

An MS web page publishing software MS.PUB.SW enables the mapping system 114 to generate and transmit information suitable for rendering by the user web browser 106B. An MS hash derivation software MS.HASH.SW enables generation of the first hash HASH.001 and additional hashes HASH.002-HASH.N of personally identifying information. It is understood that the MS hash derivation software MS.HASH.SW may optionally or alternatively be in conformance with a commonly available hashing software, such as, but not limited to, a hashing software that applies the MD5 algorithm as designed by Ronald Rivest of the Computer Science and Artificial Intelligence Laboratory of the Massachusetts Institute of Technology of Cambridge, Mass., or other suitable hashing or cryptographic software or algorithm known in the art.

It is understood that in various alternate preferred embodiments of the invented method that one or more of the databases and algorithms applied therein may be alternatively or additionally stored outside of the mapping system 114 in one or more data storage systems (not shown) that are accessible to the mapping system 114 via the network 100 and/or an alternate electronic communications network (not shown).

The mapping system 114 further comprises a plurality of software programs stored in the MS system memory 114B, to include an MS web browser MS.BROWSER.SW, an MS email client MS.EMAIL.SW, an MS texting client MS.TEXT.SW, and an MS network communication software MS.NET.SW. The MS web browser MS.BROWSER.SW enables the mapping system 114 to retrieve, present, render and traverse information resources on the World Wide Web via and/or within the network 100. It is understood that the MS web browser MS.BROWSER.SW may be or comprise a SAFARI™ web browser provided by APPLE of Cupertino, Calif., or other suitable web browser known in the art.

The MS email client MS.EMAIL.SW enables the mapping system 114 to communicate by email transmissions with servers and systems 104A-114 of the network 100 via the MS telephony interface 114H and/or the MS network interface 114D. The MS texting client MS.TEXT.SW enables the mapping system 114 to communicate by text messaging with servers and systems 104A-114 of the network 100 via the MS network interface 114D and/or the MS telephony network interface 114H. The MS network communication software MS.NET.SW enables the mapping system 114 to communicate by other suitable messaging protocols known in the art with servers and systems 114-114 of the network 100 via the MS telephony interface 114H and/or the MS network interface 114D.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer-readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible, computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based herein. Accordingly, the disclosure of the embodiments of the invention is intended to be illustrative, but not limiting, of the scope of the invention, which is set forth in the following claims.

We claim:

1. A method comprising:
   receiving a hash of a unique user identifier from a third party source;
   finding a matching hash by searching for a match of the received hash within a multiplicity of unique hashes, wherein the matching hash is equivalent to the received hash and the multiplicity of unique hashes are generated by applying a hash algorithm to a multiplicity of user identifiers, wherein at least a plurality of the user identifiers are each separately associated with a unique offline behavior information;
   associating the received hash with a unique user identifier that is associated with the matching hash;
   acquiring a plurality of records of instances of website browser activity associated with the matching hash;
   deriving a purchasing intention intensity value from the plurality of records of instances of website browser activity in combination with the unique offline behavior information and in view of the timeliness of the instances of website browser activity and the relevance of the unique offline behavior information to automotive purchasing information;
   electronically formatting a targeted marketing message addressed to a first network address selected from a first consumer record of the consumer database as a message destination address and including a product identifier, a first product information payload, a first product pricing data, and the first point-of-sale system identifier; and
   transmitting the targeted marketing message to the first network address via an electronic communications network.

2. The method of claim 1, wherein the unique user identifier is an email address.

3. The method of claim 1, wherein the unique user identifier is a telephone number address.

4. The method of claim 1, wherein the unique user identifier is an account identifier.

5. The method of claim 1, wherein the unique user identifier identifies a natural born person.

6. The method of claim 1, further comprising:
   assigning a purchasing intent weighting value to at least one universal resource locator;
   determining that a connection with the at least one universal resource locator is recorded in the plurality of records; and
   deriving the purchasing intention intensity value in view of the purchasing intent weighting value.

7. The method of claim 6, wherein the at least one universal resource locator comprises a domain name of the World Wide Web.

8. The method of claim 6, wherein the purchasing intent weighting value is at least partially derived in view of relevance to information describing an automobile quality.

9. The method of claim 1, further comprising:
   generating a plurality of individually determined purchasing intent weighting values separately in view of each of a plurality of universal resource locators;
   assigning each of the plurality of the individually determined purchasing intent weighting values to one of the plurality of universal resource locators in a one-to-one correspondence;
   determining that a connection with the at least one of the plurality of universal resource locator is recorded in the plurality of records; and
   deriving the purchasing intention intensity value in view of the purchasing intent weighting value.

10. The method of claim 1, wherein the at least one record of offline behavior comprises information relevant to a likelihood of an intent to purchase an automobile.

11. The method of claim 1, wherein the purchasing intention intensity value quantifies a likelihood of the entity purchasing an automobile.

12. The method of claim 11, wherein the purchasing intention intensity value quantifies a likelihood of the entity purchasing a specific make and model of the automobile.

13. The method of claim 1, wherein the purchasing intention intensity value quantifies a likelihood of the entity purchasing an automobile product or service.

14. The method of claim 1, wherein at least one record of the plurality of records of instances of website browser activity is acquired from a web browser.

15. The method of claim 1, wherein at least one record of the plurality of records of instances of website browser activity is acquired from a cellular telephone.

16. The method of claim 1, wherein the unique user identifier is associated with a postal address.

17. The method of claim 1, wherein the unique user identifier is associated with a residence address.

18. The method of claim 1 further comprising:
calculating a travel path extending between a geolocational position associated with the unique user identifier and a point of sale location; and
calculating an accessibility value of the travel path.

19. The method of claim 18, further comprising rendering a geographic map image, the geographic map image including a visual indication of a geographic location associated with the unique user identifier.

20. The method of claim 19, comprising further rendering a distinguishing visual indication of a geographic location associated with a point of sale operation.

21. The method of claim 1, wherein the first network address is an email address.

22. The method of claim 1, wherein the first network address is a telephone number.

23. The method of claim 22, wherein the targeted marketing message is a text message.

24. The method of claim 1, wherein the first network address is an account identifier.

25. The method of claim 1, wherein the first network address references a universal resource.

26. The method of claim 1, wherein the first network address references an identification number.

27. The method of claim 1, wherein the first network address comprises an online account number.

28. The method of claim 1, wherein the first network address references a postal address.

29. The method of claim 1, wherein the first network address references a geolocational identifier.

30. The method of claim 1, wherein the first network address is the unique user identifier.

31. The method of claim 1, wherein the first network address is the hash.

* * * * *